(12) United States Patent
Petite

(10) Patent No.: US 8,064,412 B2
(45) Date of Patent: Nov. 22, 2011

(54) SYSTEMS AND METHODS FOR MONITORING CONDITIONS

(75) Inventor: Thomas David Petite, Douglasville, GA (US)

(73) Assignee: Sipco, LLC, Atlanta, GA (US)

( * ) Notice: Subject to any disclaimer, the term of this patent is extended or adjusted under 35 U.S.C. 154(b) by 1099 days.

(21) Appl. No.: 11/125,009

(22) Filed: May 9, 2005

(65) Prior Publication Data

US 2005/0201397 A1 Sep. 15, 2005

Related U.S. Application Data

(63) Continuation of application No. 09/704,150, filed on Nov. 1, 2000, now Pat. No. 6,891,838, and a continuation-in-part of application No. 09/812,044, filed on Mar. 19, 2001, now Pat. No. 6,914,893, said application No. 09/704,150 is a continuation-in-part of application No. 09/439,059, filed on Nov. 12, 1999, now Pat. No. 6,437,692, and a continuation-in-part of application No. 09/412,895, filed on Oct. 5, 1999, now Pat. No. 6,218,953, and a continuation-in-part of application No. 09/271,517, filed on Mar. 18, 1999, now abandoned, and a continuation-in-part of application No. 09/172,554, filed on Oct. 14, 1998, now Pat. No. 6,028,522, and a continuation-in-part of application No. 09/102,178, filed on Jun. 22, 1998, now Pat. No. 6,430,268.

(60) Provisional application No. 60/201,252, filed on May 1, 2000.

(51) Int. Cl.
*H04W 4/00* (2009.01)

(52) U.S. Cl. ........................................ 370/338; 340/540
(58) Field of Classification Search .................... None
See application file for complete search history.

(56) References Cited

U.S. PATENT DOCUMENTS

| 3,665,475 A | 5/1972 | Gram |
| 3,705,385 A | 12/1972 | Batz |
| 3,723,876 A | 3/1973 | Seaborn, Jr. |
| 3,742,142 A | 6/1973 | Martin |

(Continued)

FOREIGN PATENT DOCUMENTS

EP 0483547 A1 5/1992

(Continued)

OTHER PUBLICATIONS

Brownrigg, E.B. et al.; A Packet Radio Network for Library Automation; IEEE (1987); pp. 456-462.

(Continued)

*Primary Examiner* — Phirin Sam
(74) *Attorney, Agent, or Firm* — Trenton A. Ward; Dustin B. Weeks; Troutman Sanders, LLP

(57) ABSTRACT

Systems and methods for monitoring conditions are provided. A system can comprise a plurality of wireless transmitters and a plurality of repeaters. At least one wireless transmitter can be integrated into an alarm. The repeaters can be dispersed throughout a region at defined locations. The system can also include a computer to receive information communicated from the repeaters and the transmitters. The computer can include software for evaluating received information, identifying an alarm condition and an originating location of the alarm condition, and for reporting the alarm condition to a remote location. Other embodiments are also claimed and described.

14 Claims, 12 Drawing Sheets

U.S. PATENT DOCUMENTS

| | | |
|---|---|---|
| 3,848,231 A | 11/1974 | Wooton |
| 3,892,948 A | 7/1975 | Constable |
| 3,906,460 A | 9/1975 | Halpern |
| 3,914,692 A | 10/1975 | Seaborn, Jr. |
| 3,922,492 A | 11/1975 | Lumsden |
| 3,925,763 A | 12/1975 | Wadwhani et al. |
| 4,025,315 A | 5/1977 | Mazelli |
| 4,056,684 A | 11/1977 | Lindstrom |
| 4,058,672 A | 11/1977 | Crager et al. |
| 4,083,003 A | 4/1978 | Haemmig |
| 4,120,452 A | 10/1978 | Kimura et al. |
| 4,124,839 A | 11/1978 | Cohen |
| 4,135,181 A | 1/1979 | Bogacki et al. |
| 4,204,195 A | 5/1980 | Bogacki |
| 4,213,119 A | 7/1980 | Ward et al. |
| 4,277,837 A | 7/1981 | Stuckert |
| 4,278,975 A | 7/1981 | Kimura et al. |
| 4,284,852 A | 8/1981 | Szybicki et al. |
| 4,322,842 A | 3/1982 | Martinez |
| 4,345,116 A | 8/1982 | Ash et al. |
| 4,354,181 A | 10/1982 | Spletzer |
| 4,395,780 A | 7/1983 | Gohm et al. |
| 4,396,910 A | 8/1983 | Enemark et al. |
| 4,396,915 A | 8/1983 | Farnsworth et al. |
| 4,399,531 A | 8/1983 | Grande et al. |
| 4,406,016 A | 9/1983 | Abrams et al. |
| 4,417,450 A | 11/1983 | Morgan, Jr. et al. |
| 4,436,957 A | 3/1984 | Mazza |
| 4,446,454 A | 5/1984 | Pyle |
| 4,446,458 A | 5/1984 | Cook |
| 4,454,414 A | 6/1984 | Benton |
| 4,468,656 A | 8/1984 | Clifford et al. |
| 4,488,152 A | 12/1984 | Arnason et al. |
| 4,495,496 A | 1/1985 | Miller, III |
| 4,551,719 A | 11/1985 | Carlin et al. |
| 4,611,198 A | 9/1986 | Levinson et al. |
| 4,621,263 A | 11/1986 | Takenaka et al. |
| 4,630,035 A | 12/1986 | Stahl et al. |
| 4,631,357 A | 12/1986 | Grunig |
| 4,665,519 A | 5/1987 | Kirchner et al. |
| 4,669,113 A | 5/1987 | Ash et al. |
| 4,670,739 A | 6/1987 | Kelly, Jr. |
| 4,692,761 A | 9/1987 | Robinton |
| 4,704,724 A | 11/1987 | Krishnan et al. |
| 4,707,852 A | 11/1987 | Jahr et al. |
| 4,731,810 A | 3/1988 | Watkins |
| 4,742,296 A | 5/1988 | Petr et al. |
| 4,757,185 A | 7/1988 | Onishi |
| 4,788,721 A | 11/1988 | Krishnan et al. |
| 4,792,946 A | 12/1988 | Mayo |
| 4,799,059 A | 1/1989 | Grindahl et al. |
| 4,800,543 A | 1/1989 | Lyndon-James et al. |
| 4,814,763 A | 3/1989 | Nelson et al. |
| 4,825,457 A | 4/1989 | Lebowitz |
| 4,829,561 A | 5/1989 | Matheny |
| 4,849,815 A | 7/1989 | Streck |
| 4,851,654 A | 7/1989 | Nitta |
| 4,856,046 A | 8/1989 | Steck et al. |
| 4,857,912 A | 8/1989 | Everett, Jr. et al. |
| 4,864,559 A | 9/1989 | Perlman |
| 4,875,231 A | 10/1989 | Hara et al. |
| 4,884,132 A | 11/1989 | Morris et al. |
| 4,897,644 A | 1/1990 | Hirano |
| 4,906,828 A | 3/1990 | Halpern |
| 4,908,769 A | 3/1990 | Vaughan et al. |
| 4,912,656 A | 3/1990 | Cain et al. |
| 4,918,432 A | 4/1990 | Pauley |
| 4,918,690 A | 4/1990 | Markkula, Jr. et al. |
| 4,918,995 A | 4/1990 | Pearman et al. |
| 4,924,462 A | 5/1990 | Sojka |
| 4,928,299 A | 5/1990 | Tansky et al. |
| 4,939,726 A | 7/1990 | Flammer et al. |
| 4,940,976 A | 7/1990 | Gastouniotis et al. |
| 4,949,077 A | 8/1990 | Mbuthia |
| 4,952,928 A | 8/1990 | Carroll et al. |
| 4,962,496 A | 10/1990 | Vercellotti et al. |
| 4,967,366 A | 10/1990 | Kaehler |
| 4,968,970 A | 11/1990 | LaPorte |
| 4,968,978 A | 11/1990 | Stolarczyk |
| 4,972,504 A | 11/1990 | Daniel, Jr. et al. |
| 4,973,957 A | 11/1990 | Shimizu et al. |
| 4,973,970 A | 11/1990 | Reeser |
| 4,977,612 A | 12/1990 | Wilson |
| 4,980,907 A | 12/1990 | Raith et al. |
| 4,987,536 A | 1/1991 | Humblet |
| 4,989,230 A | 1/1991 | Gillig et al. |
| 4,991,008 A | 2/1991 | Nama |
| 4,993,059 A | 2/1991 | Smith et al. |
| 4,998,095 A | 3/1991 | Shields |
| 4,999,607 A | 3/1991 | Evans |
| 5,007,052 A | 4/1991 | Flammer |
| 5,032,833 A | 7/1991 | Laporte |
| 5,038,372 A | 8/1991 | Elms et al. |
| 5,055,851 A | 10/1991 | Sheffer |
| 5,057,814 A | 10/1991 | Onan et al. |
| 5,061,997 A | 10/1991 | Rea et al. |
| 5,079,768 A | 1/1992 | Flammer |
| 5,086,391 A | 2/1992 | Chambers |
| 5,088,032 A | 2/1992 | Bosack |
| 5,091,713 A | 2/1992 | Horne et al. |
| 5,111,199 A | 5/1992 | Tomoda et al. |
| 5,113,183 A | 5/1992 | Mizuno et al. |
| 5,113,184 A | 5/1992 | Katayama |
| 5,115,224 A | 5/1992 | Kostusiak et al. |
| 5,115,433 A | 5/1992 | Baran et al. |
| 5,117,422 A | 5/1992 | Hauptschein et al. |
| 5,124,624 A | 6/1992 | de Vries et al. |
| 5,128,855 A | 7/1992 | Hilber et al. |
| 5,130,519 A | 7/1992 | Bush et al. |
| 5,130,987 A | 7/1992 | Flammer |
| 5,131,038 A | 7/1992 | Puhl et al. |
| 5,134,650 A | 7/1992 | Blackmon |
| 5,136,285 A | 8/1992 | Okuyama |
| 5,138,615 A | 8/1992 | Lamport et al. |
| 5,155,481 A | 10/1992 | Brennan, Jr. et al. |
| 5,159,317 A | 10/1992 | Brav |
| 5,159,592 A | 10/1992 | Perkins |
| 5,162,776 A | 11/1992 | Bushnell et al. |
| 5,170,393 A | 12/1992 | Peterson et al. |
| 5,177,342 A | 1/1993 | Adams |
| 5,189,287 A | 2/1993 | Parienti |
| 5,191,192 A | 3/1993 | Takahira et al. |
| 5,191,326 A | 3/1993 | Montgomery |
| 5,193,111 A | 3/1993 | Matty et al. |
| 5,195,018 A | 3/1993 | Kwon et al. |
| 5,197,095 A | 3/1993 | Bonnet et al. |
| 5,200,735 A | 4/1993 | Hines |
| 5,204,670 A | 4/1993 | Stinton |
| 5,212,645 A | 5/1993 | Wildes et al. |
| 5,216,502 A | 6/1993 | Katz |
| 5,221,838 A | 6/1993 | Gutman et al. |
| 5,223,844 A | 6/1993 | Mansell et al. |
| 5,224,648 A | 7/1993 | Simon et al. |
| 5,231,658 A | 7/1993 | Eftechiou |
| 5,235,630 A | 8/1993 | Moody et al. |
| 5,239,294 A | 8/1993 | Flanders et al. |
| 5,239,575 A | 8/1993 | White et al. |
| 5,241,410 A | 8/1993 | Streck et al. |
| 5,243,338 A | 9/1993 | Brennan, Jr. et al. |
| 5,245,633 A | 9/1993 | Schwartz et al. |
| 5,251,205 A | 10/1993 | Callon |
| 5,252,967 A | 10/1993 | Brennan et al. |
| 5,253,167 A | 10/1993 | Yoshida et al. |
| 5,265,150 A | 11/1993 | Helmkamp et al. |
| 5,265,162 A | 11/1993 | Bush et al. |
| 5,266,782 A | 11/1993 | Alanara et al. |
| 5,272,747 A | 12/1993 | Meads |
| 5,276,680 A | 1/1994 | Messenger |
| 5,282,204 A | 1/1994 | Shpancer et al. |
| 5,282,250 A | 1/1994 | Dent et al. |
| 5,289,165 A | 2/1994 | Belin |
| 5,289,362 A | 2/1994 | Liebl et al. |
| 5,291,516 A | 3/1994 | Dixon et al. |
| 5,295,154 A | 3/1994 | Meier et al. |
| 5,305,370 A | 4/1994 | Kearns et al. |
| 5,309,501 A | 5/1994 | Kozik et al. |
| 5,315,645 A | 5/1994 | Matheny |

| | | | | | | |
|---|---|---|---|---|---|---|
| 5,317,309 A | 5/1994 | Vercellotti et al. | | 5,544,784 A | 8/1996 | Malaspina |
| 5,319,364 A | 6/1994 | Waraksa et al. | | 5,548,632 A | 8/1996 | Walsh et al. |
| 5,319,698 A | 6/1994 | Glidewell et al. | | 5,550,358 A | 8/1996 | Tait et al. |
| 5,319,711 A | 6/1994 | Servi | | 5,550,359 A | 8/1996 | Bennett |
| 5,323,384 A | 6/1994 | Norwood et al. | | 5,550,535 A | 8/1996 | Park |
| 5,325,429 A | 6/1994 | Kurgan | | 5,553,094 A | 9/1996 | Johnson |
| 5,329,394 A | 7/1994 | Calvani et al. | | 5,555,258 A | 9/1996 | Snelling et al. |
| 5,331,318 A | 7/1994 | Montgomery | | 5,555,286 A | 9/1996 | Tendler |
| 5,334,974 A | 8/1994 | Simms et al. | | 5,557,320 A | 9/1996 | Krebs |
| 5,335,265 A | 8/1994 | Cooper et al. | | 5,557,748 A | 9/1996 | Norris |
| 5,343,493 A | 8/1994 | Karimullah | | 5,562,537 A | 10/1996 | Zver et al. |
| 5,344,068 A | 9/1994 | Haessig | | 5,565,857 A | 10/1996 | Lee |
| 5,345,231 A | 9/1994 | Koo et al. | | 5,568,535 A | 10/1996 | Sheffer et al. |
| 5,345,595 A | 9/1994 | Johnson et al. | | 5,570,084 A | 10/1996 | Ritter et al. |
| 5,347,263 A | 9/1994 | Carroll et al. | | 5,572,438 A | 11/1996 | Ehlers et al. |
| 5,352,278 A | 10/1994 | Korver et al. | | 5,572,528 A | 11/1996 | Shuen |
| 5,354,974 A | 10/1994 | Eisenberg | | 5,573,181 A | 11/1996 | Ahmed |
| 5,355,278 A | 10/1994 | Hosoi et al. | | 5,574,111 A | 11/1996 | Brichta et al. |
| 5,355,513 A | 10/1994 | Clarke et al. | | 5,583,850 A | 12/1996 | Snodgrass et al. |
| 5,365,217 A | 11/1994 | Toner | | 5,583,914 A | 12/1996 | Chang et al. |
| 5,371,736 A | 12/1994 | Evan | | 5,587,705 A | 12/1996 | Morris |
| 5,382,778 A | 1/1995 | Takahira et al. | | 5,588,005 A | 12/1996 | Ali et al. |
| 5,383,134 A | 1/1995 | Wrzesinski | | 5,589,878 A | 12/1996 | Cortjens et al. |
| 5,383,187 A | 1/1995 | Vardakas et al. | | 5,590,038 A | 12/1996 | Pitroda |
| 5,390,206 A | 2/1995 | Rein | | 5,590,179 A | 12/1996 | Shincovich et al. |
| 5,406,619 A | 4/1995 | Akhteruzzman et al. | | 5,592,491 A | 1/1997 | Dinkins |
| 5,412,192 A | 5/1995 | Hoss | | 5,594,431 A | 1/1997 | Sheppard et al. |
| 5,412,654 A | 5/1995 | Perkins | | 5,596,719 A | 1/1997 | Ramakrishnan et al. |
| 5,412,760 A | 5/1995 | Peitz | | 5,596,722 A | 1/1997 | Rahnema |
| 5,416,475 A | 5/1995 | Tolbert et al. | | 5,602,843 A | 2/1997 | Gray |
| 5,416,725 A | 5/1995 | Pacheco et al. | | 5,604,414 A | 2/1997 | Milligan et al. |
| 5,418,812 A | 5/1995 | Reyes et al. | | 5,604,869 A | 2/1997 | Mincher et al. |
| 5,420,910 A | 5/1995 | Rudokas et al. | | 5,606,361 A | 2/1997 | Davidsohn et al. |
| 5,424,708 A | 6/1995 | Ballesty et al. | | 5,608,721 A | 3/1997 | Natarajan et al. |
| 5,430,729 A | 7/1995 | Rahnema | | 5,608,786 A | 3/1997 | Gordon |
| 5,432,507 A | 7/1995 | Mussino et al. | | 5,613,620 A | 3/1997 | Center et al. |
| 5,438,329 A | 8/1995 | Gastouniotis | | 5,615,227 A | 3/1997 | Schumacher, Jr. et al. |
| 5,439,414 A | 8/1995 | Jacob | | 5,615,277 A | 3/1997 | Hoffman |
| 5,440,545 A | 8/1995 | Buchholz et al. | | 5,617,084 A | 4/1997 | Sears |
| 5,442,553 A | 8/1995 | Parrillo | | 5,619,192 A | 4/1997 | Ayala |
| 5,442,633 A | 8/1995 | Perkins et al. | | 5,623,495 A | 4/1997 | Eng et al. |
| 5,445,287 A | 8/1995 | Center et al. | | 5,625,410 A | 4/1997 | Washino et al. |
| 5,445,347 A | 8/1995 | Ng | | 5,628,050 A | 5/1997 | McGraw et al. |
| 5,451,929 A | 9/1995 | Adelman et al. | | 5,629,687 A | 5/1997 | Sutton et al. |
| 5,451,938 A | 9/1995 | Brennan, Jr. | | 5,629,875 A | 5/1997 | Adair, Jr. |
| 5,452,344 A | 9/1995 | Larson | | 5,630,209 A | 5/1997 | Wizgall et al. |
| 5,454,024 A | 9/1995 | Lebowitz | | 5,631,554 A | 5/1997 | Briese et al. |
| 5,455,569 A | 10/1995 | Sherman et al. | | 5,636,216 A | 6/1997 | Fox et al. |
| 5,465,401 A | 11/1995 | Thompson | | 5,640,002 A | 6/1997 | Ruppert et al. |
| 5,467,074 A | 11/1995 | Pedtke | | 5,644,294 A | 7/1997 | Ness |
| 5,467,082 A | 11/1995 | Sanderson | | 5,655,219 A | 8/1997 | Jusa et al. |
| 5,467,345 A | 11/1995 | Cutler, Jr. et al. | | 5,657,389 A | 8/1997 | Houvener |
| 5,468,948 A | 11/1995 | Koenck et al. | | 5,659,300 A | 8/1997 | Dresselhuys et al. |
| 5,471,201 A | 11/1995 | Cerami et al. | | 5,659,303 A | 8/1997 | Adair, Jr. |
| 5,473,322 A | 12/1995 | Carney | | 5,668,876 A | 9/1997 | Falk et al. |
| 5,475,689 A | 12/1995 | Kay et al. | | 5,673,034 A * | 9/1997 | Saliga ........................ 340/5.26 |
| 5,479,400 A | 12/1995 | Dilworth et al. | | 5,673,252 A | 9/1997 | Johnson |
| 5,481,259 A | 1/1996 | Bane | | 5,673,304 A | 9/1997 | Connor et al. |
| 5,481,532 A | 1/1996 | Hassan et al. | | 5,673,305 A | 9/1997 | Ross |
| 5,484,997 A | 1/1996 | Haynes | | 5,682,139 A | 10/1997 | Pradeep et al. |
| 5,488,608 A | 1/1996 | Flammer, III | | 5,682,476 A | 10/1997 | Tapperson et al. |
| 5,493,273 A | 2/1996 | Smurlo et al. | | 5,689,229 A | 11/1997 | Chaco et al. |
| 5,493,287 A | 2/1996 | Bane | | 5,691,980 A | 11/1997 | Welles, II et al. |
| 5,502,726 A | 3/1996 | Fischer | | 5,696,695 A | 12/1997 | Ehlers et al. |
| 5,504,746 A | 4/1996 | Meier | | 5,699,328 A | 12/1997 | Ishizaki et al. |
| 5,506,837 A | 4/1996 | Sollner et al. | | 5,701,002 A | 12/1997 | Oishi et al. |
| 5,508,412 A | 4/1996 | Kast et al. | | 5,702,059 A | 12/1997 | Chu et al. |
| 5,509,073 A | 4/1996 | Monnin | | 5,704,046 A | 12/1997 | Hogan |
| 5,513,244 A | 4/1996 | Joao et al. | | 5,704,517 A | 1/1998 | Lancaster, Jr. |
| 5,515,419 A | 5/1996 | Sheffer | | 5,706,191 A | 1/1998 | Bassett et al. |
| 5,517,188 A | 5/1996 | Carroll et al. | | 5,706,976 A | 1/1998 | Purkey |
| 5,522,089 A | 5/1996 | Kikinis et al. | | 5,708,223 A | 1/1998 | Wyss |
| 5,528,215 A | 6/1996 | Siu et al. | | 5,708,655 A | 1/1998 | Toth et al. |
| 5,528,507 A | 6/1996 | McNamara et al. | | 5,712,619 A | 1/1998 | Simkin |
| 5,539,825 A | 7/1996 | Akiyama et al. | | 5,712,980 A | 1/1998 | Beeler et al. |
| 5,541,938 A | 7/1996 | Di Zenzo et al. | | 5,714,931 A | 2/1998 | Petite et al. |
| 5,542,100 A | 7/1996 | Hatakeyama | | 5,717,718 A | 2/1998 | Rowsell et al. |
| 5,544,036 A | 8/1996 | Brown, Jr. et al. | | 5,719,564 A | 2/1998 | Sears |
| 5,544,322 A | 8/1996 | Cheng et al. | | 5,726,544 A | 3/1998 | Lee |

| | | | | | |
|---|---|---|---|---|---|
| 5,726,634 A | 3/1998 | Hess et al. | 5,914,672 A | 6/1999 | Glorioso et al. |
| 5,726,644 A | 3/1998 | Jednacz et al. | 5,914,673 A | 6/1999 | Jennings et al. |
| 5,726,984 A | 3/1998 | Kubler et al. | 5,917,405 A | 6/1999 | Joao |
| 5,732,074 A | 3/1998 | Spaur et al. | 5,917,629 A | 6/1999 | Hortensius et al. |
| 5,732,078 A | 3/1998 | Arango | 5,923,269 A | 7/1999 | Shuey et al. |
| 5,736,965 A | 4/1998 | Mosebrook et al. | 5,926,101 A | 7/1999 | Dasgupta |
| 5,737,318 A | 4/1998 | Melnik | 5,926,103 A | 7/1999 | Petite |
| 5,740,232 A | 4/1998 | Pailles et al. | 5,926,529 A | 7/1999 | Hache et al. |
| 5,740,366 A | 4/1998 | Mahany et al. | 5,926,531 A | 7/1999 | Petite |
| 5,742,509 A | 4/1998 | Goldberg et al. | 5,933,073 A | 8/1999 | Shuey |
| 5,745,849 A | 4/1998 | Britton | 5,940,771 A | 8/1999 | Gollnick et al. |
| 5,748,104 A | 5/1998 | Argyroudis et al. | 5,941,363 A | 8/1999 | Partyka et al. |
| 5,748,619 A | 5/1998 | Meier | 5,941,955 A | 8/1999 | Wilby et al. |
| 5,754,111 A | 5/1998 | Garcia | 5,946,631 A | 8/1999 | Melnik |
| 5,754,227 A | 5/1998 | Fukuoka | 5,948,040 A | 9/1999 | DeLorme et al. |
| 5,757,783 A | 5/1998 | Eng et al. | 5,949,779 A | 9/1999 | Mostafa et al. |
| 5,757,788 A | 5/1998 | Tatsumi et al. | 5,949,799 A | 9/1999 | Grivna et al. |
| 5,760,742 A | 6/1998 | Branch et al. | 5,953,319 A | 9/1999 | Dutta et al. |
| 5,761,083 A | 6/1998 | Brown, Jr. et al. | 5,953,371 A | 9/1999 | Rowsell et al. |
| 5,764,742 A | 6/1998 | Howard et al. | 5,953,507 A | 9/1999 | Cheung et al. |
| 5,767,791 A | 6/1998 | Stoop et al. | 5,955,718 A | 9/1999 | Levasseur et al. |
| 5,771,274 A | 6/1998 | Harris | 5,957,718 A | 9/1999 | Cheng et al. |
| 5,774,052 A | 6/1998 | Hamm et al. | 5,960,074 A | 9/1999 | Clark |
| 5,781,143 A | 7/1998 | Rossin | 5,963,146 A | 10/1999 | Johnson et al. |
| 5,790,644 A | 8/1998 | Kikinis | 5,963,452 A | 10/1999 | Etoh et al. |
| 5,790,662 A | 8/1998 | Valerij et al. | 5,963,650 A | 10/1999 | Simionescu |
| 5,790,938 A | 8/1998 | Talarmo | 5,966,658 A | 10/1999 | Kennedy, III et al. |
| 5,796,727 A | 8/1998 | Harrison et al. | 5,969,608 A | 10/1999 | Sojdehei et al. |
| 5,798,964 A | 8/1998 | Shimizu et al. | 5,973,756 A | 10/1999 | Erlin |
| 5,801,643 A | 9/1998 | Williams et al. | 5,974,236 A | 10/1999 | Sherman |
| 5,812,531 A | 9/1998 | Cheung et al. | 5,978,364 A | 11/1999 | Melnik |
| 5,815,505 A | 9/1998 | Mills | 5,978,371 A | 11/1999 | Mason, Jr. et al. |
| 5,818,822 A | 10/1998 | Thomas et al. | 5,978,578 A | 11/1999 | Azarya et al. |
| 5,822,273 A | 10/1998 | Bary et al. | 5,986,574 A | 11/1999 | Colton |
| 5,822,309 A | 10/1998 | Ayanoglu et al. | 5,987,011 A | 11/1999 | Toh |
| 5,822,544 A | 10/1998 | Chaco et al. | 5,987,331 A * | 11/1999 | Grube et al. .................. 455/509 |
| 5,825,772 A | 10/1998 | Dobbins et al. | 5,987,421 A | 11/1999 | Chuang |
| 5,826,195 A | 10/1998 | Westerlage et al. | 5,991,625 A | 11/1999 | Vanderpool |
| 5,828,044 A | 10/1998 | Jun et al. | 5,991,639 A * | 11/1999 | Rautiola et al. ............ 455/414.1 |
| 5,832,057 A | 11/1998 | Furman | 5,994,892 A | 11/1999 | Turino et al. |
| 5,838,223 A | 11/1998 | Gallant et al. | 5,995,022 A | 11/1999 | Plis et al. |
| 5,838,237 A | 11/1998 | Revell et al. | 5,995,592 A | 11/1999 | Shirai et al. |
| 5,838,812 A | 11/1998 | Pare, Jr. et al. | 5,995,593 A | 11/1999 | Cho |
| 5,841,118 A | 11/1998 | East et al. | 5,997,170 A | 12/1999 | Brodbeck |
| 5,841,764 A | 11/1998 | Roderique et al. | 5,999,094 A | 12/1999 | Nilssen |
| 5,842,976 A | 12/1998 | Williamson | 6,005,759 A | 12/1999 | Hart et al. |
| 5,844,808 A | 12/1998 | Konsmo et al. | 6,005,884 A * | 12/1999 | Cook et al. .................. 375/132 |
| 5,845,230 A | 12/1998 | Lamberson | 6,005,963 A | 12/1999 | Bolle et al. |
| 5,848,054 A | 12/1998 | Mosebrook et al. | 6,018,659 A | 1/2000 | Ayyagari et al. |
| 5,852,658 A | 12/1998 | Knight et al. | 6,021,664 A | 2/2000 | Granato et al. |
| 5,854,994 A | 12/1998 | Canada et al. | 6,023,223 A | 2/2000 | Baxter, Jr. |
| 5,856,974 A | 1/1999 | Gervais et al. | 6,026,095 A * | 2/2000 | Sherer et al. .................. 370/448 |
| 5,862,201 A | 1/1999 | Sands | 6,028,522 A | 2/2000 | Petite |
| 5,864,772 A | 1/1999 | Alvarado et al. | 6,028,857 A | 2/2000 | Poor |
| 5,870,686 A | 2/1999 | Monson | 6,031,455 A | 2/2000 | Grube et al. |
| 5,872,773 A | 2/1999 | Katzela et al. | 6,032,197 A | 2/2000 | Birdwell et al. |
| 5,873,043 A | 2/1999 | Comer | 6,035,213 A | 3/2000 | Tokuda et al. |
| 5,874,903 A | 2/1999 | Shuey et al. | 6,035,266 A | 3/2000 | Williams et al. |
| 5,875,185 A | 2/1999 | Wang et al. | 6,036,086 A | 3/2000 | Sizer, II et al. |
| 5,880,677 A | 3/1999 | Lestician | 6,038,491 A | 3/2000 | McGarry et al. |
| 5,883,886 A | 3/1999 | Eaton et al. | 6,044,062 A | 3/2000 | Brownrigg et al. |
| 5,884,184 A | 3/1999 | Sheffer | 6,046,978 A | 4/2000 | Melnik |
| 5,884,271 A | 3/1999 | Pitroda | 6,054,920 A | 4/2000 | Smith et al. |
| 5,886,333 A | 3/1999 | Miyake | 6,055,561 A | 4/2000 | Feldman et al. |
| 5,889,468 A | 3/1999 | Banga | 6,060,994 A | 5/2000 | Chen |
| 5,892,690 A | 4/1999 | Boatman et al. | 6,061,604 A | 5/2000 | Russ et al. |
| 5,892,758 A | 4/1999 | Argyroudis | 6,064,318 A | 5/2000 | Kirchner |
| 5,892,924 A | 4/1999 | Lyon et al. | 6,067,017 A | 5/2000 | Stewart et al. |
| 5,896,097 A | 4/1999 | Cardozo | 6,067,030 A | 5/2000 | Burnett et al. |
| 5,897,607 A | 4/1999 | Jenney et al. | 6,069,886 A | 5/2000 | Ayerst et al. |
| 5,898,369 A | 4/1999 | Godwin | 6,073,169 A | 6/2000 | Shuey |
| 5,898,733 A | 4/1999 | Satyanarayana | 6,073,266 A | 6/2000 | Ahmed et al. |
| 5,905,438 A | 5/1999 | Weiss et al. | 6,073,840 A | 6/2000 | Marion |
| 5,905,442 A | 5/1999 | Mosebrook et al. | 6,075,451 A | 6/2000 | Lebowitz et al. |
| 5,907,291 A | 5/1999 | Chen et al. | 6,078,251 A | 6/2000 | Landt et al. |
| 5,907,491 A | 5/1999 | Canada | 6,084,867 A | 7/2000 | Meier |
| 5,907,540 A | 5/1999 | Hayashi | 6,087,957 A | 7/2000 | Gray |
| 5,907,807 A | 5/1999 | Chavez, Jr. et al. | 6,088,659 A | 7/2000 | Kelley et al. |
| 5,909,429 A | 6/1999 | Satyanarayana et al. | 6,094,622 A | 7/2000 | Hubbard et al. |

| | | | |
|---|---|---|---|
| 6,097,703 A | 8/2000 | Larsen et al. | |
| 6,100,816 A | 8/2000 | Moore | |
| 6,100,817 A | 8/2000 | Mason, Jr. et al. | |
| 6,101,427 A | 8/2000 | Yang | |
| 6,101,445 A | 8/2000 | Alvarado et al. | |
| 6,108,614 A | 8/2000 | Lincoln et al. | |
| 6,112,983 A | 9/2000 | D'Anniballe et al. | |
| 6,115,393 A | 9/2000 | Engel et al. | |
| 6,115,580 A | 9/2000 | Chuprun et al. | |
| 6,119,076 A | 9/2000 | Williams et al. | |
| 6,121,593 A | 9/2000 | Mansbery et al. | |
| 6,121,885 A | 9/2000 | Masone et al. | |
| 6,122,759 A | 9/2000 | Ayanoglu et al. | |
| 6,124,806 A | 9/2000 | Cunningham et al. | |
| 6,127,917 A | 10/2000 | Tuttle | |
| 6,128,551 A | 10/2000 | Davis et al. | |
| 6,130,622 A | 10/2000 | Hussey et al. | |
| 6,133,850 A | 10/2000 | Moore | |
| 6,137,423 A | 10/2000 | Glorioso et al. | |
| 6,140,975 A | 10/2000 | Cohen | |
| 6,141,347 A | 10/2000 | Shaughnessy et al. | |
| 6,150,936 A | 11/2000 | Addy | |
| 6,150,955 A | 11/2000 | Tracy et al. | |
| 6,157,464 A | 12/2000 | Bloomfield et al. | |
| 6,157,824 A | 12/2000 | Bailey | |
| 6,163,276 A | 12/2000 | Irving et al. | |
| 6,167,239 A | 12/2000 | Wright et al. | |
| 6,172,616 B1 | 1/2001 | Johnson et al. | |
| 6,173,159 B1 | 1/2001 | Wright et al. | |
| 6,174,205 B1 | 1/2001 | Madsen et al. | |
| 6,175,922 B1 | 1/2001 | Wang | |
| 6,177,883 B1 | 1/2001 | Jennetti et al. | |
| 6,181,255 B1 | 1/2001 | Crimmins et al. | |
| 6,181,284 B1 | 1/2001 | Madsen et al. | |
| 6,181,981 B1 | 1/2001 | Varga et al. | |
| 6,185,307 B1 | 2/2001 | Johnson, Jr. | |
| 6,188,354 B1 | 2/2001 | Soliman et al. | |
| 6,188,675 B1 | 2/2001 | Casper et al. | |
| 6,192,282 B1 | 2/2001 | Smith et al. | |
| 6,192,390 B1 | 2/2001 | Berger et al. | |
| 6,195,018 B1 | 2/2001 | Ragle et al. | |
| 6,198,390 B1 | 3/2001 | Schlager et al. | |
| 6,199,068 B1 | 3/2001 | Carpenter | |
| 6,201,962 B1 | 3/2001 | Sturniolo et al. | |
| 6,205,143 B1 | 3/2001 | Lemieux | |
| 6,208,247 B1 | 3/2001 | Agre et al. | |
| 6,208,266 B1* | 3/2001 | Lyons et al. | |
| 6,212,175 B1 | 4/2001 | Harsch | |
| 6,215,404 B1 | 4/2001 | Morales | |
| 6,218,953 B1* | 4/2001 | Petite | |
| 6,218,958 B1 | 4/2001 | Eichstaedt | |
| 6,218,983 B1* | 4/2001 | Kerry et al. | |
| 6,219,409 B1* | 4/2001 | Smith et al. | |
| 6,229,439 B1* | 5/2001 | Tice | |
| 6,233,327 B1* | 5/2001 | Petite | |
| 6,234,111 B1* | 5/2001 | Ulman et al. | |
| 6,236,332 B1* | 5/2001 | Conkright et al. | |
| 6,243,010 B1* | 6/2001 | Addy et al. | |
| 6,246,676 B1 | 6/2001 | Chen et al. | |
| 6,246,677 B1 | 6/2001 | Nap | |
| 6,246,886 B1 | 6/2001 | Olivia | |
| 6,249,516 B1 | 6/2001 | Brownrigg et al. | |
| 6,259,369 B1* | 7/2001 | Monico | |
| 6,271,752 B1 | 8/2001 | Vaios | |
| 6,275,166 B1 | 8/2001 | del Castillo et al. | |
| 6,275,707 B1 | 8/2001 | Reed et al. | |
| 6,286,050 B1 | 9/2001 | Pullen et al. | |
| 6,286,756 B1* | 9/2001 | Stinson et al. | |
| 6,288,634 B1* | 9/2001 | Weiss et al. | |
| 6,288,641 B1 | 9/2001 | Casais | |
| 6,295,291 B1* | 9/2001 | Larkins | |
| 6,301,514 B1 | 10/2001 | Canada | |
| 6,304,556 B1 | 10/2001 | Haas | |
| 6,305,205 B1 | 10/2001 | Derks et al. | |
| 6,305,602 B1* | 10/2001 | Grabowski et al. | |
| 6,307,843 B1 | 10/2001 | Okanoue | |
| 6,308,111 B1* | 10/2001 | Koga | |
| 6,311,167 B1* | 10/2001 | Davis et al. | |
| 6,314,169 B1* | 11/2001 | Schelberg, Jr. et al. | |
| 6,317,029 B1* | 11/2001 | Fleeter | |
| 6,327,245 B1 | 12/2001 | Satyanarayana et al. | |
| 6,329,902 B1 | 12/2001 | Lee et al. | |
| 6,334,117 B1* | 12/2001 | Covert et al. | |
| 6,346,890 B1* | 2/2002 | Bellin | 340/9.11 |
| 6,351,223 B1* | 2/2002 | DeWeerd et al. | |
| 6,356,205 B1* | 3/2002 | Salvo et al. | |
| 6,357,034 B1* | 3/2002 | Muller et al. | |
| 6,362,745 B1* | 3/2002 | Davis | |
| 6,363,057 B1* | 3/2002 | Ardalan et al. | |
| 6,363,422 B1 | 3/2002 | Hunter et al. | |
| 6,366,217 B1 | 4/2002 | Cunningham | |
| 6,366,622 B1 | 4/2002 | Brown et al. | |
| 6,369,769 B1* | 4/2002 | Nap et al. | |
| 6,370,489 B1* | 4/2002 | Williams et al. | |
| 6,373,399 B1* | 4/2002 | Johnson et al. | |
| 6,380,851 B1* | 4/2002 | Gilbert et al. | |
| 6,384,722 B1 | 5/2002 | Williams | |
| 6,392,692 B1 | 5/2002 | Monroe | |
| 6,393,341 B1 | 5/2002 | Lawrence et al. | |
| 6,393,381 B1 | 5/2002 | Williams et al. | |
| 6,393,382 B1 | 5/2002 | Williams et al. | |
| 6,396,839 B1 | 5/2002 | Ardalan | |
| 6,400,819 B1 | 6/2002 | Nakano et al. | |
| 6,401,081 B1 | 6/2002 | Montgomery et al. | |
| 6,405,018 B1 | 6/2002 | Reudink et al. | |
| 6,411,889 B1 | 6/2002 | Mizunuma et al. | |
| 6,415,155 B1* | 7/2002 | Koshima et al. | 455/456.1 |
| 6,415,245 B2 | 7/2002 | Williams et al. | |
| 6,416,471 B1 | 7/2002 | Kumar et al. | |
| 6,421,354 B1 | 7/2002 | Godlewski | |
| 6,421,731 B1 | 7/2002 | Ciotti, Jr. et al. | |
| 6,422,464 B1 | 7/2002 | Terranova | |
| 6,424,270 B1 | 7/2002 | Ali | |
| 6,424,931 B1 | 7/2002 | Sigmar et al. | |
| 6,430,268 B1 | 8/2002 | Petite | |
| 6,431,439 B1 | 8/2002 | Suer et al. | |
| 6,437,692 B1 | 8/2002 | Petite et al. | |
| 6,438,575 B1 | 8/2002 | Khan et al. | |
| 6,441,723 B1* | 8/2002 | Mansfield et al. | 340/538.11 |
| 6,445,291 B2 | 9/2002 | Addy et al. | |
| 6,456,960 B1 | 9/2002 | Williams et al. | |
| 6,457,038 B1 | 9/2002 | Defosse | |
| 6,462,644 B1 | 10/2002 | Howell et al. | |
| 6,462,672 B1 | 10/2002 | Besson | |
| 6,477,558 B1 | 11/2002 | Irving et al. | |
| 6,483,290 B1 | 11/2002 | Hemminger et al. | |
| 6,484,939 B1 | 11/2002 | Blaeuer | |
| 6,489,884 B1 | 12/2002 | Lamberson et al. | |
| 6,491,828 B1 | 12/2002 | Sivavec et al. | |
| 6,492,910 B1 | 12/2002 | Ragle et al. | |
| 6,496,696 B1 | 12/2002 | Melnik | |
| 6,504,357 B1 | 1/2003 | Hemminger et al. | |
| 6,504,834 B1 | 1/2003 | Fifield | |
| 6,507,794 B1 | 1/2003 | Hubbard et al. | |
| 6,509,722 B2 | 1/2003 | Lopata | |
| 6,513,060 B1 | 1/2003 | Nixon et al. | |
| 6,515,586 B1 | 2/2003 | Wymore | |
| 6,519,568 B1 | 2/2003 | Harvey et al. | |
| 6,538,577 B1 | 3/2003 | Ehrke et al. | |
| 6,542,076 B1 | 4/2003 | Joao | |
| 6,542,077 B1 | 4/2003 | Joao | |
| 6,543,690 B2 | 4/2003 | Leydier et al. | |
| 6,560,223 B1 | 5/2003 | Mastronardi et al. | |
| 6,574,234 B1 | 6/2003 | Myer et al. | |
| 6,574,603 B1 | 6/2003 | Dickson et al. | |
| 6,584,080 B1 | 6/2003 | Ganz et al. | |
| 6,600,726 B1 | 7/2003 | Nevo et al. | |
| 6,608,551 B1 | 8/2003 | Anderson et al. | |
| 6,611,537 B1* | 8/2003 | Edens et al. | 370/503 |
| 6,618,578 B1 | 9/2003 | Petite | |
| 6,618,709 B1 | 9/2003 | Sneeringer | |
| 6,628,764 B1 | 9/2003 | Petite | |
| 6,628,965 B1 | 9/2003 | LaRosa et al. | |
| 6,653,945 B2 | 11/2003 | Johnson et al. | |
| 6,654,357 B1* | 11/2003 | Wiedeman | 370/315 |
| 6,665,278 B2 | 12/2003 | Grayson | |
| 6,671,586 B2 | 12/2003 | Davis et al. | |
| 6,674,403 B2 | 1/2004 | Gray et al. | |

| | | |
|---|---|---|
| 6,678,255 B1 | 1/2004 | Kuriyan |
| 6,678,285 B1 | 1/2004 | Garg |
| 6,691,173 B2 | 2/2004 | Morris et al. |
| 6,731,201 B1 | 5/2004 | Bailey et al. |
| 6,735,630 B1 | 5/2004 | Gelvin et al. |
| 6,747,557 B1 | 6/2004 | Petite et al. |
| 6,771,981 B1 | 8/2004 | Zalewski et al. |
| 6,775,258 B1 | 8/2004 | van Valkenburg et al. |
| 6,804,532 B1 | 10/2004 | Moon et al. |
| 6,816,088 B1 | 11/2004 | Knoska et al. |
| 6,826,607 B1 | 11/2004 | Gelvin et al. |
| 6,832,251 B1 | 12/2004 | Gelvin et al. |
| 6,842,430 B1 | 1/2005 | Melnik |
| 6,858,876 B2 | 2/2005 | Gordon et al. |
| 6,859,831 B1 | 2/2005 | Gelvin et al. |
| 6,888,876 B1 | 5/2005 | Mason, Jr. et al. |
| 6,891,838 B1 | 5/2005 | Petite |
| 6,900,737 B1 | 5/2005 | Ardalan et al. |
| 6,906,636 B1 | 6/2005 | Kraml |
| 6,914,533 B2 | 7/2005 | Petite |
| 6,914,893 B2 | 7/2005 | Petite |
| 6,922,558 B2 * | 7/2005 | Delp et al. ............ 455/420 |
| 6,959,550 B2 | 11/2005 | Freeman et al. |
| 6,970,434 B1 | 11/2005 | Mahany et al. |
| 7,020,701 B1 * | 3/2006 | Gelvin et al. ............ 709/224 |
| 7,027,416 B1 | 4/2006 | Kriz |
| 7,027,773 B1 | 4/2006 | McMillin |
| 7,053,767 B2 | 5/2006 | Petite et al. |
| 7,054,271 B2 | 5/2006 | Brownrigg et al. |
| 7,064,679 B2 | 6/2006 | Ehrke et al. |
| 7,117,239 B1 | 10/2006 | Hansen |
| 7,181,501 B2 | 2/2007 | Defosse |
| 7,254,372 B2 | 8/2007 | Janusz et al. |
| 7,304,587 B2 | 12/2007 | Boaz |
| 7,349,682 B1 | 3/2008 | Bennett, III et al. |
| 7,424,527 B2 | 9/2008 | Petite |
| 7,468,661 B2 | 12/2008 | Petite et al. |
| 7,480,501 B2 | 1/2009 | Petite |
| 7,484,008 B1 | 1/2009 | Gelvin et al. |
| 7,573,813 B2 | 8/2009 | Melnik |
| 7,653,394 B2 | 1/2010 | McMillin |
| 7,739,378 B2 | 6/2010 | Petite |
| 2001/0002210 A1 | 5/2001 | Petite |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0013679 A1 | 1/2002 | Petite |
| 2002/1112323 | 1/2002 | Petite |
| 2002/0016829 A1 | 2/2002 | Defosse |
| 2002/0019725 A1 | 2/2002 | Petite |
| 2002/0027504 A1 | 3/2002 | Petite et al. |
| 2002/0031101 A1 | 3/2002 | Petite |
| 2002/0032746 A1 | 3/2002 | Lazaridis |
| 2002/0061031 A1 | 5/2002 | Sugar et al. |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0098858 A1 | 7/2002 | Struhsaker |
| 2002/0109607 A1 | 8/2002 | Cumeralto et al. |
| 2002/0136233 A1 | 9/2002 | Chen et al. |
| 2002/0158774 A1 | 10/2002 | Johnson et al. |
| 2002/0163442 A1 | 11/2002 | Fischer |
| 2002/0169643 A1 | 11/2002 | Petite |
| 2002/0193144 A1 | 12/2002 | Belski et al. |
| 2003/0001754 A1 | 1/2003 | Johnson et al. |
| 2003/0023146 A1 * | 1/2003 | Shusterman ............ 600/300 |
| 2003/0028632 A1 | 2/2003 | Davis |
| 2003/0030926 A1 | 2/2003 | Aguren et al. |
| 2003/0034900 A1 | 2/2003 | Han |
| 2003/0035438 A1 * | 2/2003 | Larsson ............ 370/466 |
| 2003/0036822 A1 | 2/2003 | Davis et al. |
| 2003/0046377 A1 | 3/2003 | Daum et al. |
| 2003/0058818 A1 | 3/2003 | Wilkes et al. |
| 2003/0069002 A1 | 4/2003 | Hunter et al. |
| 2003/0073406 A1 | 4/2003 | Benjamin et al. |
| 2003/0078029 A1 | 4/2003 | Petite |
| 2003/0093484 A1 | 5/2003 | Petite |
| 2003/0133473 A1 | 7/2003 | Manis et al. |
| 2003/0169710 A1 | 9/2003 | Fan et al. |
| 2003/0185204 A1 | 10/2003 | Murdock |
| 2003/0210638 A1 | 11/2003 | Yoo |
| 2004/0047324 A1 | 3/2004 | Diener |
| 2004/0053639 A1 | 3/2004 | Petite |
| 2004/0090950 A1 | 5/2004 | Lauber et al. |
| 2004/0113810 A1 | 6/2004 | Mason, Jr. et al. |
| 2004/0131125 A1 | 7/2004 | Sanderford, Jr. et al. |
| 2004/0133917 A1 | 7/2004 | Schilling |
| 2004/0183687 A1 | 9/2004 | Petite |
| 2004/0228330 A1 | 11/2004 | Kubler et al. |
| 2005/0017068 A1 | 1/2005 | Zalewski et al. |
| 2005/0190055 A1 | 9/2005 | Petite |
| 2005/0195768 A1 | 9/2005 | Petite |
| 2005/0195775 A1 | 9/2005 | Petite |
| 2005/0201397 A1 | 9/2005 | Petite |
| 2005/0243867 A1 | 11/2005 | Petite |
| 2005/0270173 A1 | 12/2005 | Boaz |
| 2006/0098576 A1 | 5/2006 | Brownrigg et al. |
| 2007/0112907 A1 | 5/2007 | Defosse |
| 2008/0186898 A1 | 8/2008 | Petite |
| 2009/0006617 A1 | 1/2009 | Petite |
| 2009/0068947 A1 | 3/2009 | Petite |
| 2009/0096605 A1 | 4/2009 | Petite |
| 2009/0215424 A1 | 8/2009 | Petite |
| 2009/0243840 A1 | 10/2009 | Petite et al. |
| 2010/0250054 A1 | 9/2010 | Petite |

FOREIGN PATENT DOCUMENTS

| | | |
|---|---|---|
| EP | 0578041 B1 | 1/1994 |
| EP | 0663746 B1 | 7/1995 |
| EP | 0718954 | 6/1996 |
| EP | 0740873 B1 | 11/1996 |
| EP | 0749259 A2 | 12/1996 |
| EP | 0749260 A2 | 12/1996 |
| EP | 0766489 A2 | 4/1997 |
| EP | 0768777 A2 | 4/1997 |
| EP | 0812502 B1 | 12/1997 |
| EP | 07144 | 2/1998 |
| EP | 0825577 A1 | 2/1998 |
| EP | 0999717 A2 | 5/2000 |
| EP | 1096454 | 5/2001 |
| FR | 2817110 | 5/2002 |
| GB | 2229302 | 9/1990 |
| GB | 2247761 | 3/1992 |
| GB | 2262683 | 6/1993 |
| GB | 2297663 | 8/1996 |
| GB | 2310779 | 9/1997 |
| GB | 2326002 | 12/1998 |
| GB | 2336272 | 10/1999 |
| GB | 2352004 | 1/2001 |
| GB | 2352590 | 1/2001 |
| JP | 60261288 | 12/1985 |
| JP | 01255100 | 10/1989 |
| JP | 11353573 | 12/1999 |
| JP | 200113590 | 4/2000 |
| JP | 2001063425 | 3/2001 |
| JP | 2001088401 | 4/2001 |
| JP | 2001309069 | 11/2001 |
| JP | 2001319284 | 11/2001 |
| JP | 2001357483 | 12/2001 |
| JP | 2002007672 | 1/2002 |
| JP | 2002007826 | 1/2002 |
| JP | 2002085354 | 3/2002 |
| JP | 2002171354 | 6/2002 |
| KR | 2001025431 A | 4/2001 |
| WO | WO 90/13197 | 11/1990 |
| WO | WO 95/12942 | 5/1995 |
| WO | 9524177 | 9/1995 |
| WO | WO 95/34177 | 12/1995 |
| WO | WO 96/10307 | 4/1996 |
| WO | WO 98/00056 | 1/1998 |
| WO | WO98/10393 A1 | 3/1998 |
| WO | WO 98/37528 | 8/1998 |
| WO | WO 98/45717 | 10/1998 |
| WO | WO 99/13426 | 3/1999 |
| WO | 0023956 | 4/2000 |

| | | |
|---|---|---|
| WO | WO 00/36812 A1 | 6/2000 |
| WO | WO 01/15114 | 8/2000 |
| WO | WO 01/24109 | 4/2001 |
| WO | WO 02/08725 | 1/2002 |
| WO | WO 02/08866 | 1/2002 |
| WO | WO 02/052521 | 7/2002 |
| WO | WO 03/007264 | 1/2003 |
| WO | WO 03/021877 | 3/2003 |
| WO | 0402014 | 12/2003 |

OTHER PUBLICATIONS

Brownrigg, E.B. et al.; A Packet Radio Networks; Architectures, Protocols, Technologies and Applications (1987), (introduction pp. ix-xviii); pp. 3-274.
Brownrigg, E.B. et al.; Distributions, Networks, and Networking: Options for Dissemination; Workshop on Electronic Texts Session III (http://palimpsest.standford.edu/byorg/lc/etextw/sess3.html 1992): pp. 1-10.
Brownrigg, E.B. et al.; User Provided Access to the Internet; (http://web.simmons.edu/~chen/nit/NIT'92/033-bro.htm 2005) pp. 1-6.
Wey, Jyhi-Kong et al.; Clone Terminator: An Authentication Service for Advanced Mobile Phone System; IEEE (1995); pp. 175-179.
Davis, A.B. et al.; Knowledge-Based Management of Cellular Clone Fraud; IEEE (1992); pp. 230-234.
Johnson, David B.; Routing in Ad Hoc Networks of Mobile Hosts; IEEE (1995); pp. 158-163.
Jubin, John and Tornow, Janet D., "The Darpa Packet Radio Network Protocols,"Proceedings of the IEEE, vol. 75, No. 1, Jan. 1987, pp. 21-32.
Kleinrock, Leonard and Kamoun, Farouk, "Hierarchical Routing for Large Networks," North-Holland Publishing Company, Computer Networks 1, 1997, pp. 155-174.
Perkins, C.E. et al.; Highly Dynamic Destination-Sequenced Distance-Vector Routing (DSDV) for Mobile Computers; SIGCOMM 94-9/94 London England UK (1994); pp. 234-244.
Wu, J.; Distributed System Design; CRC Press (1999); pp. 177-180 and 204.
Khan, Robert E., Gronemeyer, Steven A. Burchfiel, Jerry, and Kunzelman, Ronald C., "Advances in Packet Radio Technology" IEEE Nov. 1978, vol. 66, No. 11, pp. 1468-2149.
Westcott, Jil et al., "A Distributed Routing Design for a Broadcast Environment", IEEE 1982, pp. 10.4.0-10.4.5.
Khan, Robert E. et al., "Advances in Packet Radio Technology", IEEE Nov. 1978, vol. 66, No. 11, pp. 1468-1496.
Frankel, Michael S., "Packet Radios Provide Link for Distributed, Survivable C3 in Post-Attack Scenarios", MSN Jun. 1983.
Lauer, Greg et al., "Survivable Protocols for Large Scale Packet Radio Networks", IEEE 1984, pp. 15.1-1 to 15.1-4.
Gower, Neil et al., "Congestion Control Using Pacing in a Packet Radio Network", IEEE 1982, pp. 23.1-1 to 23.1-6.
MacGregor, William M et al., "Multiple Control Stations in Packet Radio Networks", IEEE 1982, pp. 10.3-1 to 10.3-5.
Shacham, Nachum et al., "Future Directions in Packet Radio Technology", IEEE 1985, pp. 93-98.
Jubin, John, "Current Packet Radio Network Protocols", IEEE 1985, pp. 86-92.
Westcott, Jill A., Issues in Distributed Routing for Mobile Packet Radio Network, IEEE 1982, pp. 233 238.
Lynch, Clifford A. et al., Packet Radio Networks, "Architectures, Protocols, Technologies and Applications,".
Brownrigg, Edwin, "User Provided Access to the Internet,", Open Access Solutions, http://web.simmons.edu/chen/nit/NIT'92/033-bro.htm, Jun. 8, 2005-Jun. 9, 2005.
Babak Daneshrad, et al.; 1997 Project Summary "Mobile Versatile Radios (MoVeR);"University of California, Los Angeles; pp. 1-4.
Rajeev Jain, et al.; 1997 Project Summary "Held Untethered Nodes;" University of California, Los Angeles; pp. 1-5.
Randy H. Katz and Eric A. Brewer; 1997 Project Summary "Towards a Wireless Overlay Internetworking Architecture;" University of California, Berkeley; pp. 1-8, including slide show presentation at http://daedalus.cs.berkeley,edu/talks/retreat.6.96/Overview.pdf.
J.J. Garcia-Luna-Aceves, et al.; "Wireless Internet Gateways (Wings);" IEEE, 1997; pp. 1271-1276.

Randy H. Katz, et al.; "The Bay Area Research Wireless Access Network (BARWAN);" Electrical Engeneering and Computer Science Department, University of California, Berkeley, CA; IEEE, 1996; pp. 15-20, including slide show presentation at http://daedalus.cs.berkeley.edu/talks/retreat.6.97/BARWAN.S97.ppt.
USPO's Decision dated Nov. 28, 2008 Denying Ex Parte Reexamination of USPN 7,103,511 in Reexamination Control No. 90/010,315.
USPTO's Decision dated Jun. 22, 2009 Granting Ex Parte Reexamination of USPN 7,103,511 in Reexamination Control No. 90/010,509.
USPTO's Decision dated Jun. 22, 2009 Granting Ex Parte Reexamination of USPN 7,103,511 in Reexamination Contol No. 90/010,505.
USPTO's Decision dated Jun. 22, 2009 Granting Ex Parte Reexamination of USPN 7,103,511 in Reexamination Control No. 90/010,507.
USPTO's Decision dated Jun. 22, 2009 Granting Ex Parte Reexamination of USPN 7,103,511 in Reexamination Control No. 90/010,508.
USPTO's Decision dated Jul. 21, 2009 Granting Ex Parte Reexamination of USPN 6,891,838 in Reexamination Control No. 90/010,512.
USPTO's Decision dated Jul. 21, 2009 Granting Ex Parte Reexamination of USPN 6,891,838 in Reexamination Control No. 90/010,510.
USPTO's Decision dated Jul. 21, 2009 Granting Ex Parte Reexamination of USPN 6,891,838 in Reexamination Control No. 90/010,511.
USPTO's Decision dated Nov. 13, 2008 Granting Ex Parte Reexamination of USPN 6,891,838 in Reexamination Control No. 90/010,301.
K. Bult, et al.; "Low Power Systems for Wireless Microsensors;" UCLA Electrical Engineering Department, Los Angeles, CA and Rockwell Science Center, Thousand Oaks, CA; pp. 25-29.
David B. Johnnson and David A. Maltz, Dynamic Source Routing in Ad Hoc Wireless Networks; Computer Science Department, Carnegie Mellon University; a chapter in Mobile Computing; Feb. 29, 1996; pp. 1-18.
David A. Maltz et al.; Experiences Designing and Building a Multi-Hop Wireless Ad Hoc Network Testbed; School of Computer Science, Carnegie Mellon University; Mar. 5, 1999; pp. 1-20.
"Part 11: Wireless LAN Medium Access Control (MAC) and Physical Layer (PHY) Specifications;" IEEE Std 802.11-1997; published Jun. 26, 1997 by the IEEE; pp. 1-459.
John Jubin and Janet D. Tornow; "The DARPA Packet Radio Network Protocols;" Proceedings of the IEEE; vol. 75, No. 1, Jan. 1987; pp. 64-79.
Chane Lee Fullmer; "Collision Avoidance Techniques for Packet-Radio Networks" thesis; University of California at Santa Cruz, CA; Jun. 1998; pp. 1-172.
Ex Parte Reexamination Request Leading to Reexamination of USPN 6,891,838 in USPTO Reexamination Proceeding Control No. 90/010,512.
Ex Parte Reexamination Request Leading to Reexamination of USPN 6,891,838 in USPTO Reexamination Proceeding Control No. 90/010,510.
Ex Parte Reexamination Request Leading to Reexamination of USPN 6,891,838 in USPTO Reexamination Proceeding Control No. 90/010,511.
Ex Parte Reexamination Request Leading to Reexamination of USPN 6,891,838 in USPTO Reexamination Proceeding Control No. 90/010,301.
90-008011 Request for Ex Parte Reexamination of 6,044,062.
90-008011 Grant of Reexamination Request.
90-008011 Non-Final Office Action dated Nov. 19, 2007.
90-008011 Final Office Action dated Aug. 13, 2008.
90-010301 Request for Ex Parte Reexamination of 6,891,838.
90-010315 Request for Ex Parte Reexamination of 7,103,511.
90-008011 Final Office Action dated Aug. 13, 2008.
90-010315 Petition to Review Denial of Request for Reexamination.
90-010510 Request for Ex Parte Reexamination of 6,891,838.
90-010505 Substitute Request for Ex Parte Reexamination of 7,103,511.

90-010507 Substitute Request for Ex Parte Reexamination of 7,103,511.
90-010508 Non-Final Office Action dated Mar. 3, 2010.
90-010509 Non-Final Office Action dated Mar. 3, 2010.
90-008011 Examiner Answer to Appeal Brief.
90-010505 Final Office Action dated Aug. 2, 2010.
90-010507 Final Office Action dated Aug. 2, 2010.
90-010508 Final Office Action dated Aug. 2, 2010.
90-010509 Final Office Action dated Aug. 2, 2010.
90-010510 Final Office Action dated Aug. 20, 2010.
90-010511 Final Office Action dated Aug. 20, 2010.
90-010512 Final Office Action dated Aug. 20, 2010.
90-010301 Final Office Action dated Nov. 5, 2010.
90-010510 Final Office Action dated Nov. 5, 2010.
90-010511 Final Office Action dated Nov. 5, 2010.
90-010512 Final Office Action dated Nov. 5, 2010.
90-008011 BPAI Decision.
90-010510 Non-Final Office Action dated Dec. 2, 2009.
90-010511 Non-Final Office Action dated Dec. 2, 2009.
90-010512 Non-Final Office Action dated Dec. 2, 2009.
90-010301 Notice of Intent to Issue Reexam Certificate dated Dec. 13, 2010.
90-010509 Substitute Request for Ex Parte Reexamination of 7,103,511.
90-010510 Substitute Request for Ex Parte Reexamination of 6,891,838.
90-010511 Substitute Request for Ex Parte Reexamination of 6,891,838.
90-010512 Substitute Request for Ex Parte Reexamination of 6,891,838.
90-010507 Non-Final Office Action dated Mar. 3, 2010.
Custom Solutions, Inc., HomeVision-PC Version 2.62, Owner's Manual (1997), pp. 1-234.
Custom Solutions, Inc., Media Information, Feb. 16, 1999, available at http://web.archive.org/web/19990502073249/www.csi3.com/hv_media.htm on Feb. 27, 2009, pp. 1-2.
Custom Solutions, Inc., Using Enerzone StatNet Thermostats with HomeVision (1998) pp. 1-16.
Davies et al., "Internetworking in the Military Environment," Proceedings of IEEE Infocom '82 (1982) pp. 19-29.
Davies et al., "The Application of Packet Switching Techniques to Combat Net Radio," Proceedings of the IEEE, vol. 75, No. 1, Jan. 1987, pp. 43-55.
Deering et al., "Internet Protocol, Version 6 (IPv6)," RFC1883, Publisher: unknown, Dec. 1995, pp. 1-37.
Deering et al., "Internet Protocol, Version 6 (IPv6)," RFC2460, The Internet Society, Dec. 1998, pp. 1-39.
Diaz, "Intervehicular Information System (IVIS): the Basis for a Tactical Information System," SAE International, Mar. 1994, pp. 1-14.
Dixon et al., "Addressing, Bridging and Source Routing," IEEE Network, Jan. 1988, vol. 2, No. 1, pp. 25-32.
Dong et al., "Low Power Signal Processing Architectures for Network Microsensors," ACM, 1997, pp. 173-177.
Echelon Corp., "LonTalk® Protocol Specification," Doc. No. 19550, available at http://www.enerlon.com/JobAids/Lontalk%20Protocol%2 0Spec.pdf (1994).
Echelon Corp., "Series 90™-30 PLC LonWorks® Bus Interface Module User's Manual," Doc. No. GFK-1322A, available at http://www.pdfsupply.com/pdfs/gfk1322a.pdf (1997).
Elson et al., "Fine-Grained Network Time Synchronization Using Reference Broadcasts," UCLA Computer Science Department, May 17, 2002, pp. 1-14.
Eng et al., "Bahama: A Broadband Ad-Hoc Wireless ATM Local-Area Network," 1995 IEEE International Conference on Communications, Jun. 18-22, 1995, pp. 1216-1223.
Ephremides et al., "A Design Concept for Reliable Mobile Radio Networks with a Frequency Hopping Signaling," IEEE 1987, pp. 1-18.
ESTeem Application Paper—AgriNorthwest Employee's Provide Wireless Control System (describing a system that was in use prior to Mar. 1999).
ESTeem Application Paper—Allen-Bradley Goes Wireless on Alaska's North Slope (describing a system that was in use prior to Mar. 1999).
ESTeem Application Paper—Build Your Own Wireless Power Distribution System (describing a system that was in use prior to Mar. 1999).
ESTeem Application Paper—Lost Cabin Gas Plant Uses Wireless Control to Enhance Production & Safety (describing a system that was in use prior to Mar. 1999).
ESTeem Application Paper—Northwest Farm Applies Wireless Solution (describing a system that was in use prior to Mar. 1999).
ESTeem Application Paper—Wireless Control of Polluted Water (describing a system that was in use prior to Mar. 1999).
ESTeem Application Paper—Wireless Mobile Mapping System (describing a system that was in use prior to Mar. 1999).
ESTeem Application Paper—Wireless Networking for Kodiak's Coast Guard Station (describing a system that was in use prior to Mar. 1999).
ESTeem Application Paper—Wireless Networking for Natural Gas Extraction (describing a system that was in use prior to Mar. 1999).
ESTeem Models 85, 95, 96, & 98 User's Manual (describing the ESTeem 96C and 96F radios used prior to 1999).
Estrin et al., "Next Century Challenges: Scallable Coordination in Sensor Networks," ACM, 1999, pp. 263-270.
Estrin et al., "RFC1940-Source Demand Routing: Packet Format and Forwarding Specification (Version 1)," Network Working Group, May 1996, available at http://www.faqs.org/rfcs/rfc1940.html, Sep. 14, 2009, pp. 1-20.
Estrin et al., "Source Demand Routing: Packet Format and Forwarding Specification (Version 1)", Network Working Group, Internet Draft, Jan. 19, 1995, pp. 1-28.
Federal Communications Commission, "Notice of Proposed Rule Making and Order," Adopted Dec. 17, 2003, Released Dec. 30, 2003 (54 pages).
Frank, "Transmission of IP Datagrams Over NET/ROM Networks, ARRL Amateur Radio 7th Computer Networking Conference," Oct. 1988, pp. 65-70.
Frank, "Understanding Smart Sensors," Artech House (1996).
Franz, "HiperLAN—Der ETSI-Standard fur locale Funknetze," NTZ, Sep. 1995, 10 pages.
Gale et al., "The Impact of Optical Media on Information Publishing," Bulletin of the American Society for Information Science, vol. 12, No. 6, Aug./Sep. 1986, pp. 12-14.
Garbee, "Thoughts on the Issues of Address Resolution and Routing in Amateur Packet Radio TCP/IP Networks," ARRL Amateur Radio 6th Computer Networking Conference, Aug. 1987, p. 56-58.
Garcia-Luna-Aceves, "A Fail-Safe Routing Algorithm for Multishop Packet-Radio Networks," IEEE Infocom '86, Technical Sessions: Apr. 8-10, 1986, pp. 434-442.
Garcia-Luna-Aceves, "A Minimum-hop Routing Algorithm Based on Distributed Information," Elsevier Science Publishers, B.V. (North Holland), 1989, pp. 367-382.
Garcia-Luna-Aceves, "Routing Management in Very Large Scale Networks," Elsevier Science Publishers, B.V. (North Holland), 1988, pp. 81-93.
Ge Security, "NetworkX NX-4," 2004, pp. 1-2.
Ge Security, "NetworkX NX-548E," 2006, pp. 1-2.
Geier et al., "Networking Routing Techniques and their Relevance to Packet Radio Networks," ARRL/CRRL Amateur Radio 6th Computer Networking Conference, London, Ontario, Canada, Sep. 1990, pp. 105-117.
Gerla et al., "Multicluster, Mobile, Multimedia Radio Network," UCLA Computer Science Department; Baltzer Journals; Wireless Networks; Jul. 12, 1995, pp. 255-265.
Golden Power Manufacturing, "6030 PCT Programmable Communicating Thermostat," Author: unknown, 2007, pp. 1-3.
Golden Power Manufacturing, "Ritetemp Universal Wireless Thermostat," Author: unknown, 2007, pp. 1-2.
Goldman et al., "Impact of Information and Communications Technologies on Residential Customer Energy Services," Paper, Berkeley: UCLA, Oct. 1996, pp. 1-89.
Grady et al., "Telemetry Options for Small Water Systems," Special Report SR14-1999, Publisher: unknown, Sep. 1999, pp. 1-23.

Guardian Alarms, Inc., "Home Security System—Model 7068 Digital Dialer Interface," Author: unknown, available at www.guardianalarms.net, 2007, pp. 1.
Guardian Alarms, Inc., "Security Company—Home Alarm System Monitoring—AES 7067 IntelliTap-II Digital Dialer Interface," Author: unknown, available at www.guardianalarms.net, 2007, pp. 1.
Guardian Alarms, Inc., "Security System—Alarm System Monitoring—7160 EZ Router," Author: unknown, available at www.guardianalarms.net, 2007, pp. 1.
Guardian Alarms, Inc., "Security System—Alarm System Monitoring—NET 7000," Author: unknown, available at www.guardianalarms.net, 2007, pp. 1.
Guardian Alarms, Inc., "Security System—Alarm System Monitoring—Radionics FDX," Author: unknown, available at www.guardianalarms.net, 2007, pp. 1.
Karn et al., "Packet Radio in the Amateur Service," IEEE Journal on Selected Areas in Communications, vol. SAC-3, No. 3, May 1985, pp. 431-439.
Katz et al., "The Bay Area Research Wireless Access Network (BARWAN)" (Jun. 1996) (presentation paper), http://daedalus.cs.berkeley.edu/talks/retreat.6.97/BARWAN.597.ppt, pp. 1-66.
Kemp, "Home Automation Application Guide," Applications for Home Automation in Any Home, vol. 1, 2000, pp. 1-106.
Kohno et al., "An Adaptive Sensor Network System for Complex Environments in Intelligent Autonomous Systems (Kakazu et al., eds.)," IOS Press, 1998, pp. 21-28.
Kooser et al., "Testing 1-2-3," Entrepreneur Magazine, Sep. 2003, pp. 27-30.
Lacoss, "Distributed Sensor Networks, Final Report," Lincoln Laboratory at Massachusetts Institute of Technology, Sep. 30, 1986, pp. 1-225.
Lauer, "Packet-Radio Routing, Routing in Communications Networks," Ch. 11 (1995) pp. 351-396.
Lee et al., "Distributed Measurement and Control Based on the IEEE 1451 Smart Transducer Interface Standards," Proceedings of the 16th IEEE Instrumentation and Measurement Technology Conference, vol. 1, May 24-26, 1999, IEEE, pp. 608-613.
Leiner et al., "Goals and Challenges of the DARPA GloMo Program;" IEEE Personal Communications; Dec. 1996, vol. 3, No. 6; pp. 34-45.
Leviton Manufacturing Co., Inc., "The DECORA® Collection of Designer Devices," 2006, pp. 1-85.
Lewis et al., "Packet-Switching Applique for Tactical VHF Radios," 1987 IEEE Military Communications Conference, Oct. 19-22, 1987, Conference Record vol. 2 of 3, pp. 449-455.
Lin et al., "CMOS Front End Components for Micropower RF Wireless Systems;" EED, UCLA Electrical Engineering Department; 1998, pp. 1-5.
Linear Corporation, "Supervised Digital Security Transmitter t-90, Installation Instructions," 2006, pp. 1-2.
Linear Corporation, "Supervised Digital Security Transmitters TX-91, TX-92, TX-94, Operation Instructions," 1993, pp. 1.
Linear Corporation, "Supervised Wireless Receiver and Zone Expander SRX-64A, Installation Instructions," 2003, pp. 1-2.
Local and Metropolitan Area Networks: Wireless Medium Access Control (MAC) and Physical (PHY) Specifications, Author: unknown; IEEE, Nov. 1997, pp. 1-98.
Clare, "AWAIRS Progress Review: Planned Milestones," UCLA Rockwell Science Center, Nov. 20, 1998.
Lougheed et al., "A Border Gateway Protocol 3 (BGP-3)," RFC 1267, (Oct. 1991), available at http://tools.ietf.org/html/rfc1267, Jun. 24, 2009, pp. 1-36.
Lutron Electronics Co. Inc., Homeowner's Guide for the RadioRA® Quick Start Package, 2004, pp. 1-8.
Lutron Electronics Co. Inc., How to Retrofit RadioRA® Wall-Mounted Master Control into an existing home, Application #41, 2004, pp. 1-2.
Lutron Electronics Co. Inc., IR/RS232 Interface for Bang & Olufsen® Remote Control and RadioRA®, Application Note #119, 2004, pp. 1-3.
Lutron Electronics Co. Inc., Level Capture with a RadioRA® Master Control, Application Note #73, 2003, pp. 1-3.
Lutron Electronics Co. Inc., Modem Installation for HomeWorks®, Application Note #9, 1998, pp. 1-4.
Lutron Electronics Co. Inc., RadioRA® RA-IR-KIT Installation Instructions, Application Note #61, 2000, pp. 1-4.
Lutron Electronics Co. Inc., RadioRA® RF Signal Repeater, 1998, pp. 1-2.
Lutron Electronics Co. Inc., RadioRA® Single-Location Switch, Controls for Permanently Installed Lighting Loads, 1998, pp. 1-2.
Lutron Electronics Co. Inc., RadioRA® Table Lamp Controls, Dimming and Switching Controls for Table and Floor Lamps, 1999, pp. 1-2.
Lutron Electronics Co. Inc., Using a Photocell with the RadioRA® System, Application Note #45, 1998, pp. 1-4.
Lutron Electronics Co. Inc., Using an Astronomic Timeclock with the RadioRA® System, Application Note #42, 1998, pp. 1-2.
Lutron Electronics Co. Inc., Using the RadioRA® System to Activate Scenes 5-16 on a GRAFIK Eye® Control Unit, Application Note #48, 1998, pp. 1-4.
Lutron Electronics Co. Inc., Using the RadioRA® Telephone Interface, Application Note #46, 1998, pp. 1-2.
Lynch et al., "Application of Data Compression Techniques to a Large Bibliographic Database," Proceeding of the Seventh International Conference on Very Large Databases, Cannes, France, Sep. 9-11, 1981 (Washington, DC: IEEE Computer Society Press, 1981), pp. 435-447.
Lynch et al., "Beyond the Integrated Library System Concept: Bibliographic Networking at the University of California," Proceedings of the Second National Conference on Integrated Online Library Systems Proceedings, Sep. 1984, pp. 243-252.
Lynch et al., "Conservation, Preservation and Digitization, Energies for Transition," Proceedings of the Fourth National Conference of the Association of College and Research Libraries, Baltimore, MD, Apr. 9-12, 1986 (Chicago, IL: Association of College and Research Libraries, 1986), pp. 225-228.
Lynch et al., "Document Delivery and Packet Facsimile," Proceedings of the 48th ASIS Annual Meeting, vol. 22, Oct. 20-24, 1985, pp. 11-14.
Lynch et al., "Electronic Publishing, Electronic Imaging, and Document Delivery, Electronic Imaging '86," (Boston, MA: Institute for Graphic Communication, Inc., 1986), pp. 662-667.
Lynch et al., "Library Applications of Electronic Imaging Technology," Information Technology and Libraries, Jun. 1986, pp. 100-105.
Lynch et al., "Public Access Bibliographic Databases in a Multicampus University Environment, Databases in the Humanities and Social Sciences—4," Proceedings of the International Conference on Databases in the Humanities and Social Sciences, Jul. 1987, Learned Information, Inc., 1989, pp. 411-419.
Lynch et al., "The Telecommunications Landscape: 1986," Library Journal, Oct. 1, 1986, pp. 40-46.
Mak et al., "Design Considerations for Implementation of Large Scale Automatic Meter Reading Systems," IEEE Transactions on Power Delivery, vol. 10, No. 1, Jan. 1995, pp. 97-103.
Malkin, "RFC 2453, RIP Version 2 (Nov. 1998)," available at http://tools.ietf.org/html/rfc2453, Jun. 24, 2009, pp. 1-40.
Maltz, "On-Demand Routing in Multi-Hop Wireless Mobile Ad Hoc Networks," Thesis, May 2001, pp. 1-192.
Markie et al., "LonWorks and PC/104: A winning combination," PC/104 Embedded Solutions, Summer 1998, pp. 1-8.
Martel et al., "Home Automation Report: A Modular Minimum Complexity, High-Resolution and Low Cost Field Device Implementation for Home Automation and Healthcare," MIT; Publisher: unknown; Mar. 31, 1998; pp. 1-29.
McQuillan et al., "The ARPA Network Design Decisions," Computer Networks, vol. 1, No. 5, Aug. 1977 pp. 243-289.
McQuillan et al., "The New Routing Algorithm for the ARPANET," IEEE Transactions on Communications, vol. COM-28, No. 5, May 1980, pp. 711-719.
Mills, "Exterior Gateway Protocol Formal Specification" (Apr. 1984), RFC 904, available at http://tools.ietf.org/html/rfc904, Jun. 24, 2009, pp. 1-32.
Moorman, "Packet Radio Used in a Cost-Effective Automated Weather Meso-Net," available at http://www.wrh.noaa.gov/wrh/96TAs/TA963 1/ta96-31.html, Dec. 3, 1996 (5 pages).

Moy, "RFC 2328, OSPF Version 2 (Apr. 1998)," available at http://tools.ietf.org/html/rfc2328, Jun. 24, 2009, pp. 1-245.

Mozer et al., "The Neural Network House: An Overview," in L. Niklasson & Boden (eds.), Current trends in connectionism (pp. 371-380); Hillsdale: Erlbaun, 1995; pp. 1-9.

Murthy et al., "An Efficient Routing Protocol for Wireless Networks, Mobile Networks and Applications 1," (1996), pp. 183-197.

Negus et al., "HomeRF™ and SWAP: Wireless Networking for the Connected Home," ACM SIGMOBILE Mobile Computing and Communications Review, vol. 2, Issue 4, Oct. 1998, available at http://portal.acm.org/citation.cfm?id=1321400.1321401 on Mar. 29, 2009, pp. 1-2.

Negus et al., "HomeRF™ and SWAP: Wireless Networking for the Connected Home," Mobile Computing and Communications Review, vol. 2, No. 4, Date: unknown, pp. 28-37.

Nextgen Searches, "*IPCO v. The Wireless Sensor Network Industry?* Special Report on *IPCO v. ONCOR et al.,*" Corporate Manager's Edition, 2009, pp. 1-16.

Nilsen et al., "Storage Monitoring Systems for the Year 2000," Dept. Of Energy, Office of Scientific and Technical Information, Report No. SAND—97-8532C, available at http://www.osti.gov/bridge/product.biblio.jsp?query_id=3&page=0&osti_id=303988 (1997).

Ondo, "PLRS/JTIDS Hybrid," Filled Artillery Journal, Jan.-Feb. 1981, pp. 20-25.

Oran (ed.), "OSI IS-IS Intra-Domain Routing Protocol," RFC 1142 (Feb. 1990), available at http://tools.ietf.org/html/rfc1142, Jun. 24, 2009, pp. 1-665.

Park et al., "SensorSim: A Simulation Framework for Sensor Networks," ACM, 2000, pp. 104-111.

Perkins et al., "Ad-Hoc On-Demand Distance Vector Routing "AODV"," http://moment.cs.ucsb.edu/AODV/aodv.html, Aug. 25, 2009, pp. 1-5.

Perkins et al., "Continuous, transparent network access for portable users, A Mobile Networking System Based on Internet Protocol," IEEE Personal Communications, First Quarter 1994, pp. 32-41.

Perkins et al., "Mobility Support in IPv6," Internet Draft (Sep. 22, 1994), available at http://www.monarch.cs.rice.edu/internet-draft/draft-perkins-ipv6-mobility-sup-oo.txt., Sep. 26, 2009, pp. 1-13.

Perkins et al., "RFC3561—Ad Hoc On-Demand Distance Vector (AODV) Routing (Jul. 2003)," available at http://tools.ietf.org/html?rfc3561, Aug. 25, 2009, pp. 1-38.

Pittway Corporation, "Company History," available at http://www.fundinguniverse.com/company-histories/Pittway-Corporation Mar. 6, 2009, pp. 1-5.

Plaintiffs' Opening Markman Brief in Support of Their Proposed Claim Constructions, filed by the patent owner and its co-plaintiff in *SIPCO LLC et al. v. The Toro Co. et al.*, Case No. 2:08-cv-00505-TJS (E.D. Pa.) filed on Sep. 26, 2008.

Pleading—Defendant Digi International Inc.'S First Amended Answer and Defenses of *SIPCO, LLC v. CONTROL4 Corporation et al.*, Civil Action No. 6:10-cv-249, currently pending in the U.S. District Court for the Eastern District of Texas, Tyler Division, filed Nov. 22, 2010, pp. 1-27.

Pleading—Defendant Siemens Industry, Inc.'S First Amended Answer and Defenses of *SIPCO, LLC v. Control4 Corporation et al.*, Civil Action No. 6:10-cv-249, currently pending in the U.S. District Court for the Eastern District of Texas, Tyler Division, filed Nov. 22, 2010, pp. 1-27.

Pleading—Defendant The Toro Company, The Toro Company's Second Supplemented Objections and Answers to Plaintiffs SIPCO LLC and Advanced Sensor Technology, Inc.'S Interrogatory No. 4 to Defendant *The Toro Company of SIPCO LLC, et al. v. The Toro Company et al.*, Civil Action No. 08-CV-00505-TJS (pp. 1-9).

Pleading—Defendant The Toro Company, Third Supplemented Objections and Answers to Plaintiffs SIPCO LLC and Advanced Sensor Technology, Inc.'S Interrogatory No. 4 to Defendant *The Toro Company of SIPCO LLC, et al. v. The Toro Company et al.*, Civil Action No. 08-CV-00505-TJS (pp. 1-9).

Pleading—Expert Report of Randy H. Katz, Ph. D, of *SIPCO, LLC et al. v. The Toro Company et al.*, Case No. 2:08-cv-00505.

Poor, Robert D., "Hyphos: A Self-Organizing, Wireless Network," Massachusetts Institute of Technology (Jun. 1997).

Postel (ed.), "Transmission Control Protocol, Version 4," RFC793, available at http://www.faqs.org/rfcs/rfc793.html, Sep. 1981, pp. 1-85.

Postel (Editor), "Internet Protocol, DARPA Internet Program Protocol Specification," RFC 791 (Sep. 1981), Information Sciences Institute, University of So. Cal., pp. 1-45.

Pottie et al., "Adaptive Wireless Arrays Interactive Recconaissance, Surveillance, and Target Acquisition in Small Unit Operations (AWAIRS); Lower Power Wireless Integrated Microsensors (LWIM)," Presented to Dr. E. Carapezza, Dr. D. Lao and Lt. Col. J. Hernandez, UCLA, Rockwell Science Center; Mar. 21, 1997, pp. 1-110.

Pottie et al., "Wireless Integrated Network Sensors," Communications of the ACM, vol. 43, No. 5, May 2000, pp. 51-58.

Pottie et al., "Wireless Integrated Network Sensors: Towards Low Cost and Robust Self-Organizing Security Networks;" EED, UCLA; Rockwell Science Center; SPIE vol. 3577, Nov. 1, 1998, pp. 86-95.

Pottie, "AWAIRS: Mini-Site Review, Project Status," UCLA: Rockwell Science Center, Feb. 23, 1998, pp. 1-58.

Pottie, "Hierarchical Information Processing in Distributed Sensor Networks," ISIT, Aug. 16-21, 1998, IEEE, 1998, pp. 163.

Pottie, "R&D Quarterly and Annual Status Report," SPAWAR (contractor), Apr. 31, 1999.

Pottie, "Wireless Sensor Networks," ITW 1998, Jun. 22-26, 1998, available at http://dantzig.ee.ucla.edu/oclab/Pottie.html, 2 pages.

Printout of 47 C.F.R. 15 (131 pages).

Rabaey et al., "PicoRadio Support Ad Hoc Ultra-Low Power Wireless Networking," Computer, IEEE, Jul. 2000, pp. 42-48.

Radlherr, "Datentransfer Ohne Draht and Telefon," Funkschau, Nov. 1991, pp. 49-52.

Raji, "Control Networks and the Internet, Rev. 2.0," Echelon Corp., 1998, pp. 1-39.

Raji, "End-to-End Solutions with LonWorks® Control Technology: Any Point, Any Time, Any Where," Echelon Corp.;, 1998, pp. 1-30.

Raji, "Control Networks and the Internet," Echelon Corp., Rev. 2.0, available at http://www.echelon.com/solutions/opensystems/papers/Control_In ternet.pdf (1998).

Rants and Ramblings, "Go Wireless . . . At a Payphone," May 10, 2003, http://www.morethanthis.net/blog/archives/2003/05/10/000301.html (2 pages).

Rehkter et al., "A Border Gateway Protocol 4 (BGP-4)," RFC 1771, (Mar. 1995), available at http://tools.ietf.org/html.rfc1771, Jun. 24, 2009, pp. 1-58.

Reuters, "Verizon Launches Wi-Fi Hot Spots," May 18, 2003, http://www.wired.com/news/wireless/0,1382,58830,00.html (2 pages).

Ritter et al., The Architecture of Metricom's Microcellular Data Network™ (MCDN) and Details of its Implementation as the Second and Third Generation Ricochet™ Wide-Area Mobile Data Service, IEEE, 2001, pp. 143-152.

Ross et al., "PNC/DOE Remote Monitoring Project at Japan's Joyo Facility," Office of Scientific and Technical Information, Report No. SAND—96-1937C, available at http://www.osti.gov/bridge/product.bib lio.jsp?query_id=0&pa ge=0&osti_id=270680 (1996).

Saffo, Paul, "Sensors: The Next Wave of Infotech Innovation," Institute for the Future (1997).

Salkintzisa et al., "Design and implementation of a low-cost wireless network for remote control and monitoring applications," Elsevier, Microprocessors and Microsystems, 1997, pp. 79-88.

Saltzer et al., "Source Routing for Campus-wide Internet Transport (Sep. 15, 1980)," available at http://groups.csail.mit.edu/ana/publications/pubPDFs/Sourcerouting.html, Sep. 21, 2009, pp. 1-14.

Schneider et al., "International Remote Monitoring Project Argentina Nuclear Power Station Spent Fuel Transfer Remote Monitoring System," Dept. of Energy, Office of Scientific and Technical Information, Report No. SAND—97-1784C, available at http://www.osti.gov/bridge/product.bibli o.jsp?query_id=1&page=0&osti_id=505674 (1997).

Schulman et al., "SINCGARS Internet Controller-Heart of the Digitized Battlefield," Proceedings of the 1996 Tactical Communications Conference, Apr. 30-May 2, 1996, pp. 417-421.

Shacham et al., "Dynamic Routing for Real-Time Data Transport in Packet Radio Networks," IEEE Proceedings of INFOCOM '82, pp. 152-159.

Shacham et al., "Future Directions in Packet Radio Architectures and Protocols," Proceedings of the IEEE, vol. 75, No. 1, Jan. 1987, pp. 83-99.

Shacham et al., "Packet Radio Networking," Telecommunications vol. 20, No. 9, Sep. 1986, pp. 42,43,46,48,64 and 82.

Shoch, "Inter-Network Naming, Addressing and Routing, Internet Experiment Note # 19, Notebook section 2.3.3.5," Xerox Palo Alto Research Center, Jan. 29, 1978, Publisher: unknown, pp. 1-9.

Sohrabi et al., Protocols for Self-Organization of a Wireless Sensor Network, IEEE Personal Communications, Oct. 2000, pp. 16-27.

Stern, "Verizon to Offer Wireless Web Link Via Pay Phones," May 10, 2003, http://www.washingtonpopst.com/ac2/wp-dyn?pagename=article&node=&contentID=A367... (3 pages).

Subramanian et al., An Architectural for Building Self-Configurable Systems, IEEE, 2000, pp. 63-73.

Sunshine, "Addressing Problems in Multi-Network Systems," (Apr. 1981), available at ftp://ftp.isi.edu/in-notes/ien/ien178.txt, Sep. 14, 2009, pp. 1-26.

Sunshine, "Addressing Problems in Multi-Network Systems," Proceedings INFOCOM '82, 1982 IEEE, pp. 12-19.

Sunshine, "Network Interconnection and Gateways," IEEE Journal on Selected Areas in Communications, vol. 8, No. 1, Jan. 1990, pp. 4-11.

Sunshine, "Source Routing in Computer Networks," Information Sciences Department of the Rand Corporation (1977), Publisher: unknown, pp. 29-33.

Sutherland, Ed, "Payphones: The Next Hotspot Wave?," Jan. 28, 2003, http://www.isp-planet.com/fixed_wireless/news/2003/bellcanada_030128.html (3 pages).

Tanenbaum, "Computer Networks," 4th Int'l CAN Conf., Berlin, Germany, 1997.

Tanenbaum, Andrew S., "Computer Networks," chapters 1, 5 (3d ed. Prentice Hall 1996).

Thodorides, "Wireless Integrated Network Sensors," Power Point Presentation, Publisher: unknown, Apr. 15, 2003, pp. 1-19.

Thomas, "Extending CAN Networks by Incorporating Remote Bridging," ESTeem Radios, Nov. 1994.

Thomas, "Extending CAN Networks by Incorporating Remote Bridging," 4th Int'l CAN Conf., Berlin, Germany, available at http://www.can-cia.org/fileadmin/cia/files/icc/4/thom as.pdf (1997).

Tobagi et al, "Packet Radio and Satellite Networks," IEEE Communications Magazine, vol. 22, No. 11, Nov. 1984, pp. 24-40.

Toh, "A Novel Distributed Routing Protocol to Support Ad-Hoc Mobile Computing," Conference Proceedings of the 1996 IEEE Fifteenth Annual International Phoenix Conference on Computers and Communications, Mar. 27-29, 1996, pp. 480-486.

Totolo, Home RF, A New Protocol on the Horizon, Feb. 1999, available at www.hometoys.com/htinews/feb99/articles/totolo/totolo.htm on Mar. 2, 2009.

Transmission Control Protocol; "DARPA Internet Program Protocol Specification," John Postel Editor; Information Sciences Institute, University of Southern California, California; Sep. 1981; pp. 1-85.

Varadhan et al., "SDRP Route Construction," Internet Draft, available at draft-ietf-sdr-route-construction-01.{ps,txt}, Feb. 27, 2005, pp. 1-12.

Vardhan, "Wireless Integrated Network Sensors (WINS): Distributed In Situ Sensing for Mission and Flight Systems," 2000 IEEE Aerospace Conference Proceedings, (2000).

Verizon, "Verizon Broadband Anytime," Copyright 2003, https://www33.verizon.com/wifi/login/loacations/locations-remote.jsp (2 pages).

Wang et al., "Energy-Scalable Protocols for Battery Operated MicroSensor Networks," Department of Electrical Engineering Massachusetts Institute of Technology, 1999.

Warrock, "School Give Report on Radio-Based FMS," Energy User News, Nov. 7, 1983, pp. 1.

Weiser, "Some Computer Science Issues in Ubiquitous Computing," Communications of the ACM, Jul. 1993.

Weiser, "The Computer for the 21st Century," Scientific American, Sep. 1991.

Westcott et al., "Hierarchical Routing for Very Large Networks," IEEE Military Communications Conference, Oct. 21-24, 1984, Conference Record vol. 2, pp. 214-218.

Wikipedia, "Ad Hoc On-Demand Distance Vector Routing," available at http://en.wikipedia.org/wiki/Ad_Hoc_On-Demand_Distance_Vector_Routing on Aug. 25, 2009, pp. 1-3.

Wikipedia, "Border Gateway Protocol," available at http://en.wikipedia.org/wiki/Border_Gateway_Protocol, Jun. 24, 2009, pp. 1-13.

Wikipedia, "Distance-Vector Routing Protocol," available at http://en.wikipedia.org/wiki/Distance-Vector_Routing_Protocol, Jun. 24, 2009, pp. 1-4.

Wikipedia, "Enhanced Interior Gateway Routing Protocol," available at http://en.wikipedia.org/wiki/EIGRP, Jun. 24, 2009, pp. 1-7.

Wikipedia, "Exterior Gateway Protocol," available at http://en.wikipedia.org/wiki/Exterior_Gateway_Protocol, Jun. 24, 2009, pp. 1.

Wikipedia, "Interior Gateway Routing Protocol," available at http://en.wikipedia.org/wiki/Interior_Gateway_Routing_Protocol, Jun. 24, 2009, pp. 1-2.

Wikipedia, "IS-IS," available at http://en.wikipedia.org/wiki/IS-IS, Jun. 24, 2009, pp. 1-3.

Wikipedia, "L. R. Ford, Jr.," available at http://en.wikipedia.org/wiki/L._R._Ford,_Jr, Jun. 24, 2009, pp. 1.

Wikipedia, "Richard E. Bellman," available at http://en.wikipedia.org/wiki/Richard_Bellman, Jun. 24, 2009, pp. 1-3.

Wikipedia, "Routing Information Protocol," available at http://en.wikipedia.org/wiki/Routing_Information_Protocol, Jun. 24, 2009, pp. 1-4.

Will et al., "Wireless Networking for Control and Automation of Off-road Equipment," ASAE, Jul. 18-21, 1999, pp. 1-10.

Wilson, Lexicon 700t Touchscreen Remote, Jan. 1, 1999, available at http://avrev.com/home-theater-remotes-system-control/remotes-system on Mar. 2, 2009, pp. 1-3.

"HAI Omni: Features & Specifications," Home Automation, Inc. (archived web page), 1997.

"Home Telemetry Gateway Specifications Sheet: Connector 2000 Series," Coactive 1998.

"How Does the New Power Company Deliver on the Promise of Energy Reconstructing?" NewPower (press release), Author: unknown, May 31, 2001, pp. 1-6.

"IEEE Standards Board: Project Authorization Request (PAR) Form;" http://grouper.ieee.org/groups/802/11/PARs/par80211bapp.html, Mar. 24, 1998.

"IIS—Contract Detail, Project Name: Ft. Riley Radio Expansion," Author: unknown, Johnson Controls, Sep. 1998.

"Important Dealer Notification—Honeywell AlarmNet-M Network Alert," Source: unknown, Author: unknown, Apr. 2007, pp. 1.

"InCode Telecom Transforming Payphones into Wi-Fi Hot Spots," Jan. 14, 2003, http://www.pocketpcmag.com/news/incode.asp (2 pages).

"Industrial Communications," Author: unknown, available at http://web.archive.org/we b/19990222162354/www.metricom.com/industrial/ on May 10, 2010, pp. 1-3.

"International Search Report and Written Opinion for International Application No. PCT/US2006/002342," Search Authority European Patent Office, mailed May 31, 2006.

"IOConnect Architecture™," Coactive, 2001, pp. 1-4.

"JC/83RF System: Multiple Facility Management by Radio Network," Johnson Controls, Publication No. 2161, 1983, pp. 1-4.

"Keltron's Home page with Frames, Index," available at http://web.archive.org/web/19990831161957/http://www.keltroncorp.com, on Mar. 24, 2009, pp. 1.

"Local and Metropolitan Area Networks: Wireless Medium Access Control (MAC) and Physical (PHY) Specifications, Annex A: Protocol Implementation Conformance Statement (PICS) Proforma," Author: unknown; IEEE, Nov. 1997, pp. 1-75.

"LonTalk Protocol, LonWorks™ Engineering Bulletin," Echelon Corp.; Author: unknown; Apr. 1993, pp. 1-27.

"LonWorks® Products, 1998, Version A," Echelon Corp.; Author: unknown; 1997, pp. 1-21.

"LonWorks® Router User's Guide," Echelon Corp., Author: unknown; 1995, pp. 1-136.

"LonWorks® SMX™ Transceiver," datasheet, Echelon Corp.; Author: unknown; 1997, pp. 1-18.

"M100 Series Motor Actuator," Author: unknown, Johnson Controls, Inc., Apr. 1993, pp. 1-20.

"M100C Series Actuator with Digital Control Signal Input and R81CAA-2 Interface Board," Installation Bulletin, Johnson Controls, 2000, pp. 1-12.

"Man-Portable Networked Sensor System (1997-)," Author: unknown, available at http://www.spawar.navy.mil/depts/d30/d37/d371/mpnss/mpnss.html on May 20, 2010, pp. 1-4.

"March of the Motes," Author: unknown, New Scientist, vol. 179, issue 2409, Aug. 23, 2003, pp. 1-8.

"Metasys Compatible Products," Author: unknown; Johnson Controls, Inc., 1997 (9 pages).

"Metasys Extended System Architecture, vol. II," Author: unknown, Publisher: unknown, Sep. 1999.

"Metasys N2 System Protocol Specification for Vendors," Author: unknown, Publisher: unknown, Jun. 1996.

"Modicon Interfacing," Author: unknown, Engineering Report, No. 90-022, Revised: Apr. 12, 1996, pp. 1-9.

"Moore Products—Hart Protocol Interfacing," Author: unknown, Engineering Report, No. 94-007, Revised: Mar. 1, 1996, pp. 1-3.

"MTC Teams with Coactive Networks to Deliver an Advanced Energy Communications and Management Solution," Coactive (press release), Author: unknown, Feb. 5, 2001, pp. 1-4.

"Net77 Central Station Manual Section 3," AES Intellinet, Dec. 1996.

"NewPower and Coactive Networks Announce Strategic Alliance to Deliver the Connected Home," Coactive (press release), Author: unknown, Mar. 14, 2001, pp. 1-4.

"NX-480 Wireless Motion Sensor, document No. 466-1479 Rev. D," Caddx Controls, May 1, 1998.

"Omni Installation Manual," Author: unknown; Home Automation, Inc., Oct. 1997, pp. 1-88.

"Omron Interfacing," Author: unknown, Engineering Report, No. 95-003, Revised: Apr. 17, 1996, pp. 1-4.

"Opto-22 Protocol," Author: unknown, Engineering Report, No. 93-010, Revised: May 31, 1996, pp. 1-8.

"Part 15.1: Wireless Medium Access Control (MAC) and Physical Layer (PHY) Specifications for Wireless Personal Area Networks (WPANS)," www.ieee802.org/15/Bluetooth/802-15-1_Clause_05.pdf, Jun. 14, 2002.

"Phoenix Contact Interfacing, Author: unknown," Engineering Report, No. 94-001, Revised: Jun. 20, 1996, pp. 1-7.

"Phonelin / HPNA / HomePNA Networks," http://www.homenethelp.com/web/howto/HomeNet-HPNA.asp (visited Jul. 29, 2003) (3 pages).

"PLC Direct (Koyo) Interfacing, Author: unknown," Engineering Report, No. 96-001, Revised: Apr. 10, 1996, pp. 1-8.

"Power/Perfect Energy Management Systems," Author: unknown, Johnson Controls, 1983, pp. 1-4.

"Selected Vendor Telecommunications Products," available at http://eetd.lbl.gov/ea/ems/reports/39015a.pdf (describing public uses in 1995), pp. 1-83.

"Smart Home Technology Leader Intelli Selects Coactive Networks Internet Gateways," Coactive (press release), Author: unknown, Sep. 11, 2000, pp. 1-4.

"Special Poll Feature," Author: unknown, Engineering Report, No. 93-008, Sep. 1993, pp. 1-5.

"Square D Interfacing," Author: unknown, Engineering Report, No. 88-010, Revised: Apr. 18, 1996, pp. 1-9.

"Technology Review, Metricom's Ricochet Packet Radio Network," Ham Radio Online, 1996, Author: unknown, pp. 1-3.

"Texas Instruments Interface," Author: unknown, Engineering Report, No. 91-021, Revised: Nov. 1994, pp. 1-3.

"The New Power Company Announces Revolutionary Energy-Saving Program the Gives Consumers Remote Control of the Their Thermostats via the Internet," NewPower (press release), Author: unknown, Apr. 24, 2001.

"The SNVT Master List and Programmer's Guide," Echelon Corp., Author: unknown, Mar. 1996, pp. 1-23.

To Starbucks and beyond: 802.11 wireless Internet access takes off, CommunicationsSolutions.com, vol. 4, Issue 1, Q1 2003, pp. 8-9.

"Toshiba Interfacing," Author: unknown, Engineering Report, No. 91-011, Revised: Jun. 19, 1996, pp. 1-4.

"TranstexT® Advanced Energy Management System," Brochure, Author: unknown, Integrated Communication Systems, Inc., 1990, pp. 1-8.

ADEMCO Group, Vista 4130XT Security System Installation Instructions, Oct. 1998, ADEMCO Group, Author: unknown, pp. 1-84.

ADEMCO Group, Vista 4140XMPT2 Partitioned Security System with Scheduling Installation Instructions, May 1993, Ademco Group, Author: unknown, pp. 1-68.

ADEMCO Group, Vista AT 4140 Security System Installation Instructions, Sep. 1998, Ademco Group, Author: unknown, pp. 1-68.

ADEMCO Group, Vista Series 4120EC Security System User's Manual, Sep. 1992, ADEMCO Group, Author: unknown, pp. 1-28.

ADEMCO Group, Vista Series 4130XM, 5130XM, 4140XMP Security System User's Manual, Feb. 1992, Ademco Group, Author: unknown, pp. 1-32.

ADEMCO Group, Vista Series 4140XMPT/4140XMPT-Ul Partitioned Security System User's Manual, Jun. 1993, ADEMCO Group, Author: unknown, pp. 1-32.

ADEMCO Group, Vista Series 4140XMP, Installation Instructions, Jan. 1992, ADEMCO Group, Author: unknown, pp. 1-52.

ADEMCO Group, Vista Series 5140XM User's Manual, Aug. 1992, ADEMCO Group, Author: unknown, pp. 1-28.

ADEMCO Group, Vista XM Series 4140XM, 5130XM, 4130XM, Installation Instructions, Jul. 1990, Ademco Group, Author: unknown, pp. 1-26.

ADEMCO Group, Vista XM Series, Installation Instructions, Ademco Group, Author: unknown, Oct. 1991, pp. 1-16.

ADEMCO Group, Vista-10 Security System, Installation Instructions, Sep. 1994, ADEMCO Group, Author: unknown, pp. 1-56.

ADEMCO Group, Vista-100 Commercial Fire & Burglary Alarm Partitioned Security System with Scheduling, Installation Instructions and Programming Guide, Jan. 1998, ADEMCO Group, Author: unknown, pp. 1-233.

ADEMCO Group, Vista-100 Commercial Fire & Burglary Alarm System User's Manual, Nov. 1995, ADEMCO Group, Author: unknown, pp. 1-66.

ADEMCO Group, Vista-100 Commercial Fire & Burglary Alarm System with Scheduling Quick Start, Apr. 1996, ADEMCO Group, Author: unknown, pp. 1-24.

ADEMCO Group, Vista-10SE Security System, Installation Instructions, May 1997, ADEMCO Group, Author: unknown, pp. 1-88.

ADEMCO Group, Vista-128B Commercial Burglary Partitioned Security System with Scheduling, Installation and Setup Guide, Jul. 1998, ADEMCO Group, Author: unknown, pp. 1-252.

ADEMCO Group, Vista-128FB Commercial Fire and Burglary Partioned Security System with Scheduling, Installation, and Setup Guide, Oct. 1998, ADEMCO Group, Author: unknown, pp. 1-220.

ADEMCO Group, Vista-128FB Commercial Fire and Burglary Partitioned Security System User Guide, Oct. 1998, ADEMCO Group, Author: unknown, pp. 1-80.

ADEMCO Group, Vista-20 2-Partitioned Security System, Installation Instructions, Nov. 1995, ADEMCO Group, Author: unknown, pp. 1-120.

ADEMCO Group, Vista-20 2-Partitioned Security System, Programming Form, Apr. 1996, ADEMCO Group, Author: unknown, pp. 1-8.

ADEMCO Group, Vista-20 Security System User's Manual, Apr. 1995, ADEMCO Group, Author: unknown, pp. 1-52.

ADEMCO Group, Vista-20HW 2-Partitioned Security System, Installation Instructions, Apr. 1996, ADEMCO Group, Author: unknown, pp. 1-100.

ADEMCO Group, Vista-20HW 2-Partitioned Security System, Programming Form, Apr. 1996, ADEMCO Group, Author: unknown, pp. 1-8.

ADEMCO Group, Vista-20HWse 2-Partitioned Security System, Installation Instructions, Aug. 1997, ADEMCO Group, Author: unknown, pp. 1-84.

ADEMCO Group, Vista-20HWse 2-Partitioned Security System, Programming Form, Aug. 1997, ADEMCO Group, Author: unknown, pp. 1-8.

ADEMCO Group, Vista-20SE 2-Partitioned Security System, Installation Instructions, Aug. 1997, ADEMCO Group, Author: unknown, pp. 1-100.

ADEMCO Group, Vista-20SE 2-Partitioned Security System, Programming Guide, Aug. 1997, ADEMCO Group, Author: unknown, pp. 1-8.
ADEMCO Group, Vista-20SE/Vista-20HWse Security System User's Manual, Jun. 1997, ADEMCO Group, Author: unknown; pp. 1-52.
ADEMCO Group, Vista-30Pse Security System, Installation Instructions, Apr. 1997, ADEMCO Group, Author: unknown; pp. 1-104.
ADEMCO Group, Vista-40 2-Partition Security System, Installation and Setup Guide, Jul. 1998, ADEMCO Group, Author: unknown; pp. 1-380.
ADEMCO Group, Vista-40 2-Partition Security System, Programming Guide, Jul. 1998, ADEMCO Group, Author: unknown; pp. 1-24.
ADEMCO Group, Vista-40 Programming Guide, Jun. 1997, ADEMCO Group, Author: unknown; available at www.guardianalarms.net pp. 1-20.
ADEMCO Group, Vista-40 Security System User's Guide, Jul. 1998, ADEMCO Group, Author: unknown; pp. 1-60.
ADEMCO Group, Vista-50, Vista 50UL Security System, Nov. 1994, ADEMCO Group, Author: unknown; pp. 1-66.
ADEMCO Group, Vista-50P, Vista-50PUL Partitioned Security System with Scheduling, Installation Instructions and Programming Guide, Oct. 1997, ADEMCO Group, Author: unknown; pp. 1-199.
ADEMCO Group, Vista-50P, Vista-50PUL Security System User's Manual, Jul. 1995, ADEMCO Group, Author: unknown; pp. 1-66.
ADEMCO Group, Vista-50P, Vista-50PUL, Partitioned Security System with Scheduling, Quick Start, Aug. 1995, ADEMCO Group, Author: unknown; pp. 1-28.
ADEMCO Group, Vista5140XM Commercial Fire and Burglary Alarm System Installation Instructions, Jun. 1993, ADEMCO Group, Author: unknown, pp. 1-74.
ADEMCO Group, Vista-AT Security System User's Manual, Sep. 1998, ADEMCO Group, Author: unknown; pp. 1-56.
ADEMCO Group, V-Link Downloading Software User's Guide, Jun. 1994, ADEMCO Group, Author: unknown; available at http://www.guardianalarms.net, pp. 1-126.
ADEMCO Group, V-Plex Security Technology, 1997, ADEMCO Group, Author: unknown, available at http://web.archive.org/web/19990421110527/www.ademco.com/ademco on Mar. 5, 2009, pp. 1-6.
ADEMCO Group, Wireless Transmitters/Receivers: 5700 Wireless Transmitters, 1997, ADEMCO Group, Author: unknown, available at http://web.archive.org/web/19990127120423/www.ademco.com/ademco on Mar. 15, 2009, pp. 1-2.
ADEMCO Group, Wireless Transmitters/Receivers: 5800 Wireless Transmitters, 1997, ADEMCO Group, Author: unknown, available at http://web.archive.org/web/19990218181254/www.ademco/com/ademco on Mar. 5, 2009, pp. 1-2.
ADEMCO Group, Wirelss User Interface Devices, 1997, ADEMCO Group, Author: unknown, available at http://web.archive.org/web/19990421190353/www.ademco.com/ademco on Mar. 5, 2009, pp. 1-4.
ADEMCO Group, Vista Series Partitioned Security Systems Model 4140XMPT Installation Instructions, Feb. 1992, ADEMCO Group, Author: unknown, pp. 1-60.
AES—7700 Central Station, Installation & Operation Manual, Document 40-0551u, AES Corporation, Author: unknown, Nov. 2003, pp. 1-40.
AES— IntelliGuard 7470, AES IntelliNet, Author: unknown, Nov. 2003, pp. 1-15.
AES 7000 Smart Central Station InstaCentral Station Installation & Operation Manual, Document No. 40-551, AES IntelliNet, Author: unknown; Nov. 20, 1996, pp. 1-48.
AES 7067 IntelliTap-II Digital Dialer Interface: A Supplemental Alarm Supporting Device, AES IntelliNet, Author: unknown, Aug. 5, 2004, pp. 1-4.
AES 7099 Central Station Installation & Operation Manual, Document No. 40-0050, AES IntelliNet, Author: unknown; 1998, pp. 1-20.
AES 7450 RF Subscriber Unit Installation Manual, AES IntelliNet, Author: unknown, 1998, pp. 1-8.

AES 7750-F RF SMART Subscriber Unit Version 2, Including 7750-F-4x4 and 7750-F-8, Installation & Operation Manual, AES IntelliNet, Author: unknown, Apr. 2001 (Updated Nov. 2003), pp. 1-60.
AES 7750-F RF Smart Subscriber Unit Version 2, Installation & Operation Manual, AES IntelliNet, Author: unknown, Aug. 2000, pp. 1-30.
AES Central Alarm Monitoring, Author: unknown, available at http://web.archive.org/web/19990225163745/www.aes-intellinet.com/ae, on Mar. 5, 2009, pp. 1-3.
AES IntelliNet 7450 Addendum, AES Corporation, Author: unknown, Jul. 9, 2002, pp. 1-2.
AES IntelliNet Dealer's List by State, Author: unknown, available at http://web.archive.org/web/200102162324026/www.aes-intellinet.com/list on Mar. 5, 2009, pp. 1-13.
AES IntelliNet Model 7003 Central Station, Installation & Operation Manual, AES IntelliNet, Author: unknown, Jan. 9, 2001, available at http://www.guardianalarms.net, pp. 1-25.
AES IntelliNet Model 7050, 7750, Subscriber Unit, Version 1.62, Installation & Operation Manual, AES IntelliNet, Author: unknown, Dec. 1996, available at www.guardianalarms.net, pp. 1-110.
Haartsen, "Bluetooth-The Universal Radio Interface for Ad Hoc, Wireless Connectivity;" Ericsson Review No. 3, 1998; pp. 110-117.
Hahn et al., "Packet Radio Network Routing Algorithms: A Survey," IEEE Communications Magazine, vol. 22, No. 11, Nov. 1984, pp. 41-47.
Hai Omni, Features & Specifications, Home Automation, Inc., available at http://web.archive.org/web/19970216055832/www.homeauto.com/omni on Feb. 17, 2009, pp. 1-6.
Hall, "Tactical Internet System Architecture for Task Force XXI," 1996 IEEE, pp. 219-230.
Hamilton et al., "Optimal Routing in Multihop Packet Radio Networks," 1990 IEEE, pp. 389-396.
Harrington, "More Visible Vehicles," ActionLINE, Jul. 2003 (4 pages).
Hedrick, "An Introduction to IGRP," Rutgers, The State University of New Jersey, Center for Computers and Information Services, Laboratory for Computer Science Research, Aug. 22, 1991 (Updated Aug. 10, 2005), pp. 1-21.
Hedrick, "Routing Information Protocol" (Jun. 1988), RFC 1058, available at Http://Tools.letf.Org/Html/Rfc1058, Jun. 24, 2009, pp. 1-34.
Hinden et al., "The DARPA Internet Gateway," RFC 823, Publisher: unknown, Sep. 1982, pp. 1-43.
Hogan, "Call of the Wi-Fi," Entrepeneur Magazine, Sep. 2003, pp. 39-42.
Holtsville et al., "Symbol Technologies, Telxon and Aironet Commit to Future Interoperability of Their Wireless Local Area Networks Based on the IEEE 802.11 Specification," Business Wire, Jun. 24, 1996, available at http://www.thefreelibrary.co m/_/print/PrintArticle.aspx?id=18414624, pp. 1-3.
Home Automation Inc., "HAI Company Background;" Publisher: Unknown, Date: unknown, pp. 1-2.
Home Toys, Inc., "HTINews Review," available at http://www.hometoys.com/htinews/aug97/reviews/homevis/homevis1.htm on Mar. 2, 2009, pp. 1-26.
Honeywell, Inc., "Honeywell Home Control Version 2.0 Demonstratin," available at http://web.archive.org/web/19980630195929/www.hbc.honeywell.com/ on Mar. 5, 2009 (7 pages).
Hong et al., "U.S. Lightning Market Characterization, vol. II.: Energy Efficient Lighting Technology Options," Sep. 30, 2005, Reportprepared for Building Technologies Program, Office of Energy Efficiency and Renewable Energy, pp. 1-36.
Hotel Technology Next Generation, "A Guide for Understanding Wireless in Hospitality," an HTNG White Paper, Jun. 2006 (Jayne O'Neill, ed.), pp. 1-77.
Hruschka et al., "Packet Radio, Drahtlose Datenubertragung im Amateurfunk," Elektor, Jun. 1991, pp. 54-57 and 84.
Hsu et al., "Wireless Communications for Smart Dust," Berkeley: UCLA, Jan. 30, 1998, pp. 1-20.
Humpal, "Extended Timers for Fort Riley," Publisher: unknown; Mar. 1993.

Humpal, "Modified Download Files for Fort Riley," Publisher: unknown; Apr. 1994.
Internet Protocol, Version 4 (IPv4), RFC791 (Sep. 1981).
Internet Protocol, Version 6 (IPv6) Specification, RFC 2460 (Dec. 1998).
Internet Protocol; DARPA Internet Program Protocol Specification, John Postel Editor; Information Sciences Institute, University of Southern California, California; Sep. 1981; pp. 1-45.
Iwata et al., "Scalable Routing Strategies for Ad Hoc Wireless Networks," IEEE Journal on Selected Areas in Communications, vol. 17, No. 8, Aug. 1999, pp. 1369-1379.
Jacobsen, "The Building Blocks of a Smart Sensor for Distributed Control Networks," IEEE Technical Applications Conference Northcon, Nov. 4-6, 1998, pp. 285-290.
JDS Technologies, "Stargate Interactive Automation System," 1998, pp. 1-2.
JDS Technologies, "Stargate, Operation Manual," Mar. 2000, pp. 1-114.
JDS Technologies, "Support: Protocol Specifications," available at http://jdstechnologies.com/protocol.htm, on Feb. 16, 2009, pp. 1-32.
JDS Technologies, "TimeCommander, TimeCommander Plus, User Guide," Jun. 1998, pp. 1-95.
JDS Technologies, "Web Xpander, Installation and Operation Manual," Feb. 2004, pp. 1-34.
Jimenez-Cedeno et al., "Centralized Packet Radio Network: A Communication Approach Suited for Data Collection in a Real-Time Flash Flood Prediction System," ACM-SAC 1993, pp. 709-713.
Johnson Controls, Inc., LonWorks® Digital Controller, 1998, pp. 1-12.
Johnson et al., "Dynamic Source Routing in Ad Hoc Wireless Networks," reprinted in Mobile Computing; Tomasz lmielinski and Hank Korth eds., 1996; Kluwer Academic Publishers, pp. 153-181.
Johnson et al., "Protocols for Adaptive Wireless and Mobile Networking," IEEE Personal Communications, 3(1), Feb. 1996, pp. 1-18.
Johnson et al., "Route Optimization in Mobile IP," Internet Draft (Nov. 28, 1994), available at http://www.monarch.cs.rice.edu/internet-drafts/draft-ietf-mobileip-optim-00.txt., Sep. 26, 2009, pp. 1-29.
Johnson, "Mobile Host Internetworking Using IP Loose Source Routing," Carnegie Mellon University CMU-CS-93-128, DARPA Order No. 7330, Feb. 1993, pp. 118.
Johnson, "Scalable and Robust Internetwork Routing for Mobile Hosts," 1994 IEEE, pp. 1-11.
Kaashoek et al., "FLIP: An Internetwork Protocol for Supporting Distributed Systems," ACM Transactions on Computer Systems, vol. 11, No. 1, Feb. 1993, pp. 73-106.
Kaiser et al., "Low Power Wireless Integrated Microsensors (LWIM), Request for Support to Project", UCLA Electrical Engineering Department, Rockwell Science Center, Sep. 13, 1994, 71 pages.
Kaiser et al., "Low Power Wireless Integrated Microsensors (LWIM)," UCLA; Rockwell Science Center; LWIM Kickoff Meeting, Aug. 8, 1995, Presented to Dr. Ken Gabriel (ARPA), Dr. Elissa Sobolewski (ARPA), and Dr. Joseph Kielman (FBI), 62 pages.
U.S. Appl. No. 12/477,329 Non-Final Office Action dated Aug. 19, 2010.
U.S. Appl. No. 12/477,329 Non-Final Office Action dated Dec. 28, 2009.
U.S. Appl. No. 12/356,358 Final Office Action dated Sep. 15, 2010.
U.S. Appl. No. 12/356,358 Non-Final Office Action dated Jan. 21, 2010.
U.S. Appl. No. 10/792,608 Non-Final Office Action dated Jan. 22, 2010.
U.S. Appl. No. 10/792,608 Final Office Action dated Sep. 2, 2009.
U.S. Appl. No. 10/792,608 Non-Final Office Action dated Feb. 3, 2009.
U.S. Appl. No. 10/792,608 Final Office Action dated Aug. 19, 2008.
U.S. Appl. No. 12/792,608 Restriction Requirement dated Dec. 21, 2007.
U.S. Appl. No. 10/792,608 Non-Final Office Action dated Mar. 21, 2007.
U.S. Appl. No. 12/816,266 Non-Final Office Action dated Oct. 12, 2010.
U.S. Appl. No. 11/814,632 Final Office Action dated Dec. 7, 2010.
U.S. Appl. No. 11/814,632 Non-Final Office Action dated Jul. 13, 2010.
U.S. Appl. No. 12/169,536 Non-Final Office Action dated Oct. 20, 2010.
U.S. Appl. No. 12/689,220 Non-Final Office Action dated Dec. 15, 2010.
U.S. Appl. No. 11/300,902 Non-Final Office Action dated Aug. 6, 2010.
U.S. Appl. No. 11/300,902 Non-Final Office Action dated Nov. 17, 2009.
U.S. Appl. No. 11/300,902 Non-Final Office Action dated Oct. 7, 2008.
U.S. Appl. No. 11/300,902 Final Office Action dated Jun. 4, 2008.
U.S. Appl. No. 11/300,902 Non-Final Office Action dated Oct. 11, 2007.
U.S. Appl. No. 11/300,902 Advisory Action dated Aug. 11, 2008.
U.S. Appl. No. 12/482,892 Non-Final Office Action dated Dec. 13, 2010.
"Wayport's Value Proposition: To provide the industry's best high-speed Internet and business center experience for the airport passenger to stay productive," http://www.wayport.net/airportsoverview (visited Jul. 29, 2003) (2 pages).
"Welcome to UtiliNet: A Wireless Data Communications Solution from Metricom, Inc.," Author: unknown, available at http://web.archive.org/web/19980602804812/www.metricom.com/industrial/utilinet.html on May 10, 2010, pp. 1-10.
"What's Behind Ricochet: A Network Overview," Author: unknown, available at http://web.archive.org/web/20000815090824/www.ricochet.com/ricochet_advantage/tech_overview.html, Aug. 15, 2000, pp. 1-4.
"Wireless Access List—Atlanta Hartsfield International Airport," http://www.ezgoal.com/hotsports/wireless/f.asp?fid=63643 (visited Jul. 29, 2003) (1 page).
"Wireless Access List -0 ATL Admirals Club," http://www.ezgoal.com/hotspots/wireless/f.asp?fid=60346 (visited Jul. 29, 2003) (1 page).
"Wireless Accessories, catalog pages," Home Automation, Inc (archived web page), 1997.
"ESTeem Model 96C," ESTeem Radios (describing a system that was for sale at least as early as 1994).
"Site Survey Report," ESTeem Radios, Sep. 24, 1993.
"Technical Bulletin—Johnson Controls," ESTeem Radios, Jan. 29, 1998.
Abbott et al., "Wireless Product Applications for Utilities," Electric Power Research Institute, Feb. 1996, pp. 1-137.
About AES Corporation, AES IntelliNet, Author: unknown, available at http://web.archive.org/web/19990127093116/www/aes-intellinet.com/ae, on Mar. 5, 2009, pp. 1-2.
ADEMCO Group, 4110DL Security System, Installation Instructions, Oct. 1996, ADEMCO Group, Author: unknown, pp. 1-15.
ADEMCO Group, 4110XM Security System, Installation Instructions, Jul. 1996, ADEMCO Group, Author: unknown, pp. 1-20.
ADEMCO Group, 4120EC Security System, Installation Instructions, Nov. 1990, ADEMCO Group, Author: unknown, pp. 1-17.
ADEMCO Group, 4120XM Security System, Installation Instructions, Oct. 1993, ADEMCO Group, Author: Unknown, pp. 1-80.
ADEMCO Group, 4140XMPT2 Partitioned Security System with Scheduling User's Manual, May 1993, ADEMCO Group, Author: unknown; pp. 1-54.
ADEMCO Group, 4281, 5881, and 5882 Series RF Receivers Installation Instructions, Oct. 1996, ADEMCO Group, Author: unknown; pp. 1-6.
ADEMCO Group, 5330 Alpha Console, Installation Instructions, May 90, ADEMCO Group, Author: unknown, pp. 1-24.
ADEMCO Group, 5706 Smoke Detector with Built-In Wireless Transmitter, Installation Instructions, Dec. 1991, ADEMCO Group, Author: unknown, pp. 1-8.
ADEMCO Group, 5707 Smoke Detector with Built-in Wireless transmitter, Installation Instructions, Aug. 1992, ADEMCO Group, Author: unknown, pp. 1-12.

ADEMCO Group, 5715 Universal Transmitter, Installation Instructions, Mar. 1989, ADEMCO Group; Author: unknown; pp. 1-4.
ADEMCO Group, 5775 Passive Infrared Motion Detector/Transmitter, Installation Instructions, Jul. 1991, ADEMCO Group, Author: unknown; pp. 1-4.
ADEMCO Group, 5808C Photoelectronic Smoke Detector with Built-In Wireless Transmitter Installation Instructions, 1998, ADEMCO Group, Author: unknown; pp. 1-4.
ADEMCO Group, 5800TM Transmitter Module Installation Instructions, Apr. 1994, ADEMCO Group, Author: unknown; pp. 1.
ADEMCO Group, 5801 Remote Wireless Panic Transmitter Installation Instructions, Apr. 1994, ADEMCO Group, Author: unknown; pp. 2.
ADEMCO Group, 5802CP Belt Clip Transmitter Installation Instructions, Nov. 1994, ADEMCO Group, Author: unknown; pp. 1.
ADEMCO Group, 5802MN, Supervised Miniature Transmitter Installation Instructions, Jan. 1995, ADEMCO Group, Author: unknown; pp. 1.
ADEMCO Group, 5802MN2 Supervised Miniature Transmitter Installation Instructions, Jun. 1997, ADEMCO Group, Author: unknown; pp. 1.
ADEMCO Group, 5803 Wireless Key Transmitter Installation Instructions, Nov. 1994, ADEMCO Group, Author: unknown, pp. 2.
ADEMCO Group, 5804 Wireless Key Transmitter Installation Instructions, Jul. 1995, ADEMCO Group, Author: unknown, pp. 3.
ADEMCO Group, 5804BD Bi-Directional Key Transmitter Installation Instructions, Apr. 1997, ADEMCO Group, Author: unknown, pp. 4.
ADEMCO Group, 5806 Smoke Detector with Built-In Wireless Transmitter Installation Instructions, May 1998, ADEMCO Group, Author: unknown, pp. 1-4.
ADEMCO Group, 5807 Smoke Detector with Built-In Wireless Installation Instructions, May 1998, ADEMCO Group, Author: unknown, pp. 1-6.
ADEMCO Group, 5808 Photoelectronic Smoke/Heat Detector with Built-In Wireless Transmitter Installation Instructions, 1998, ADEMCO Group, Author: unknown, pp. 1-8.
ADEMCO Group, 5808 Wireless Smoke Detector, 1999, available at http://web.archive.org/web/20000118015507/www.ademco.com/ademco on Mar. 5, 2009 pp. 1-4.
ADEMCO Group, 5809 Rate-of Rise Heat Detector/Transmitter Installation Instructions, Nov. 1994, ADEMCO Group, Author: unknown; pp. 1-2.
ADEMCO Group, 5816 Door/Window Transmitter Installation Instructions, Nov. 1994, ADEMCO Group, Author: unknown; pp. 1-2.
ADEMCO Group, 5816TEMP Low Temperature Transmitter Installation Instructions, May 1998, ADEMCO Group, Author: unknown; pp. 1-2.
ADEMCO Group, 5818 Recessed Transmitter Installation Instructions, Jan. 1994, ADEMCO Group, Author: unknown; pp. 1-2.
ADEMCO Group, 5819 Shock Processor Transmitter Installation Instructions, May 1998, ADEMCO Group, Author: unknown; pp. 1-2.
ADEMCO Group, 5819WHS Wireless Shock Sensor and Processor, 1997, available at http://web.archive.org/web/19990428164624/www.ademco.com/ademco on Mar. 5, 2009, pp. 1.
ADEMCO Group, 5819WHS/5819BRS Shock Processor Transmitter Installation Instructions, May 1998, ADEMCO Group, Author: unknown; pp. 1-2.
ADEMCO Group, 5827 Remote Wireless Keypad/Transmitter Installation Instructions, Apr. 1994, ADEMCO Group, Author: unknown; pp. 1.
Ademco Group, 5827BD and 5827BDE Wireless Bi-Directional Keypads Installation Instructions and Operating Guide, Mar. 1996, ADEMCO Group, Author: unknown; pp. 1-6.
ADEMCO Group, 5849 Glass Break Detector/Transmitter Installation Instructions, Oct. 1997, ADEMCO Group, Author: unknown; pp. 1-4.
ADEMCO Group, 5850 Glass Break Detector/Transmitter Installation Instructions, May 1998, ADEMCO Group, Author: unknown; pp. 1-4.

ADEMCO Group, 5890 Passive Infrared Motion Detector/Transmitter Installation Instructions, May 1998, ADEMCO Group, Author: unknown; pp. 1-8.
ADEMCO Group, 5890 Wireless PIR Motion Detector, 1997, available at http://web.archive.org/web/19990429054256/www.ademco.com/asc on Mar. 5, 2009, pp. 1-3.
ADEMCO Group, 5890PI Passive Infrared Motion Detector/Transmitter Installation Instructions, Mar. 1998, ADEMCO Group, Author: unknown; pp. 1-4.
ADEMCO Group, 6128RF Keypad/Receiver—full wireless capability, 1997, ADEMCO Group, Author: unknown; pp. 1-2.
ADEMCO Group, 6128RF Keypad/Transceiver Installation Instructions, Jul. 1998, ADEMCO Group, Author: unknown; pp. 1-8.
ADEMCO Group, 6128RF Keypad/Transceiver, User Guide, May 1998, ADEMCO Group, Author: unknown; pp. 1.
ADEMCO Group, 6128WL Keypad/Receiver Installation Instructions, Oct. 1998, ADEMCO Group, Author: unknown; pp. 1-8.
ADEMCO Group, 6128WL Keypad/Receiver User Guide, Oct. 1998, ADEMCO Group, Author: unknown; pp. 1.
ADEMCO Group, 7715DF MicroFAST Installation Tool, User Manual, Feb. 1998, ADEMCO Group, Author: unknown; pp. 1-32.
ADEMCO Group, 7720 Subscriber Radio, Installation Instructions, Jan. 1992, ADEMCO Group, Author: unknown, available at http://www.guardianalarms.net, pp. 1-18.
ADEMCO Group, 7720NX Network Extender, 1997, ADEMCO Group, Author: unknown, available at http://web.archive.org/web/19990220035932/www.ademco.com/ademco on Mar. 5, 2009, pp. 1-3.
ADEMCO Group, 7720NX Network Extender, ADEMCO Group, Author: unknown, 1998; pp. 1-2.
Brownrigg et al., "Technical Services in the Age of Electronic Publishing," Library Resource & Technical Services, Jan./Mar. 1984, pp. 59-67.
Brownrigg, "Continuing Development of California State Radio Packet Project," Proceedings of the ASIS 1992 Mid-Year Meeting (Silver Spring, MD: American Society for Information Science, 1992), pp. 97-100.
Brunninga, "A Worldwide Packet Radio Network," Signal, vol. 42, No. 10, Jun. 1988, pp. 221-230.
Bult et al. Low Power Systems for Wireless Microsensors, UCLA Electrical Engineering Department, 1996 ISLPED, pp. 1-5.
Bult et al., "A Distributed, Wireless MEMS Technology for Condition Based Maintenance," EED, Defense Technical Information Center, UCLA, Electrical Engineering Department, Rockwell Science Center; Apr. 22-26, 1996.
Bult et al., "A Distributed, Wireless MEMS Technology for Condition Based Maintenance," Publisher: unknown; Nov. 1997, pp. 1-8.
Bult et al., "Low Power Systems for Wireless Microsensors," EED, UCLA; ILSPED; 1996, pp. 1-15.
Bult et al., "Low Power Wireless Integrated Microsensors (LWIM)," EED, UCLA; ARPA—LPE PI Meeting, Apr. 27-28, 1995, pp. 1-30.
Bult et al., "Wireless Integrated Microsensors," EED, UCLA Electrical Engineering Department, Rockwell Science Center, TRF; Jun. 6, 1996, pp. 205-210.
Caddx-Caddi Controls, Inc., Ranger 9000E, User's Manual, downloaded from http://www.guardianalarms.net, May 17, 1996, pp. 1-9.
Carlisle, "Edison's NetComm Project," Proceedings of the 33rd Annual Rural Electric Power Conference, IEEE, Apr. 1989, pp. B5/1-B5/4.
Chen et al., "Route Optimization and Location Updates for Mobile Hosts," 1996 IEEE, Proceedings of the 16th ICDCS, pp. 319-326.
Cisco Systems, Inc., Enhanced Interior Gateway Routing Protocol, Cisco Systems, Inc., Updated Sep. 9, 2005, pp. 1-44.
Cisco Systems, RFC1812-Requirements for IP Version 4 Routers, Fred Baker ed. (Jun. 1995), available at http://www.faqs.org/rfcs/rfc1812.html, Sep. 14, 2009, pp. 1-129.
Clement, "SCADA System Using Packet Radios Helps to Lower Cincinnati's Telemetry Costs," WATER/ Engineering & Management, Aug. 1996, pp. 18-20.
Cleveland, "Performance and Design Considerations for Mobile Mesh Networks," Milcom '96 Conference Proceedings, vol. 1 of 3, Oct. 22-24, 1996, pp. 245-249.

Clever Solutions—Metricom offers wireless data networks—includes related articles on Metricom's technology and the SONeTech company—Company Profile, available at http://findarticles.com/p/articles/mi_m0 REL/is_n_11_v93/ai_14770465/?tag=content;col. 1, on Nov. 22, 1993 (3 pages).
Coactive Networks, Inc., A New Solution for Offering Multive Telemetry Services to the Home, Coactive, 1999, pp. 1-8.
Coactive Networks, Inc., Coactive Connector® 1000 Series, Coactive, 2000, pp. 1-4.
Coactive Networks, Inc., Corporate Backgrounder, Coactive, 2001, pp. 1-6.
Coactive Networks, Inc., Corporate Fact Sheet, Coactive, 2001, pp. 2.
Coactive Networks, Inc., Router-LE: Remote Access to LonWorks Over Ethernet, Coactive, 1998, pp. 1-4.
Coactive Networks, Inc., Router-LL: Connect LonWorks Networks Across Internet Protocol, Coactive, 1998, pp. 1-4.
Cohen et al., "IP Addressing and Routing in a Local Wireless Network," 1992 IEEE, 1992, pp. 626-632.
Corbell et al., "Technical Implementation in Support of the IAEA's Remote Monitoring Field Trial at the Oak Ridge Y-12 Plant," Dept. of Energy, Office of Scientific and Technical Information, Report No. Sand-096-1934C, available at http://www.osti.gov/bridge/product.biblio.jsp?qu ery_id=1&page=0&osti_id=270678 (1996).
Corbell et al., "Technical Results of Y-12/IAEA Field Trial of Remote Monitoring System," Dept. of Energy, Office of Scientific and Technical Information, Report No. SAND—97—1781C, available at http://www.osti.gov/bridge/product.biblio.jsp?query_id=0&page=0&osti_id=505711 (1997).
Corcoran et al., "Browser-Style Interfaces to a Human Automation Network," IEEE Transactions on Consumer Electronics, vol. 43, No. 4, Nov. 1997, pp. 1063-1069.
Corcoran et al., "CEBus Network Access via the World-Wide-Web," available at http://ieeexplore.ieee.org/xpl/freeabs_all.jsp?arnu mber= 517285, on Mar. 29, 2009, Paper published on Consumer Electronics, 1996, Digest of Technical Papers, pp. 236-237.
Corcoran et al., "CEBus Network Access via the World-Wide-Web," IEEE, 1996.
Corson et al., "Architectural Considerations for Mobile Mesh Networking," Milcom '96 Conference Proceedings vol. 1 of 3, Oct. 22-24, 1996, pp. 225-229.
Corson et al., "Internet-Based Mobile Ad Hoc Networking," IEEE Internet Computing, Jul.-Aug. 1999, pp. 63-70.
Court's claim construction Order dated Feb. 10, 2009, in SIPCO LLC et al. v. The Toro Co. et al., Case No. 2:08-cv-00505-TJS (E.D. Pa.).
Custom Solutions, Inc. Acessories, available at http://web.archive.org/web/19981206221844/www.csi3.com/hv_pv4.htm on Feb. 27, 2009, pp. 1-3.
Custom Solutions, Inc., HomAtion 2000 for HomeVision, Press Release available at http://web.archive.org/web/19981207075734/www.csi3.com/HV_PR_0 on Feb. 27, 2009, pp. 1-2.
Custom Solutions, Inc., HomeVision 2.7e, Owner's Manual (1999); pp. 1-596.
Custom Solutions, Inc., HomeVision Description, available at http://web.archive.org/web/19981206004955/http://www.csi3.com/HV.htm on Mar. 2, 2009, pp. 1-14.
Custom Solutions, Inc., HomeVision-PC Description, available at http://web.archive.org/web/19981205094024/http://www.csi3.com/hv_pc.htm on Mar. 2, 2009, pp. 1-6.
Custom Solutions, Inc., HomeVision-PC Software, available at http://web.archive.org/web/19990224053817/http://www.csi3.com/hvp3pc.htm on Feb. 27, 2009, pp. 1-2.
Elster's Initial Disclosure of Invalidity Contentions Pursuant to LPR 4.3; *IPCO, LLC* v. *Elster Electricity, LLC*, Northern District of Georgia Case No. 1:05-cv-1138 (183 pages).
Elster's First Supplement to its Initial Disclosure of Invalidity Contentions Pursuant to LPR 4.3; *IPCO, LLC* v. *Elster Electricity, LLC*, Northern District of Georgia Case No. 1:05-cv-1138 (154 pages).
Elster's Second Supplemental to its Initial Disclosure of Invalidity Contentions Pursuant to LPR 4.3; *IPCO, LLC* v. *Elster Electricity, LLC*, Northern District of Georgia Case No. 1:05-cv-1138 (111 pages).
Defendant's Joint Preliminary Invalidity Contentions filed by Defendants Crestron Electronics, Inc. and Wayne-Dalton Corporation in *SIPCO, LLC* v. *AMAZON.COM, Inc.* et al., District Court for the Eastern District of Texas Case No. 2:08-cv-359 (180 pages).
Trilliant Network, Inc.'s Invalidity Contentions Pursuant to Patent Rule 3-3, *IP Co. LLC* v. *Oncor Electric Delivery Company LLC et al.*, District Court for the Eastern District of Texas Case No. 2:09-cv-37 (112 pages).
Sensus's Invalidity Contentions filed by Defendant Sensus USA Inc. in *SIPCO, LLC* v. *SENSUS USA Inc.*, District Court for the Eastern District of Texas Case No. 2:09-cv-37 (21 pages).
Defendant EKA Systems, Inc.'s Invalidity Contentions, *IP Co. LLC* v. *Oncor Electric Delivery Company LLC et al.*, District Court for the Eastern District of Texas Case No. 2:09-cv-37 (110 pages).
EKA Systems, Inc.'s Invalidity Contentions Pursuant to Patent Rule 3-3, *IP Co. LLC* v. *Oncor Electric Delivery Company LLC et al.*, District Court for the Eastern District of Texas Case No. 2:09-cv-37 (110 pages).
Sensus's Invalidity Contentions filed by Defendant Sensus USA Inc. in *SIPCO, LLC* v. *SENSUS USA Inc.*, District Court for the Eastern District of Texas Case No. 6:09-cv-532 (22 pages).
Defendant Datamatic, LTD's Invalidity Contentions to Plaintiff, *SIPCO, LLC* v. *DATAMATIC LTD, et al.*, District Court for the Eastern District of Texas Case No. 6:09-cv-532 (2 pages with 7 claim chart exhibits).
Johnson Controls, Inc.'s Invalidity Contentions and Disclosures Pursuant to P.R. 3-3 and 3-4, *SIPCO, LLC* v. *DATAMATIC LTD, et al.*, District Court for the Eastern District of Texas Case No. 6:09-cv-532 (59 pages.).
Trilliant Networks, Inc.'s Invalidity Contentions to Plaintiff, *SIPCO, LLC* v. *DATAMATIC LTD, et al.*, District Court for the Eastern District of Texas Case No. 6:09-cv-532 (418 pages).
Defendant Datamatic, LTD's Invalidity Contentions to Plaintiff Pursuant to P.R. 3-3(a), *SIPCO, LLC* v. *DATAMATIC LTD, et al.*, District Court for the Eastern District of Texas Case No. 6:09-cv-532 (2 pages with 7 claim chart exhibits).
Johnson Controls, Inc.'s Supplement Letter to the Invalidity Contentions, *SIPCO, LLC* v. *DATAMATIC LTD, et al.*, District Court for the Eastern District of Texas Case No. 6:09-cv-532 (5 pages and 99 page Addendum).
Defendant's Invalidity Contentions Pursuant to P.R. 3-3 and 3-4 filed by Control4 Corporation et al., *SIPCO, LLC* v. *Control4Corporation*, Eastern District of Texas Case No. 6:10-cv-249 (85 pages).
Johnson Controls, Inc.'s Supplemental Invalidity Contentions and Disclosures Pursuant to P.R. 3-3 and 3-4, *SIPCO, LLC* v. *DATAMATIC LTD, et al.*, District Court for the Eastern District of Texas Case No. 6:09-cv-532 (89 pages).
Defendant Toro Company's Motion for Summary Judgment of Invalidity, *Sipco, LLC* v. *The Toro Company, JLH LABS, LLC* and Jason Hill, District Court for the Eastern District of Pensylvania Case No. 08-CV-00505-TJS.
"3Com Invests in Coactive Networks," Coactive (press release), Author: unknown, Dec. 14, 1999, pp. 1-4.
"5808 Photoelectric Smoke/Heat Detector with Built0in Wireless Transmitter Installation Instructions," Ademco, 1998.
"ABB Kent-Taylor Interfacing," Author: unknown, Engineering Report, No. 93-011, Jun. 18, 1996, pp. 1-9.
"AES Central Station Installation & Operation Manual, Document No. 40-0551e," AES Intellinet, Nov. 1996.
"Allen-Bradley Interfacing," Author: unknown, Engineering Report, No. 90-023, Jul. 21, 1999, pp. 1-11.
AN/TSQ-129 Position Location Reporting System (PLRS), Author: unknown, available at http://www.fas.org/man/dod-101/sys/land/plrs.htm on Feb. 22, 2010, pp. 1-3.
"Barrington Interface," Author: unknown, Engineering Report, No. 90-013, Revised: Oct. 1994, pp. 1.
Bell Canada launches public wireless Internet hotspot pilot, Dec. 10, 2002, http://www.bell.ca/3n/about/press/release/2002/pr_20021210.asp (3 pages).
"Bristol Babcock Interfacing," Author: unknown, Engineering Report, No. 95-001, Revised: Apr. 17, 1996, pp. 1-4.
"Caddx Installation Instructions Package, document No. 466-1486," Caddx Controls, Aug. 1998.

"Caddx Installation Instructions Package, document No. 466-1786," CADDX Installation Controls, Inc., Caddx Controls; Author: unknown; Aug. 1998, pp. 1-58.

"Caddx Installation Instructions Package," document No. 466-1786, CADDX Installation Controls, Inc., Caddx Controls; Author: unknown; Jul. 15, 1999, pp. 1-116.

"CADDX NetworX NX-8 Control/Communicator Installation Manual," Caddx Controls, 1996.

"Case Study: Genentech Uses Coactive's Technology to Centralize Monitor and Control Functions in a Mixed Legacy and New Equipment Environment," Coactive, Author: unknown, 1998, pp. 1-4.

"Case Study: Ingham Regional Medical Center Uses Coactive Technology to Monitor and Control Critical Power Generations in a Multi-Campus Environment," Coactive, 1998, pp. 1-4.

"Central Station Manual Section 1 System Overview, document No. 40-0551," AES Intellinet, Dec. 1996.

"Circon Systems Partners with Coactive Networks to Deliver Circon WebControl™," Coactive (press release), Author: unknown; Feb. 7, 2000, pp. 1-4.

"CIRCON Technology Connects Building Management Systems to Internet Using Coactive Routers," Coactive (press release), May 20, 1997.

"CISCO's John Chambers Discusses the Internet Consumer Revolution at CES Using Demo Based on Echelon's LonWorks Technology," Home Toys (press release), Jan. 8, 1999.

Coactive Bridges Gap between Control Systems and Corporate Data Networks with New Off-the-Shelf Router Family, Coactive (press release), Jun. 8, 1998.

"Coactive Enhances Residential Gateway to Enable Multiple Home Networks," Coactive (press release), Author: unknown; Jan. 6, 2000, pp. 1-4.

"Coactive Joins 3Com to Demonstrate Convergence of Control and Enterprise Networks at Retail Systems '98," Coactive (press release), Author: unknown, Jun. 16, 1998, pp. 1-4.

"Coactive Launches First Architecture to Support the Convergence Between Contol and IP Networks," Coactive (press release), Author: unknown, May 20, 1998, pp. 1-4.

"Coactive Leads Standardization Effort for LonTalk Routers," Coactive (press release), May 20, 1997.

"Coactive Leads Standardization Effort for LonTalk/IP Routers," Coactive (press release), Author: unknown, May 20, 1997, pp. 3.

"Coactive Networks and Diverse Networks Team to Deliver End-to-End Infrastructure for Enabling the Digital Home," Coactive (press release), Author: unknown, Aug. 28, 2000, pp. 1-4.

"Coactive Networks and Innovex Technologies Deliver Internet Access to Home Security, Lighting and Climate Control," Coactive (press release), Author: unknown, Feb. 29, 2000, pp. 1-4.

"Coactive Networks and Diverse Networks Team to Deliver End-to-End Infrastructure for Enabling the Digital Home," Coactive (press release), Author: unknown, Aug. 28, 2000, pp. 1-4.

"Coactive Networks and Silicon Energy Partner to Delielver an End-to-End Solution for Internet-Based Energy Monitoring and Analysis," Coactive (press release), Author: unknown, Sep. 19, 2000, pp. 1-4.

"Coactive Networks and Vicinium Systems team to Deliver a Complete Television-Based Interface to Digital Homes and Neighborhoods," Coactive (press release), Author: unknown, Jun. 19, 2000, pp. 1-4.

"Coactive Networks Announces First Shipments of Internet Gateway to Home Control Systems," Coactive (press release), Author: unknown, May 3, 1999, pp. 1-4.

"Coactive Networks Announces Formation of Technical Advisory Board," Coactive (press release), Author: unknown, Oct. 5, 1998, pp. 1-4.

"Coactive Networks Announces System Provider Partner Program," Coactive (press release), Author: unknown, Jan. 25, 1999, pp. 1-4.

"Coactive Networks Expands Support for Management and HMI Applications," Coactive (press release), Author: unknown, Nov. 2, 1998, pp. 1-4.

"Coactive Networks Names Gus Ezcurra Vice President of Sales," Coactive (press release), Author: unknown, Jul. 20, 1998, pp. 2.

"Coactive Networks Names Janice Roberts, 3Com Senior VP, to Board of Directors," Coactive (press release), Author: unknown, Jun. 2, 1998, pp. 2.

"Coactive Networks Powers Innovative Energy Management Solution," Coactive (press release), Author: unknown, Jan. 5, 2001, pp. 1-4.

"Coactive Networks President Named to LonMark Board of Directors," Coactive (press release), Jun. 14, 1998.

"Coactive Networks Shatters Price Barriers with New IP Gateway to Home Control Systems," Coactive (press release), Author: unknown, Oct. 26, 1998, pp. 1-4.

"Coactive Networks to Supply Internet-Based Home Gateways for up to 400,000 customers; First Phase of Deliveries Valued at US$2 Million," Coactive (press release), Author: unknown, Oct. 25, 1999.

"Coactive Networks Unveils the First Full-Service Residential Gateway," Coactive (press release), Author: unknown, May 3, 2000, pp. 1-4.

"Coactive Receives $2 Million in Funding," Coactive (press release), Oct. 15, 1997.

"Coactive Receives First Round of Venture Funding Investors Embrace Control Network Connectivity Technology," Coactive (press release), Author: unknown, Dec. 1, 1997, pp. 2.

"DSC-3500 Meeting the Control and Conservation Challenge," Johnson Controls, 1984, pp. 1-6.

"DTE Energy Technologies Selects Coactive Networks Internet Gateways to Roll Out New Class of E-Services to Businesses," Coactive (press release), Author: unknown, May 3, 2000, pp. 1-4.

"DTE Energy Technologies Selects Coactive Networks to Power Distributed Generation Solutions Worldwide," Coactive (press release), Author: unknown, Aug. 1, 2001, pp. 1-4.

"Echelon Corporation Demonstrates Internet Connectivity in Digital Home Applications at 1999 International Consumer Electronics Show," Home Toys (press release) , Dec. 15, 1998.

"Eight Leading Controls Companies Join Coactive Partner Program," Coactive (press release), Author: unknown, Aug. 21, 2000, pp. 1-4.

"Enhanced Position Location Reporting System (EPLRS)," Author: unknown, available at http://www.globalsecurity.org/military/systems/ground/eplrs.htm on Feb. 22, 2010, pp. 1-3.

"ESTeem Engineering Report, Johnson Controls Interface No. 91-102," Author: unknown, Publisher: unknown, Nov. 1994, pp. 1-14.

"ESTeem Model 96F," Author: unknown, ESTeem Radios; Sep. 6, 1996, pp. 1-2.

"Foxboro Interfacing," Author: unknown, Engineering Report, No. 91-023, Revised: Jun. 19, 1996, pp. 1-5.

"GE Fanuc Interfacing," Author: unknown, Engineering Report, No. 91-010, Revised: Apr. 11, 1996, pp. 1-8.

"General PLC/RTU Interfacing," Author: unknown, Engineering Report, No. 92-010, Revised: Jun. 18, 1996, pp. 1-5.

ADEMCO Group, 7720P Programming Tool, User Guide, Mar. 1992, ADEMCO Group, Author: unknown, available at http://www.guardianalarms.net; pp. 1-8.

ADEMCO Group, 7720Plus Subscriber Radio Installation Instructions, Oct. 1996, ADEMCO Group, Author: unknown, available at http://www.guardianalarms.net; pp. 1-30.

ADEMCO Group, 7720ULF Combination Fire Control and Long Range Radio Transmitter, 1997, ADEMCO Group, Author: unknown, available at http://web.archive.org/web/19990501210612/www.ademco.com/ademco on Mar. 5, 2009, pp. 1-3.

ADEMCO Group, 7720ULF Subscriber Radio, Installation Instructions, Mar. 1995, ADEMCO Group, Author: unknown, available at http://www.guardianalarms.net, pp. 1-20.

ADEMCO Group, 7720V2 Self-Contained Long Range Radio Transmitter, 1997, ADEMCO Group, Author: unknown, available at http://web.archive.org/web/19990501212349/www.ademco.com/ademco on Mar. 5, 2009 pp. 1-4.

ADEMCO Group, 7720V2 Subscriber Radio, Installation Instructions, Jun. 1996, ADEMCO Group, Author: unknown, available at http://www.guardianalarms.net, pp. 1-24.

ADEMCO Group, 7810iR Internet Receiver, Installation and Setup Guide, May 2002, ADEMCO Group, Author: unknown, available at http://www.guardianalarms.net, pp. 1-58.

ADEMCO Group, 7820 Appendicies, Mar. 1995, ADEMCO Group, Author: unknown, available at http://www.guardianalarms.net, pp. 1-2.
ADEMCO Group, 7820 Integrated Radio Transmitter, Installation Instructions, Aug. 1995, ADEMCO Group, Author: unknown, available at http://www.guardianalarms.net, pp. 1-52.
ADEMCO Group, 7825 Outdoor Antenna with Bracket, Installation Instructions, Feb. 1995, ADEMCO Group, Author: unknown, available at http://www.guardianalarms.net, pp. 1-2.
ADEMCO Group, 7830R SafetyNet Subscriber Radio, Installation Instructions, Jun. 1996, ADEMCO Group, Author: unknown, available at http://www.guardianalarms.net, pp. 1-32.
ADEMCO Group, 7830R Subscriber Transmitter, 1997, available at http://web.archive.org/web/19990501215427/www.ademco.com. ademco on Mar. 5, 2009, pp. 1-3.
ADEMCO Group, 7835C Cellular Control Channel Transceiver, Installation and Setup Guide, Sep. 1998, ADEMCO Group, Author: unknown, available at http://www.guardianalarms.net, pp. 1-32.
ADEMCO Group, 7835C Cellular SafetyNet Subscriber Radio Transceiver, 1997ADEMCO Group, Author: unknown, available at http://web.archive.org/web/19990801221202/www.ademco.com/on Mar. 5, 2009, pp. 1-3.
ADEMCO Group, 7845C Cellular Control Channel Transceiver, Installation and Setup Guide, Sep. 1990, ADEMCO Group, Author: unknown, available at http://www.guardianalarms.net, pp. 1-104.
ADEMCO Group, 7845CZ Seven Zone Cellular Control Channel Transceiver, Installation and Setup Guide, Sep. 2001, ADEMCO Group, Author: unknown, available at http://www.guardianalarms.net, pp. 1-64.
ADEMCO Group, 7845i Internet Communications Module, Installation and Setup Guide, Mar. 2002, ADEMCO Group, Author: unknown, available at http://www.guardianalarms.net, pp. 1-42.
ADEMCO Group, 7920SE 900MHz Fully Synthesized Transceiver, 1997, ADEMCO Group, Author: unknown, available at http://web.archive.org/web/19990501222639/www.ademco.com/ on Mar. 5, 2009, pp. 1-3.
ADEMCO Group, 7920SE Transceiver, Installation Instructions, Apr. 1995, ADEMCO Group, Author: unknown, available at http://www.guardianalarms.net, pp. 1-80.
ADEMCO Group, ADEMCO World Leader in Home Security Products, 1997, ADEMCO Group, Author: unknown, available at http://web.archive.org/web/19990428164624/www.ademco.com/ademco on Mar. 5, 2009, pp. 1-2.
ADEMCO Group, AlarmNet Introduces Control Channel Cellular for Commercial Fire/Burglary Applications, ADEMCO Group (press release), Aug. 31, 1999, available at http://web.archive.org/web/19990420234120/www.ademco.com/pr0831 on Mar. 31, 2009.
ADEMCO Group, AlarmNet, 1997, ADEMCO Group, Author: unknown, available at http://web.archive.org/web/199904240234130/www.ademco.com/ademco on Mar. 5, 2009, pp. 1-3.
ADEMCO Group, Alpha Vista No. 5130XT Security System, Installation Instructions, Mar. 1989, ADEMCO Group, Author: unknown, pp. 96.
ADEMCO Group, Compass, 1997, ADEMCO Group, Author: unknown, available at http://web.archive.org/web/19990209094401/www.ademco.com/ademco on Mar. 5, 2009.
ADEMCO Group, Control/Communicator 5110XM User's Manual, Apr. 1996, ADEMCO Group, Author: unknown, pp. 1-30.
ADEMCO Group, Fire and Burglary System Model 5120XM User's Manual, Apr. 1996, ADEMCO Group, Author: unknown, pp. 1-40.
ADEMCO Group, Home Page, ADEMCO Group, Author: unknown, available at http://web.archive.org/web/19961023204954/http://ademco.com/ on Mar. 5, 2009, pp. 1.
Ademco Group, LYNX—Quick Install Security System, 1997, ADEMCO Group, Author: unknown, available at http://web.archive.org/web/19990116225005 pp. 1-3.
ADEMCO Group, Lynx Security System Installation and Setup Guide, Oct. 1998, Ademco Group, Author: unknown, pp. 1-48.
ADEMCO Group, Lynx Security System Programming Form & Summary of Connections, Oct. 1998, Ademco Group, Author: unknown, pp. 1-16.
ADEMCO Group, Lynx Security System User Guide, Oct. 1998, Ademco Group, Author: unknown, pp. 1-40.
ADEMCO Group, Powerline Carrier Device Modules, 1997 ADEMCO Group, Author: unknown, available at http://web.archive.org/web/19990218035115/www.ademco.com/ademco on Mar. 5, 2009, pp. 1-2.
ADEMCO Group, Remote Keypads 6128, 6137, 6137R, 6138, 6139 & 6139R, Installation Guide, Aug. 1998, Ademco Group, Author: unknown, pp. 1-2.
ADEMCO Group, Security System Model 4110DL Programming Form, Oct. 1996, ADEMCO Group, Author: unknown, pp. 1-8.
ADEMCO Group, Security System Model 4110XM Programming Form, Jul. 1996, ADEMCO Group, Author: unknown, pp. 1-4.
ADEMCO Group, Security System Model 4120EC Programming Form, Sep. 1993, ADEMCO Group, Author: unknown, pp. 1-2.
ADEMCO Group, Security System Model 4120XM Programming Form, Sep. 1992, ADEMCO Group, Author: unknown, pp. 1-4.
ADEMCO Group, Security System Model 4130XT/4140/5130XT Programming Form, Jul. 1989, ADEMCO Group, Author: unknown, pp. 1-2.
ADEMCO Group, Security System Model 4140XMP Programming Form, Jan. 1992, ADEMCO Group, Author: unknown, pp. 1-2.
ADEMCO Group, Security System Model 4140XMPT2 Programming Form, Apr. 1996, ADEMCO Group, Author: unknown, pp. 1-4.
ADEMCO Group, Security System Model 5110XM Programming Form, Apr. 1996, ADEMCO Group, Author: unknown, pp. 1-4.
ADEMCO Group, Security System Model 5120XM Programming Form, Jun. 1996, ADEMCO Group, Author: unknown, pp. 1-4.
ADEMCO Group, Security System Model 5140XM Programming Form, Jun. 1993, ADEMCO Group, Author: unknown, pp. 1-4.
ADEMCO Group, Security System Model Vista-10 Programming Form, Sep. 1994, ADEMCO Group, Author: unknown, pp. 1-4.
ADEMCO Group, Security System Model Vista-10SE Programming Form, Apr. 1997, ADEMCO Group, Author: unknown, pp. 1-24.
ADEMCO Group, Security System Model Vista-128B Commercial Burglary Partitioned Security System with Scheduling, Quick Start Guide, Jun. 1998, ADEMCO Group, Author: unknown, pp. 1-39.
ADEMCO Group, Security System User's Manual, Sep. 1996, ADEMCO Group, Author: unknown, pp. 1-88.
ADEMCO Group, The Vista-100 Series, 1997, ADEMCO Group, Author: unknown, available at http://web.archive.org/web19970620010543/www.ademco.com/ademco on Mar. 5, 2009.
ADEMCO Group, The Vista-10SE, 1997, ADEMCO Group, Author: unknown, available at http://web.archive.org/web/19990502214402/www.ademco/com/ademco on Mar. 5, 2009, pp. 1-4.
ADEMCO Group, via16 Programming Form, Jul. 1993, ADEMCO Group, Author: unknown, pp. 1-2.
ADEMCO Group, via 16 Security System, Installation Instructions, Jan. 1992, ADEMCO Group, Author: unknown, pp. 1-24.
ADEMCO Group, via-30+, Vista 10, 4111XM Security System User's Manual, Jul. 1994, ADEMCO Group, Author: unknown, pp. 1-44.
ADEMCO Group, via-30Pse Security System Programming Guide, Apr. 1997, ADEMCO Group, Author: unknown, pp. 1-24.
ADEMCO Group, via-30PSE, VISTA-1SE Security System User's Manual, Jan. 1997, ADEMCO Group, Author: unknown, pp. 1-88.
ADEMCO Group, Vista 4120XM and 4140XMP Security System User's Manual, Jan. 1994, ADEMCO Group, Author: unknown, pp. 1-60.
AES IntelliNet Model 7440 & 7440-XL RF Subscriber Unit, Addendum, AES IntelliNet, Author: unknown, Aug. 29, 2002.
AES IntelliNet Net 77 Version 1.48.30, Installation & Operation Manual, Document 40-0551u, AES Corporation, Author: unknown, Jun. 1999, pp. 1-30.
AES IntelliNet Net 77 Version 1.48.4, Installation & Operation Manual, Document 40-0551u, AES Corporation, Author: unknown, Nov. 2000, pp. 1-36.
AES IntelliNet Net 7K Version 1.48.4, Installation & Operation Manual, Document 40-0551, AES Corporation, Nov. 2000, pp. 1-36.
AES IntelliNet Net7K Version 3, Installation & Operation Manual, Document 40-0551, AES Corporation, Jun. 1999, pp. 1-30.

AES IntelliNet Radio Communication Subscriber Unit 7050, Sep. 16, 1997, available at http://web.archive.org/web/19990203061203/www.aes-intellinet.com/sp on Mar. 5, 2009, pp. 1-2.
AES IntelliNet Theory of Operation, AES IntelliNet; Author: unknown, Dec. 1996, downloaded from http://www.guardianalarms.net, pp. 1-18.
AES IntelliNet Wireless Network Glossary of Terms, document 40-0551u, AES IntelliNet, Author: unknown, Dec. 96, pp. 1-15.
AES IntelliNotes Universal Serial data Interface/USDI, Bulletin No. 55, AES Corporation, Author: unknown, Apr. 5, 2001, pp. 1-12.
AES IntelliTAP Model 7068, Version 1.08, Installation Guide, AES IntelliNet, Author: unknown, Jun. 15, 2000, pp. 1-11.
AES IntelliTRAK 7555-RT GPS Based Vehicle Tracking Unit, Version 2.0a, AES IntelliNet, Author: unknown, Feb. 20, 2001, pp. 1-16.
AES IntelliTRAK 7555-RT GPS Based Vehicle Tracking Unit, Version 2.12, AES IntelliNet, Author: unknown, Nov. 6, 2002, pp. 1-16.
AES Net7000, Installation & Operation Manual, AES Intellinet, Author: unknown, Nov. 24, 1996, pp. 1-76.
AES Net77 Wireless Network Management Software Installation & Operation ManuCentral Station Manual, Section 3, AES IntelliNet, Author: unknown, Dec. 1996, pp. 1-87.
AES UL/ULC System Configuration, AES Corporation, Author: unknown, May 1, 2003, pp. 1.
Agre et al., "Autoconfigurable Distributed Control Systems," ISADS, Apr. 27, 1995.
Airpath Wireless, Inc., "Hot Spot Hardware," Copyright 2003, http://www.airpath.com/programs/hardward/hardware.htm (vistited Jul. 29, 2003) (2 pages).
Alarm Link, Inc. A Brief History available at http://www.alarmlink.com/Default.aspx?tabid=28, on Mar. 23, 2009, pp. 1.
Alarm Link, Inc. Alarm Over IP Products, available at http://www.alarmlink.com/Default.aspx?tabid=38 on Mar. 24, 2009, pp. 1.
AlarmLink, Inc. Central Stations, availabe at http://www.alarmlink.com/Default.aspx?tabid=35, on Mar. 24, 2009.
AlarmLink, Inc. Home Page, avaliable at http://www.alarmlink.com/ on Mar. 24, 2009, pp. 1.
AlarmLink, Inc., "MeshWorks of Los Angeles," available at http://www.alarmlink.com/Default.aspx?tabid=39 on Mar. 24, 2009, pp. 1.
Alwan et al., "Adaptive Mobile Multimedia Networks," IEEE Personal Communications, Apr. 1996, pp. 34-51.
American National Standards Institute, Inc., "ANSI C12.18-1996: Protocol Specification for ANSI Type 2 Optical Port," National Electrical Manufactures Association, 1996.
American National Standards Institute, Inc., "ANSI C12.19-1997: Utility Industry End Device Data Tables," National Electrical Manufactures Association, 1997.
Amir et al., "An Evaluation of the Metricom Ricochet Wireless Network," CS 294-7 Class Project, Department of Electrical Engineering and Computer Science of the University of California at Berkeley, Publisher: unknown, May 7, 1996, pp. 1-20.
Amir, "The Ricochet System Architecture," available at http://www.lariat.org/Berkeley/node2.html, on May 1996, pp. 1-5.
Asada et al., "Low Power Wireless Communication and Signal Processing Circuits for Distributed Microsensors;" Proceedings of the International Circuits and Systems Symposium, ISCAS '97; UCLA, Rockwell Science Center; Jun. 1997, pp. 1-5.
Asada, "Wireless Integrated Network Sensors (WINS)," UCLA, SPIE vol. 3673, Mar. 1999, pp. 11-18.
Baba et al., "Wireless Medium Access Control Protocol for CAN," 4th Int'l CAN Conf., Berlin, Germany, available at http://www.can-cia.org/fileadmin/cia/files/icc/4/baba1.pdf (1997).
Baker et al. "The Architectual Organization of a Mobile Radio Network via a Distributed Algorithm," IEEE, Nov. 1981.
Ball et al., "Reliability of Packet Switching Broadcast Radio Networks," IEEE Transactions on Circuits and Systems, vol. CAS-23, No. 12, Dec. 1976, pp. 806-813.
Beech et al., "AX.25 Link Access Protocol for Amateur Packet Radio, Version 2.2," American Relay & Tucson Amateur Packet Radio Corporation, Jul. 1993, Revised Jul. 1998, pp. 1-143.
Bergstein, "US telco plans WiFi payphone," May 12, 2003, http://www.news.com.au/common/story_page/0,4057,6420676%5E15306,00.html (2 pages).

Bhatnagar et al., "Layer Net: A New Self-Organizing Network Protocol," Department of Electrical Engineering, SUNY, IEEE, 1990.
Black, "Lutron RF Technology, Reliable, First, Forward Thinking," Lutron Electronics Co. Inc., Aug. 2006, pp. 1-16.
Blaney, "HomeRF™ Working Group, 4th Liason Report," IEEE, 802.11-98/360, Nov. 1998, Slides 1-12.
Brain, "How Motes Work," available at http://computer.howstuffworks.com/mote.htm, on Feb. 25, 2010, pp. 1-2.
Brain, "How Motes Work: Ad hoc Networks," available at http://computer.howstuffworks.com/mote3.htm on Feb. 25, 2010, pp. 1-3.
Brain, "How Motes Work: The Basic Idea," available at http://computer.howstuffworks.com/mote1.htm, on Feb. 25, 2010, pp. 1-2.
Brain, "How Motes Work: Typical Applications," available at http://computer.howstuffworks.com/mote2.htm, on Feb. 25, 2010, pp. 1-2.
Brayer, "Implementation and Performance of Survivable Computer Communication with Autonomous Decentralized Control," IEEE Communications Magazine, Jul. 1983, pp. 34-41.
Brownrigg et al., "Development of a Packet-Switching Network for Library Automation," Proceedings of the National Online Meeting Apr. 12-14, 1983, pp. 67-74.
Brownrigg et al., "Electrons, Electronic Publishing, and Electronic Display," Information Technology and Libraries (Sep. 1985), pp. 201-207.
Brownrigg et al., "Implementing Library Automation Plans in a University Computing Environment, Planning for Computing in Higher Education 5," EDUCOM Series in Computing and Telecommunications in Higher Education, 1980, pp. 215-225.
Brownrigg et al., "Online Catalogues: Through a Glass Darkly," Information Technology and Libraries, Mar. 1983, pp. 104-115.
Brownrigg et al., "Packet Radio for Library Automation," Information Technology and Libraries 3 (Sep. 1984), pp. 229-244.
Brownrigg et al., "Packet Switching and Library Automation: A Management Perspective," Proceedings of the 45th ASIS Annual Meeting Oct. 17-21, 1982, vol. 19, pp. 54-57.
AES IntelliNet Model 7050-E Radio Subscriber Unit Installation Manual, AES IntelliNet, Author: unknown, Jul. 17, 2000, available at www.guardianalarms.net, pp. 1-4.
AES IntelliNet Model 7050-E & 7750-E, RF Subscriber Unit, Version 1.71, Installation & Operation Manual, AES IntelliNet, Author: unknown, Feb. 24, 1997, available at www.guardianalarms.net, pp. 1-54.
Nunavut et al., Web Based Remote Security System (WRSS) Model Development, IEEE, Apr. 7-9, 2000, pp. 379-382.
X10, "CK11A ActiveHome, Home Automation System, Owner's Manual," Oct. 23, 1997, pp. 1-56.
X10.com: The Supersite for Home Automation, "What's in the Kit," available at http://web.archive.org/web/19991111133453/www.com/products/x, on Mar. 2, 2009, pp. 1-2.
X10.com: The Supersite for Home Automation, "Wireless Remote Control System (RC5000)," available at http://web.archive.org/web/1999111453227/www.x10.com/products/x1 on Mar. 2, 2009, pp. 1.
X10: The Supersite for Home Automation, "Transceiver Module," available at http://web.archive.org/web/20000229141517/www.x10.com/products/x on Mar. 2, 2009, pp. 1.
Xecom Incorporated, "EX900S Smart Spread Spectrum Transceiver," Nov. 2003 (13 pages).
Young, "USAP: A Unifying Dynamic Distributed Mulitchannel TDMA Slot Assignment Protocol," Rockwell International Communication Systems Division, IEEE (1996).
Yu, "Target Identification Processor for Wireless Sensor Network," Dissertation, Los Angeles: University of California, 1999, pp. 1-110.
Zander et al., "The Softnet Project: A Retrospect," 1988 IEEE, pp. 343-345.
Zich et al., "Distribution, Networks, and Networking: Options for Dissemination", Workshop on Electronic Texts Session III, http://palimpsets.stanford.edu/byorg/lc/etextw/sess3.html, pp. 1-10, Accessed Jul. 17, 2007.
Agre et al., "Development Platform for Self-Organizing Wireless Sensor Networks," Rockwell Science Center and UCLA, Date:Apr. 1999, pp. 257-268.

Kahn, "The Organization of Computer Resources into a Packet Radio Network," IEEE, Jan. 1977, vol. Com-25 No. 1, pp. 169-178.

Rosen, "Exterior Gateway Protocol (EGP)," Bolt Beranek and Newman Inc., Oct. 1982, pp. 1-48.

ADEMCO Group, Control/Communicator 5110XM Installation Instructions, Apr. 1996, ADEMCO Group, Author: unknown, pp. 1-76.

ADEMCO Group, Vista-128FB Commercial Fire and Burglary Partitioned Security System Quick Start Guide, Oct. 1998, ADEMCO Group, Author: unknown, pp. 1-68.

Brain, "How Motes Work: A Typical Mote," available at http://computer.howstuffworks.com/mote4.htm, on Feb. 25, 2010, pp. 1-2.

* cited by examiner

SYSTEMS AND METHODS FOR MONITORING CONDITIONS

CROSS REFERENCE TO RELATED APPLICATIONS AND PRIORITY CLAIM

This application is a continuation of U.S. patent application Ser. No. 09/704,150, filed Nov. 1, 2000, and entitled "System and Method For Monitoring and Controlling Residential Devices, now U.S. Pat. No. 6,891,838; which claims the benefit of U.S. Provisional Patent Application No. 60/201,252, filed May 1, 2000, and entitled "System and Method for Monitoring and Controlling Remote Devices". This application is also a continuation-in-part of U.S. patent application Ser. No. 09/812,044, filed Mar. 13, 2001, and entitled "System and Method For Monitoring and Controlling Remote Devices". U.S. patent application Ser. No. 09/704,150 is also a continuation-in-part of: U.S. patent application Ser. No. 09/271,517, filed Mar. 18, 1999, and entitled, "System For Monitoring Conditions in a Residential Living Community", now abandoned; U.S. patent application Ser. No. 09/439,059, filed Nov. 12, 1999, and entitled, "System and Method for Monitoring and Controlling Remote Devices", now U.S. Pat. No. 6,437,692; U.S. patent application Ser. No. 09/102,178, filed Jun. 22, 1998, entitled, "Multi-Function General Purpose Transceiver", now U.S. Pat. No. 6,430,268; U.S. patent application Ser. No. 09/172,554, filed Oct. 14, 1998, entitled, "System For Monitoring The Light Level Around An ATM", now U.S. Pat. No. 6,028,522; and U.S. patent application Ser. No. 09/412,895, filed Oct. 5, 1999, entitled, "System and Method for Monitoring the Light Level Around An ATM", now U.S. Pat. No. 6,218,953. Each of the above-identified patent applications is incorporated herein by reference in its entirety as if fully set forth below.

TECHNICAL FIELD

The present invention generally relates to monitoring systems, and more particularly to a computerized system for monitoring emergency, alarm, climate, or other conditions in a defined territory.

BACKGROUND

There are a variety of systems for monitoring patients in, for example, a hospital or other closely controlled personal care facility. Similar systems are known to be implemented in retirement communities, or other residential living communities where patient care and monitoring is essential. In facilities such as these, it is important to provide a fast response to personal needs. For example, if a crippled or elderly person falls, often that person cannot get up under their own power. Instead, the person requires assistance from others under such situations.

There are well known patient call systems, which employ an intercom system or other patient-activated call system. Typically, in these systems, a patient may depress a button, pull a cord, or perform some other similar activity to initiate a call for assistance. Unfortunately, these systems generally have fixed activation points. That is, these systems employ mechanisms by which a patient may request assistance, only after reaching a fixed and predetermined location. For instance, a "call" button may be provided on the wall in a bathroom location, as well as one or two other locations within the person's living area. If the person falls, then the person must usually crawl to or otherwise reach the "call" button in order to request assistance. Obviously, if the person falls a substantial distance away from the "call" button, reaching the button presents a difficult task.

Another known conventional system providing patients with more convenient access for requesting assistance is the "Life Call" system. This system allowed a person to wear a wireless call unit that included a button that a person could depress to request assistance. This system was generally designed, or targeted, for use outside a patient-care facility. This system was specifically intended for in-home personal use, and included a base unit that was interfaced to a telephone line. The call unit worn by the patient transmitted a signal to the base unit, which could then initiate a telephone call to a facility that could provide medical or other appropriate response. The "Life Call" system also included an intercom that allowed the person, once a telephone connection was established, to verbally communicate from the person's remote transmitter to a remote location by way of the base unit. A disadvantage of this type of system, however, is that the system is limited in that if a patient travels too far from the base unit, then the remote transmitter becomes out of range and cannot access the base unit.

BRIEF SUMMARY OF THE INVENTION

The present invention is generally directed to a system for monitoring a variety of environmental and/or other conditions within a defined region. In accordance with a preferred embodiment of the invention, a system is configured to monitor alarm conditions in a defined area. The system is implemented by using a plurality of wireless transmitters, wherein each wireless transmitter can be integrated into an alarm. The term "alarm" is to be broadly construed and can include, but is not limited to, a smoke alarm, a carbon monoxide detector, a security system, and a climate control system. The system can also include a plurality of repeaters dispersed throughout the region at defined locations. Defined locations are meant to include that the location of the repeaters are known. A central computer may be informed of the repeater locations after installation of the repeaters, as the installation locations of the repeaters is not limited. Further, the system can also include a computer to receive information communicated from the repeaters. The computer can further include evaluating means for evaluating the received information, identifying an alarm condition, and an originating location of the alarm condition. The computer can further include reporting means for reporting the alarm condition to a remote location.

Consistent with various embodiments of the invention, the evaluating "means" for evaluating the received information and the reporting "means" for reporting the alarm condition are not limited to a particular embodiment or configuration. These "means" are preferably implemented in software that is executed by a processor within a computer. Dedicated circuitry, hardware, or other appropriate evaluating and reporting mechanisms however may also be used to carry out the more broadly defined functions. For example, in a preferred embodiment, a computer reports alarm conditions to a remote facility by establishing a dial-up connection with a predefined phone number across the public switched telephone network (PSTN). In another embodiment, a computer reports alarm conditions to a remote facility by communicating an email message, via the Internet, or other computer network. The computer may be connected to a LAN, whereby alarm conditions may be communicated via email messages to various persons/workstations locally.

By way of illustration, suppose an alarm condition is identified as an improper thermostat setting of the thermostat that is located in an identified room of a residential living complex. The computer may email a staff or maintenance person that may be near to that room an appropriate message, so that the staff or maintenance person can check on the thermostat, before the temperature in the room reaches an unacceptable level. Alternatively, suppose an alarm condition is identified as an "emergency" or distress signal from a transmitter assigned to a predetermined person. The computer may evaluate the transmitter number to identify the particular person, and then may identify the approximate location of the person by evaluating the repeater identification number and knowing the installation location of the repeater. The computer may relay by page, alarm, or other means an appropriate distress call to assist a person in need of assistance.

In certain embodiments, the repeaters may be eliminated from the system; specifically, embodiments in which the transmitters are integrated into an alarm in a stationary fashion. In such embodiments, the computer may identify a transmitter location based upon the transmitter identification number alone, and the repeater identification need not be utilized. Alternatively, repeaters may be integrated into various alarms having fixed or known locations. That is, rather than integrating transmitters into alarm devices, repeaters may be integrated into alarm devices.

The repeaters may be configured to perform the repeater function as described above (i.e., relaying information from transmitters to a central computer). In addition, other circuitry may be provided to directly interface with the alarm. Therefore, in addition to relaying information originating a remote transmitters, this type of repeater may also originate "transmitter" information. At the central computer, such a transmission may be recognized by identifying the repeater identification number and an alarm code, without a corresponding transmitter identification number. Therefore, a system may include some alarm devices that include integrated transmitters, and other alarm devices that include integrated repeaters.

In accordance with another preferred embodiment of the present invention, a system may be provided for monitoring conditions in a residential living community. This embodiment may include a computer that is configured to execute at least one computer program to manage the environment of the community by monitoring select information that is reported to the computer. The system can also include a plurality of wireless transmitters to transmit select information. Further, the system can include a plurality of repeaters dispersed throughout the community at defined locations. Each repeater can be configured to receive select information transmitted from a nearby wireless transmitter and further communicate that select information to the computer. The computer can also include communicating means for communicating the received information to a remote facility, as well as evaluating means for evaluating a received message and determining an appropriate course of action. Again, "means" elements are preferably implemented in computer software, but are not intended to be limiting to only such an implementation.

In accordance with another preferred embodiment, a system according to the present invention may include a computer to execute at least one computer program to manage the environment of the community by monitoring select information. The system can also include a plurality of wireless transmitters to transmit select information as well as transmitter identification numbers a relatively limited distance. At least one transmitter may be a totable transmitter, at least one transmitter may be integrated into a smoke detector, and at least one transmitter may be integrated into a thermostat. In addition, the system can include plurality of repeaters dispersed throughout the community. Each repeater can receive select information transmitted from a nearby wireless transmitter, communicate that select information to the computer, and each repeater can transmit a repeater identification number along with the select information. A circuit may be configured as a gateway between the computer and an external telecommunications network.

The system may also include a computer program executed by the computer. In an embodiment, the computer program may include a first code segment, a second code segment, a third code segment, and a fourth code segment. The first code segment can evaluate a received message and identifying a specific transmitter that transmitted the message. The second code segment can evaluate the received message and identify a specific repeater that relayed the message from the specific transmitter to the computer. The third code segment can evaluate the select information transmitted from a transmitter and embedded within the received message. The fourth code segment can determine an action to be taken based upon the select information, the identified transmitter, and the identified repeater.

In another preferred embodiment of the present invention, an environmental management system to communicate environmental management data can comprise a plurality of wireless transmitters to transmit information, and a plurality of repeaters to receive information transmitted from one of the wireless transmitters. The transmitters can access any of the repeaters such that the repeaters are not individually associated with the transmitters. Conventional systems do not possess such a feature and require a one-to-one relationship between repeaters and transmitters. In addition, the transmitters do not have a one-to-one relationship with the repeaters which enables any of the transmitters to access any of the repeaters. Preferably at least one transmitter is a totable transmitter, and at least one transmitter is integrated into a smoke detector, and at least one transmitter is integrated into a thermostat.

The system can further comprise a computer and a gateway. The repeaters can communicate the information to the computer and the computer can execute a program to monitor information provided to the computer from the repeaters. The gateway can receive information from the computer and provide the information to a network via a WAN. Also, the gateway can be at least one of a modem to establish a dial-up connection with a remote computer, a network card to communicate across a local area network, a network card to communicate across a WAN, an ISDN card, and a circuit to communicate via TCP/IP protocol over the Internet. The computer program can comprise a first segment to evaluate a message and identify a specific transmitter that transmitted the message; a second segment to evaluate the message and identify a specific repeater that relayed the message from the specific transmitter to the computer; a third segment to evaluate the information and the message transmitted from a transmitter; and a fourth segment to determine an action to be taken based upon the information, the identified transmitter, and the identified repeater.

The transmitters and repeaters of the system can also have various characteristics. For example, at least one of the wireless transmitters can transmit and receive a radio-frequency signal, and at least one repeater can receive and transmit a radio-frequency signal. In addition, at least one repeater can transmit a radio-frequency signal having a different modulation than the RF signal received by the at least one repeater. The transmitters can also include a microphone, a speaker, and a transceiver for communicating information to the computer. In addition, the transmitter information can include data associated with a personal transmitter, a smoke detector, a security alarm, and a thermostat, and repeater indicia includes repeater location information.

In yet another preferred embodiment of the present invention, a system to manage an environment comprises a computer to execute at least one program to manage the environment by monitoring information provided to the computer, a plurality of wireless transmitters, and a plurality of repeaters dispersed throughout the environment. The repeaters can be configured to receive information transmitted from one of the wireless transmitters, and communicate the information to the computer. The transmitters can access any of the repeaters such that the repeaters are not individually associated with one of the transmitters. The system can also include a gateway to receive the information from the computer and transmit the information to a remote location via a WAN. At least one of the repeaters can also include an alarm device to detect an alarm condition, the at least one repeater being adapted to transmit the alarm condition to the computer. The alarm device can be a smoke detector, a carbon monoxide detector, a carbon dioxide detector, a thermostat, or a security sensor.

In still yet another preferred embodiment of the present invention, an environmental management system for a residential living community can comprise a computer, wireless transmitters, repeaters, a gateway, and a computer program. The computer can be configured to execute at least one computer program that manages the environment of the community by monitoring select information that is reported to the computer. The wireless transmitters can be configured to transmit select information as well as transmitter identification numbers a relatively limited distance. The transmitters can be totable, and can be integrated into a smoke detector, and at least one transmitter is integrated into a thermostat. In addition, the transmitters can access any of the repeaters and thus are not dedicated to a single repeater or have a one-to-one relationship with a single repeater.

The repeaters can be dispersed throughout the community at defined locations. Each repeater can be configured to receive select information that is transmitted from a nearby wireless transmitter and further communicate that select information to the computer. Each repeater can be further configured to transmit a repeater identification number along with the select information. In addition, the circuit can be configured as a gateway between the computer and an external telecommunications network.

The computer program can be executed by the computer and can comprise various segments. For example, a first segment can evaluate a received message and identify a specific transmitter that transmitted the message, and a second segment can evaluate the received message and identify a specific repeater that relayed the message from the specific transmitter to the computer. Also, a third segment can evaluate the select information transmitted from a transmitter and embedded within the received message. In addition, a fourth segment responsive to the first, second, and third segments can determine an action to be taken based upon the select information, the identified transmitter, and the identified repeater.

DETAILED DESCRIPTION OF PREFERRED EMBODIMENTS

Figure 1:
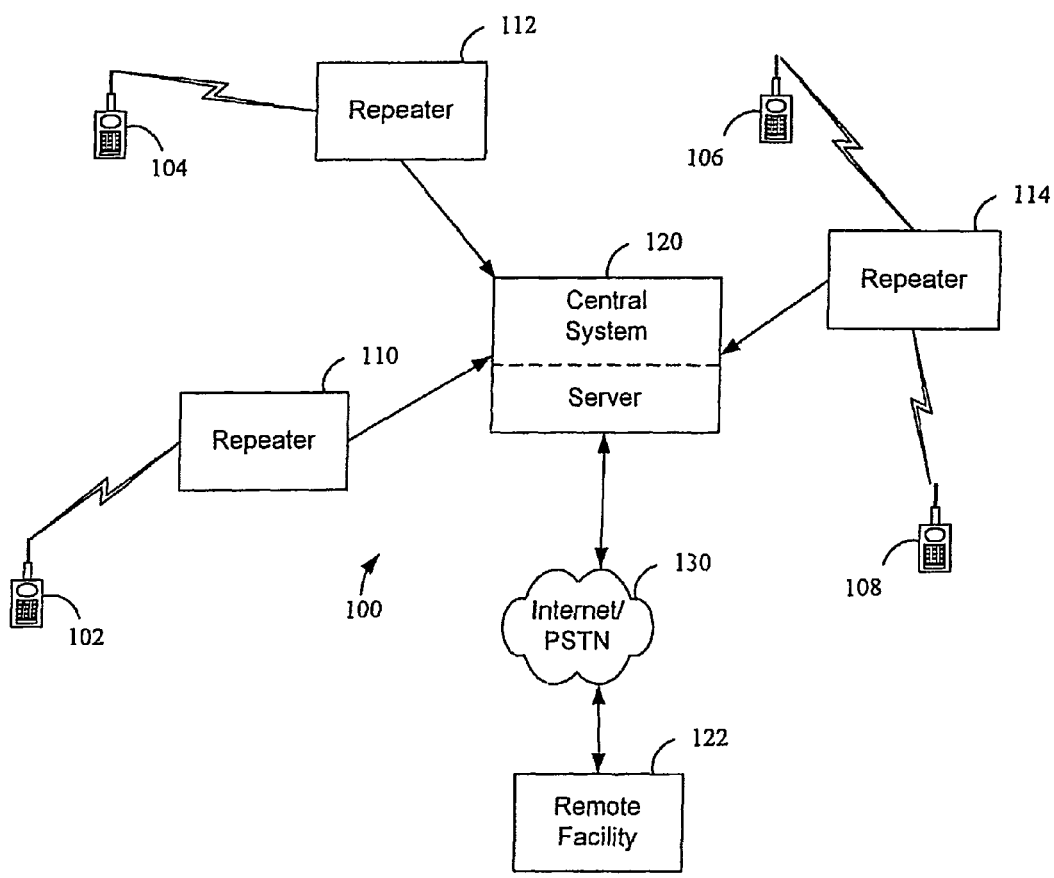
FIG. 1 is a diagram of a system constructed in accordance with a preferred embodiment of the present invention.

Referring now to the drawings, reference is made to FIG. 1, which is a diagram illustrating certain fundamental components of a system 100 in accordance with one preferred embodiment of the present invention. The system 100 can include a plurality of transmitters 102, 104, 106, and 108. These transmitters 102, 104, 106, and 108 are preferably RF (Radio Frequency) transmitters that are relatively small in size and transmit a relatively low power RF signal. The transmission range of a given transmitter 102, 104, 106, and 108 is preferably relatively limited in some embodiments. As will be appreciated from the description that follows, this relatively limited transmission range of the transmitters 102, 104, 106, and 108 is an advantageous and desirable characteristic of the system 100. Although the transmitters 102, 104, 106, and 108 are depicted as including a keypad, in certain embodiments of the invention the transmitters 102, 104, 106, and 108 may include many types of user interfaces. In other embodiments, the transmitters 102, 104, 106, and 108 may not include any external buttons at all. Instead, the transmitters 102, 104, 106, and 108 may be electrically integrated into another device, such as a smoke detector, a thermostat or a security system, where external buttons are not needed.

The system 100 also includes a plurality of repeaters 110, 112, and 114. Each repeater 110, 112, and 114 is configured to receive an incoming RF transmission and to transmit an outgoing signal. This outgoing signal may be a high power RF transmission signal, or an electrical signal over a conductive wire, fiber optic cable, or some other transmission medium. The internal architecture of a representative transmitter 102 and repeater 110 will be discussed in more detail below in connection with FIGS. 3 and 4. As will also be described in more detail below, the repeaters 110, 112, and 114 may be stand alone devices or be integrated into an alarm device, such as a smoke detector, a security system, or a thermostat, for example.

The system 100 also includes a processor, preferably a computer 120. The computer 120 is disposed to receive communications from the various repeaters, 110, 112, and 114, analyze the transmissions so received, and carry out any appropriate operations. The computer 120 may communicate information or service requests to remote locations, such as a remote facility 122, via a connection 130, for example a direct dial link over the PSTN 130, or via a TCP/IP connection across the Internet 130.

Figure 2A:
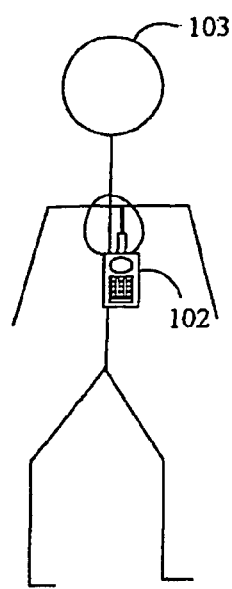
FIGS. 2A-2D illustrate different environments in which a transmitter unit may be integrated within in accordance with some embodiments of the present invention.

The system 100 may be used in a variety of environments. In accordance with a preferred embodiment, a system 100 such as that illustrated in FIG. 1 may be employed in a retirement community. The system 100 may be implemented in a manner to provide universal monitoring, control of residents, and control systems within the community. For example, an RF transmitter 102 may be worn or carried by each resident within the community (see FIG. 2A). If at any time the resident 103 is in need of medical assistance, the resident 103 may signal for such assistance by simply pressing a button provided on the transmitter 102. This request for assistance may be communicated from the transmitter 102 to a nearby repeater 110 (see FIG. 1). The repeater 110 may then further communicate this information to a central computer 120.

Since the transmitter unit 102 is preferably wireless, it may be toted about without restriction or limitation. In addition, the transmitter 102 may be configured to communicate encoded information that identifies the transmission as being a request for assistance, as well as transmitting information that identifies the particular person in possession of the transmitter 102. The repeater 110 may receive and further communicate this information to the computer 120. The repeater 110 may also add a repeater identification number to the information it communicates. The computer 120 may evaluate the repeater identification number to ascertain the proximate location of the transmitter 102. This evaluation will assist personnel in rapidly locating the individual in need of assistance.

Once this proximate location information has been ascertained, the computer 120 may summons the appropriate personnel to provide assistance, in any of a variety of manners. For example, one manner may be to alert one or more persons by way of a direct dial telephone connection across the PSTN 130 where a request for assistance may be communicated to a remote location by dialing a predetermined phone number. In another manner, the computer 120 can communicate this information to one or more remote locations via the Internet 130 or a WAN. In one embodiment, for example, a server may be provided in connection with the computer 120 to maintain a constant connection to the Internet, so that a request issued there across may be done so rapidly, without the delay associated with the normal start-up and connection. Alternatively, for intermittent requests, a constant connection need not be maintained to the Internet.

In accordance with one implementation of a system constructed in accordance with a preferred embodiment, the computer 120 may communicate emergency request information to a centralized remote facility 122. Such a centralized facility 122 may be configured to receive such requests from a plurality of different retirement communities, or other locations. Upon receiving requests for assistance, an operator at the remote facility 122 may then contact the appropriate personnel at a given community (the community requesting assistance). Such an implementation eliminates the need for each individual community to employ a full-time operator to monitor requests that come across the computer 120.

In accordance with another implementation of a system constructed in accordance with the invention, the computer 120 may be configured to issue a page to personnel in response to the request for assistance. For example, consider a vertically-integrated retirement community comprising a high-rise apartment building having many floors. There may be one or more staff individuals, at a given time, stationed on each floor. If the repeater 110, through which a request for assistance is transmitted, is located on, for example, the seventeenth floor, then the computer 120 may page a designated staff person (or office) located on the seventeenth floor, to relay the request for assistance. This page may be by way of an intercom system, a remote paging unit (e.g., a personal pager), or otherwise. The information transmitted with the page may include (as will be further described below) the identification and/or description of the person needing emergency assistance.

Figure 2B:
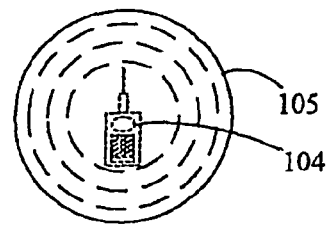

In accordance with the universality of the embodiments of the present invention, transmitter units 102, 104, 106, and 108 may be electrically integrated into various equipment, as well as being toted by individuals. For example, a transmitter 104, similar to transmitter 102, may be integrated into a smoke detector (see FIG. 2B), in such a way that an alarm condition from the smoke detector 105 may initiate a transmission from the transmitter 104 in much the same way that the user 103 (FIG. 2A) could initiate a transmission from the transmitter 102 by depressing a button. Like the events described above, the transmitter 104 may transmit a transmitter identification number, as well as a transmitter code, to a nearby repeater 112 (FIG. 1). The repeater 112 may then add to this transmission a repeater identification number conveying location information to the computer 120. It will be appreciated that integrating a transmitter 104 into a smoke detector 105 in this fashion enables smoke detectors 105 to be installed in a variety of locations, without having to be pre-wired into a particular location. Furthermore, for smoke detectors 105 that have been prewired with a power source, additional communication lines need not be prewired, as communications from the smoke detector 105 may be communicated via RF to a nearby repeater 112. Upon receiving a transmission that the computer 120 identifies as being a smoke alarm, the computer may communicate a request to a remote facility, such as a nearby fire station, as well as alerting staff persons on the premises of the emergency situation, so that corrected action may be taken immediately.

Figure 2C:
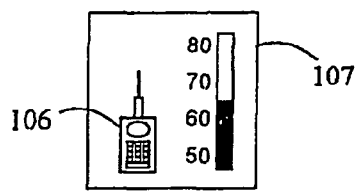

In yet another embodiment, a wireless transmitter 106 may be integrated into a climate control system 107. Specifically, the transmitter 106 may be integrated into a thermostat 107 in such a way that it periodically transmits the settings of the thermostat 107, as well as the sensed temperature to the computer 120 (See FIG. 2C). This information may be sent and identified by a transmitter code indicating only routine information. If, however, the temperature controls on the thermostat 107 are set to extreme temperatures, the transmitter code transmitted to the computer 120 may be different, so as to demand a higher priority of response.

Alternatively, a first transmitter code may be communicated for the temperature settings, and a different transmitter code may be communicated based upon temperature readings. In such an embodiment, the computer 120 may, based upon the transmitted code, make the ultimate determination as to the priority to assess a given transmission. It will be appreciated that, particularly in retirement communities having elderly and perhaps infirmed people, the thermostat settings may be inadvertently set to inappropriate levels. Utilizing the transmission capabilities of the present invention, such settings may be closely monitored so that appropriate personnel may be summoned to rectify a problem, before the temperature reaches extreme levels. In the past, one alternative solution to this problem has simply been to limit the ability of persons within such a community to exercise independent control over thermostats within their room or living area. A system in accordance with the present invention overcomes the shortcomings, while providing control and flexibility to the residents within the community.

In accordance with yet another embodiment of the present invention, a transmitter 108 may be integrated into a residential security system. For example, the transmitter 108 may be integrated within a sensor (not shown), such as the type that may sense a window 109 (see FIG. 2D). Integrating the transmitter 108 in this way, into either a window sensor, door sensor, a motion detector, or other security sensor, allows the system 100 to provide more comprehensive information and monitoring capability. Furthermore, a central monitoring facility 122 can be utilized to monitor a variety of emergency or other conditions that may arise, providing a more cost effective system implementation. Moreover, in older structures, where security wiring may not be prewired into windows and doors, the wireless transmitter 108 allows for ready adaptation of a window, door, or other structure, without having to undertake the expense of routing security wiring throughout the structure.

The various transmitters 102, 104, 106, and 108 may have substantially identical construction (particularly with regard to their internal electronics). Such construction provides a cost effective implementation at the system level. Furthermore, a plurality of repeaters 110, 112, and 114, which may be identical, can be disposed throughout a complex providing adequate coverage in a complex or community. Preferably, the repeaters, 110, 112, and 114 may be dispersed so that only one repeater 110, 112, and 114 will pick up a transmission from a given transmitter 102, 104, 106, and 108 (due in part to the low power transmission nature of each transmitter). In certain instances, however, two, or even more, repeaters 110, 112, and 114 may receive a single transmission from the transmitters 102, 104, 106, and 108. Thus, the computer 120 may receive multiple requests from the same transmitter 102, 140, 106, and 108, but from different repeaters 110, 112, and 114. The computer 120 may utilize this information to triangulate, or otherwise more particularly assess the location from which the transmission is originating.

Figure 2D:
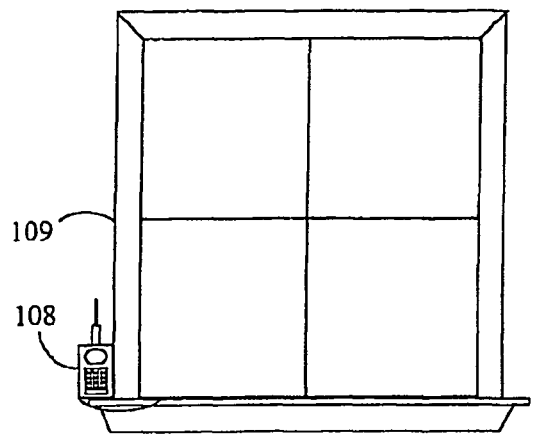

In accordance with another preferred embodiment, repeaters 110, 112, and 114 may be integrated into alarm devices like the smoke alarm 105 (of FIG. 2B), the thermostat 107 (of FIG. 2C) or the security system (of FIG. 2D). The advantage of integrating a repeater, as opposed to a transmitter, into an alarm device relates to the ability of the repeater to receive incoming information, as opposed to merely transmitting information.

The central computer 100 may communicate back to the repeaters 110, 112, and 114 in some embodiment of the present invention. For example, in a repeater that is integrated into an alarm device, such as a thermostat, the repeater may communicate thermostat settings and/or temperature readings to the central computer 100. If the central computer 100 determines that the setting and/or readings exceed certain predetermined values, it may page an attendant or other service personnel to attend to the thermostat. Alternatively, the computer 100 may communicate (via RF or otherwise) a message back to the repeater, which may be configured to assume, or override, control of the thermostat.

Figure 3A:
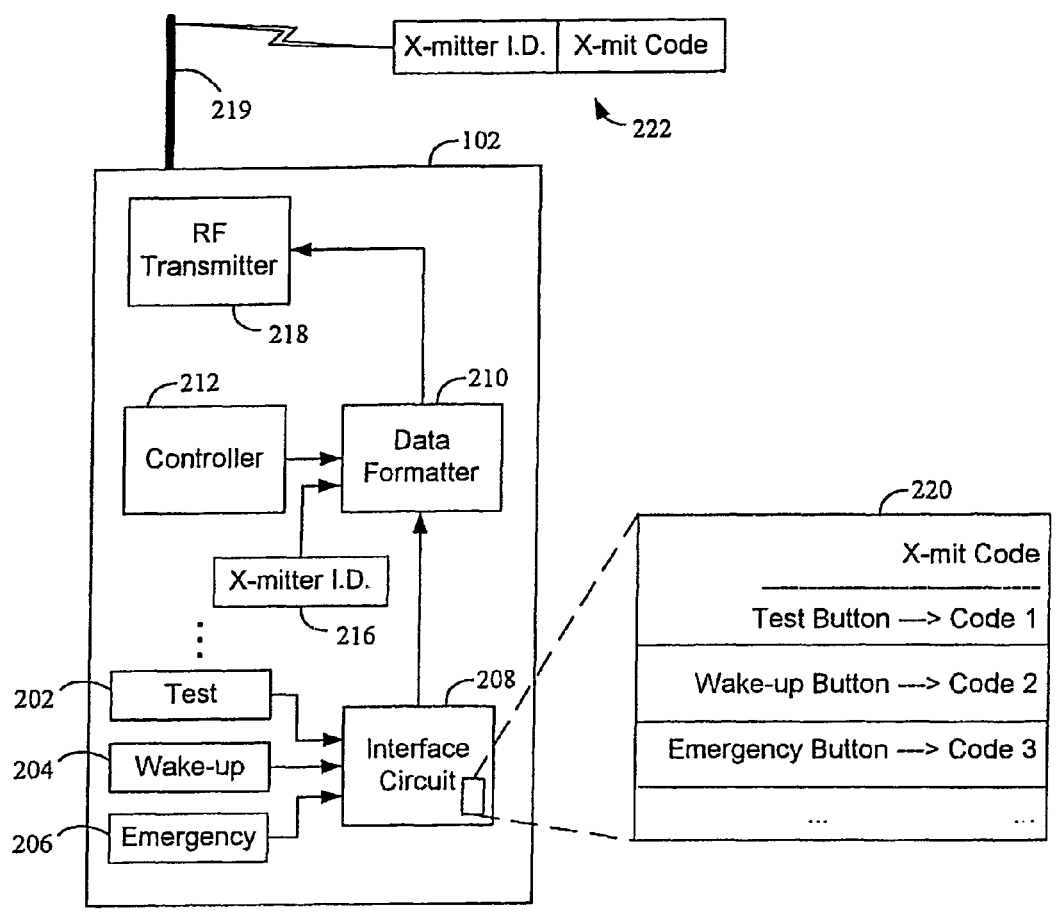
FIGS. 3A-3D are block diagrams illustrating certain functional components of a transmitter in accordance with some embodiments of the present invention.

Reference is now made to FIG. 3A, which is a block diagram illustrating certain functional components of a transmitter 102. The transmitter 102 can be worn or carried by a person. Blocks 202, 204, and 206 represent physical buttons, which a user may actuate to cause the transmitter 102 to initiate different transmissions. For example, these include a "test" button 202, a "wake-up" button 204, and a panic or "emergency" button 206. Of course, additional, fewer, or different buttons may be provided on a given transmitter, depending upon the system or implementation desired. Each of these buttons 202, 204, and 206 may be electrically wired to an interface circuit 208 configured to receive electrical signals from the buttons 202, 204, and 206, and convey that information to a data formatter 210. In an embodiment, the interface circuit 208 may simply comprise an addressable port that may be read by the data formatter 210.

Each of the signal lines extending between the buttons and the interface circuit 208 may be pulled up by individual pull up resistors (not shown). Depressing any of the individual buttons may ground the electrical signal line interconnecting the respective button and the interface circuit 208. The data formatter 210 may constantly read from the port defined by the interface circuit 208, and all bit positions should remain high at any given time, if no buttons are depressed. If, however, the data formatter 210 reads a zero in one or more of the bit positions, it then recognizes that one or more of the buttons 202, 204, and 206 have been depressed.

A controller 212 is also illustrated, and may be provided to control the overall operation of the transmitter 102. The controller 212 may be implemented by dedicated circuitry or, alternatively, may be implemented by a CPU executing software to carry out the various desired functional and features unit.

Each transmitter 102, 104, 106, and 108 may be configured to have a unique identification code (e.g., transmitter identification number) 216, that uniquely identifies the transmitter to the central computer 120. This transmitter identification number 216 may be electrically programmable, and implemented in the form of, for example, an EPROM. Alternatively, the transmitter identification number 216 may be configured through a series of DIP switches. Additional implementations of the transmitter identification number 216, whereby the number may be configured by the computer 120 or the remote facility 122, may be implemented in another embodiment of the present invention.

An additional functional block of the transmitter 102 is an RF transmitter circuit 218. This circuit 218 is used to convert information from digital electronic form into a format, frequency, and voltage level suitable for transmission from antenna 219 via an RF transmission medium.

The data formatter 210 operates under the control of controller 212 to format concise data packets 222 that may be transmitted via RF to a nearby repeater. The information conveyed in the packets 222 can include a transmitter code and a transmitter identification number 216. As previously mentioned, the transmitter identification number 216 is set for a given transmitter 102. When received by the central computer 120, the transmitter identification number 216 may be used to access a look-up table that identifies, for example, the person assigned to carry that particular transmitter 102. Additional information about the person may also be provided within the look-up table, such as, a physical description, and/or any other information that may be deemed appropriate or useful under the circumstances or implementation of the particular system. In addition, a transmitter code can also be communicated from the transmitter 102 to the nearby repeater.

FIG. 3A illustrates a look-up table 220 that may be provided in connection with the data formatter 210. The look-up table 220 may be provided to assign a given and unique transmitter code for each button pressed. For example, the test button 202 may be assigned a first code, the wake-up button 204 may be assigned a second code, and the emergency button 206 may be assigned a third code. Additional codes may be provided as necessary to accommodate additional functions or features of a given transmitter 102. In operation, a user may depress the emergency button 206, which is detected by the data formatter 210. The data formatter 210 may then use the information pertaining to the emergency button 202 to access a look-up table 220 to retrieve a code uniquely assigned to the emergency button 206. The data formatter may also retrieve the preconfigured transmitter identification number 216 in configuring a data packet 222 for communication via RE signals to a nearby repeater.

Figure 3B:
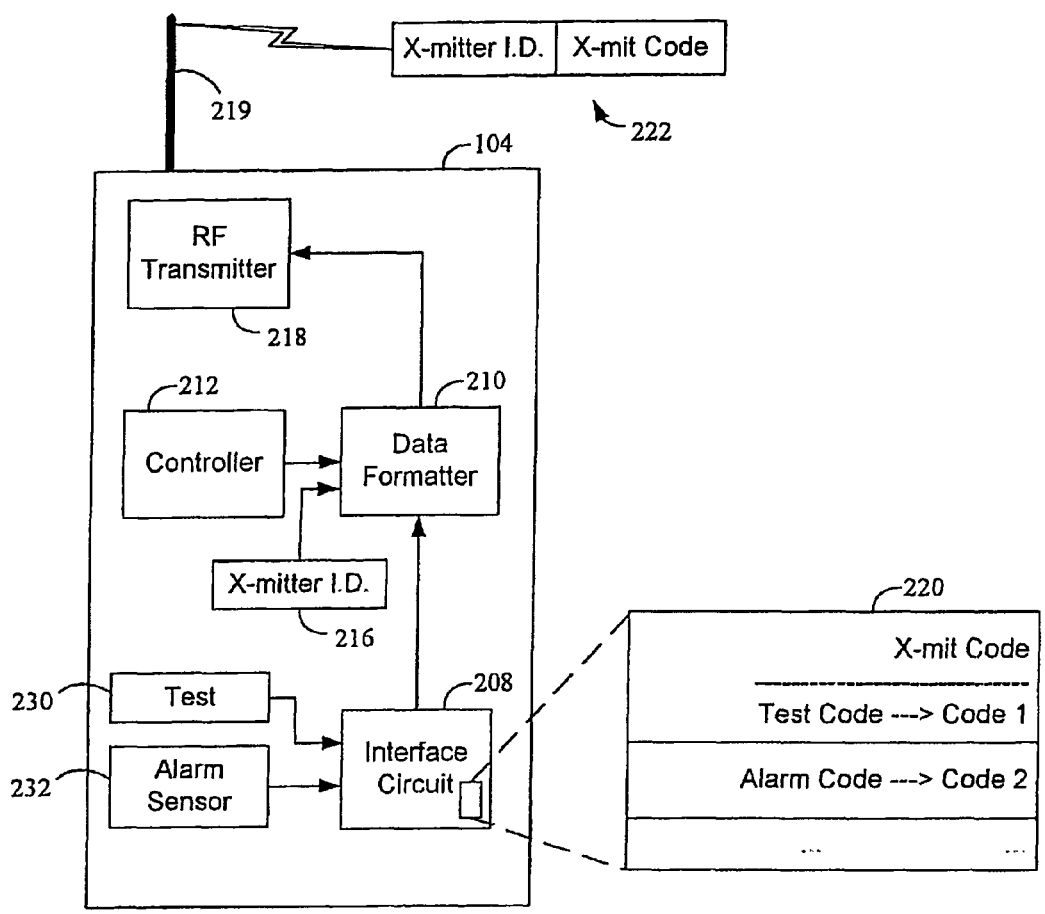

Reference is now made to FIG. 3B, which is a block diagram illustrating certain functional blocks of a transmitter 104 that may be integrated into a smoke alarm 105. As illustrated, many of the components of the transmitter 104 are similar to that of transmitter 102 and are not repeated for brevity. The principal difference between the configurations of the transmitter 102 of FIG. 3A and the transmitter 104 of FIG. 3B lies at the input of the interface circuit 208. Specifically, transmitter 102 included user interface buttons 202, 204, and 206. Transmitter 104, instead, illustrates a test button 230 and an alarm sensor/output 232. Most smoke detectors/alarms include a button that allows a user to manually test the operation of the smoke alarm. The test button 230 may be input to the interface circuit 208, and may be assigned a unique code (Code 1) for communication to the central computer 120. In similar fashion, an alarm sensor 232 (or other alarm circuitry) may provide an additional input to the interface circuit 208. A unique transmitter code (Code 2) may be assigned to the alarm sensor 232 input. In this way, the data packet 222 communicated from transmitter 104 can contain information enabling a receiving device to distinguish between a manual test of the smoke alarm and an actual alarm of the smoke alarm.

In one embodiment, if an alarm output is directed to the interface circuit 208, then upon a manual test by depressing test button 230, signals from both the test button 230, as well as the alarm sensor 232 may be input to the interface circuit 208. Thus, two data packets 222 may be communicated from the transmitter 104. One data packet 222 may include the transmitter code associated with the test button 230, while a second data packet 222 may include the transmitter code associated with the alarm sensor 232. In such a configuration, the central computer 120 could readily discern that the alarm sensor 232 was triggered in response to a manual test. The central computer 120 could also detect improper operation of a smoke alarm if, for example, it received a data packet 222 indicating depression of the test button 230, but did not receive a corresponding packet indicating activation of the alarm. Additional and/or alternative configurations may also be provided. For example, a similar configuration may be provided for a transmitter integrated into, for example, a carbon monoxide detector.

Figure 3C:
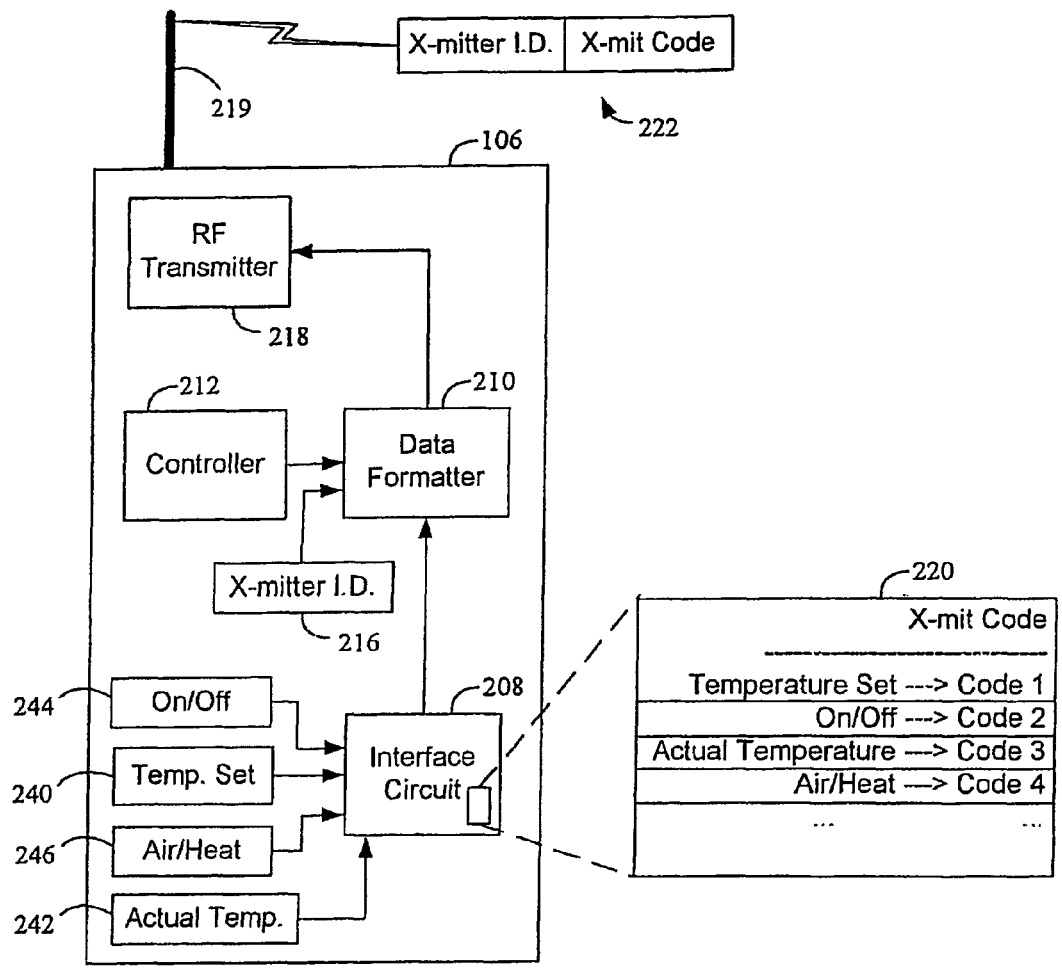

Reference is now made to FIG. 3C, which is a block diagram similar to that illustrated in FIG. 3A and FIG. 3B. The transmitter 106 is a type that can be integrated into a thermostat 107 (see FIG. 2C). In this embodiment, the interface circuit 208 may include multiple inputs such as a temperature control 240 (i.e., temperature set value), and an actual temperature reading 242 from a thermister out or other temperature measuring device. Other manual controls may be input to the interface circuit as well, including the value from the system On/Off switch 244, and the value of the switch indicating whether heat, fan, or AC has been selected by the thermostat control 246. In addition, depending upon the specific implementation, other controls may be provided as well. Each of these various input sources are routed to the interface circuit 208 which provides the information to a data formatter 210. The data formatter 210 may utilize a look-up table 220 to access unique transmitter codes that may be communicated in a packet 222, via RF, to convey certain information to a computer 120. Alternatively, actual temperature values may be transmitted (as operands) to a code, which would indicate that the operand value may be a temperature reading. In general, the operation of a transmitter 106 is similar to that described in connection with the transmitter 102 illustrated in FIG. 3A.

Figure 3D:
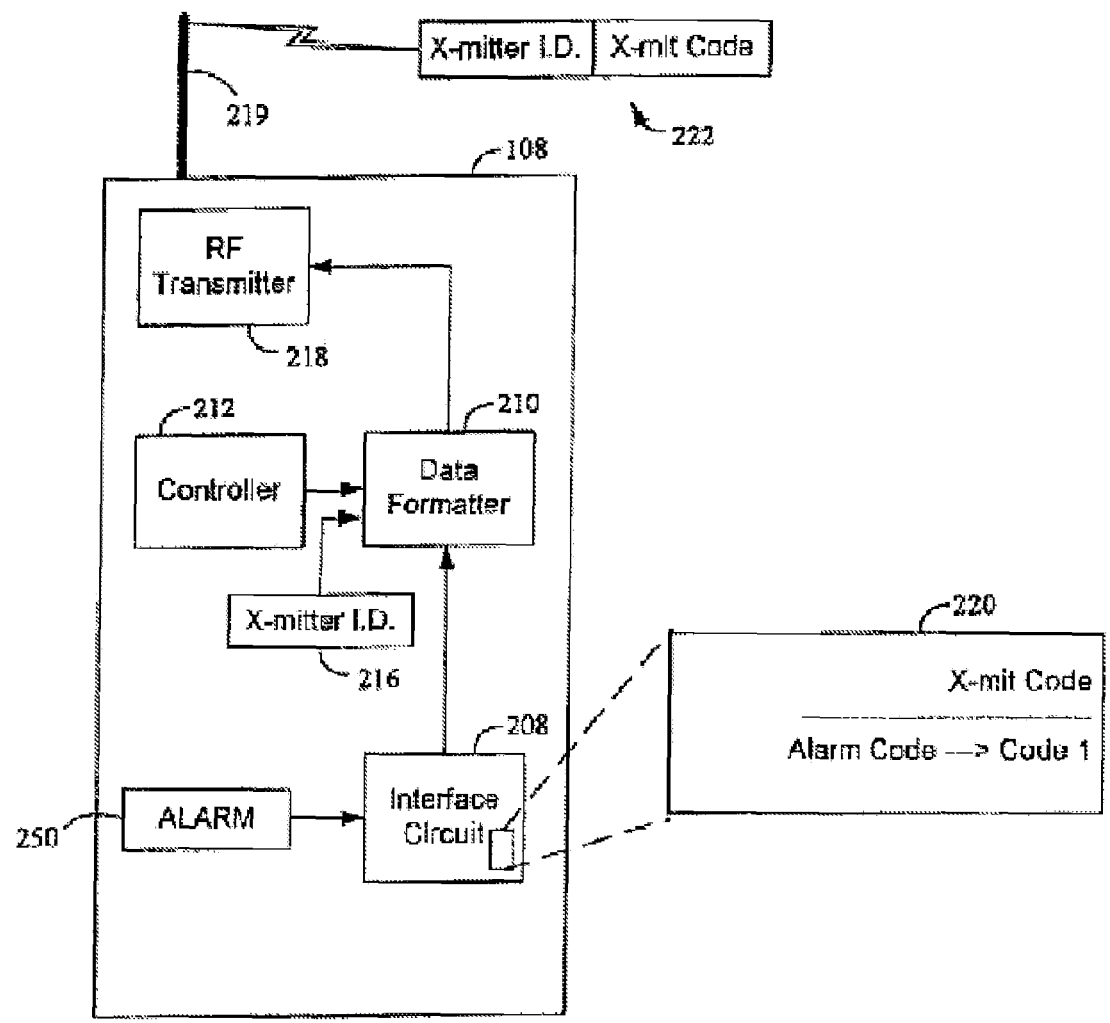

Reference is now made to FIG. 3D, which is a block diagram similar to those illustrated in FIGS. 3A, 3B, and 3C. The transmitter 108 illustrated in FIG. 3D is a transmitter which may be integrated with a security alarm system. An alarm signal from alarm 250 may be routed to the interface circuit 208, and may be associated with a transmitter code for transmission to the central computer 120. Depending upon the type of alarm system and the configuration desired, additional or different inputs may be provided to the interface circuit.

Figure 4A:
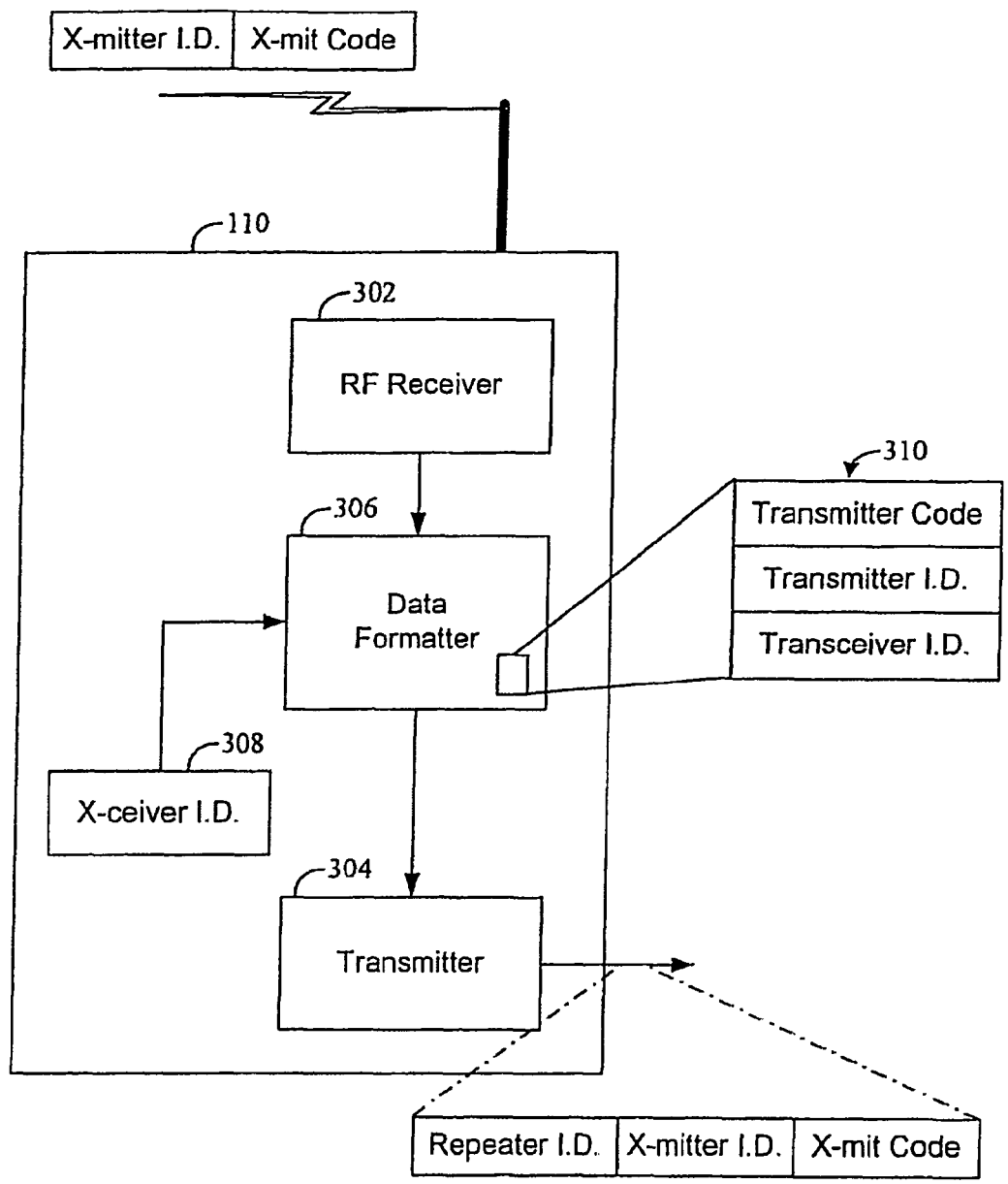
FIG. 4A is a block diagram illustrating certain functional components of a repeater in accordance with some embodiments of the present invention.

Reference is now made to FIG. 4A, which is a block diagram illustrating certain principal components within a repeater 110 of a system 100 (see FIG. 1) constructed in accordance with the present invention. As previously mentioned, a repeater 110 includes a receiver 302 to receive an incoming RF signal, and a transmitter 304 to transmit an outgoing signal to the central computer 120. The transmitter 304 may be configured for communicating an RF transmission signal, or alternatively for communicating an electrical signal over a conductive wire, a fiber optic cable, or other transmission medium. If the repeater 110 is configured for communicating an RF output signal, such an RF signal would be of a higher power than the RF signal transmitted from the transmitters 102, 104, 106, and 108. The repeaters 110, 112, and 114 would, therefore, have a greater transmission distance than the transmitters 102, 104, 106, and 108. It should be appreciated that the modulation scheme employed on the repeater transmitter 304 can be different than that employed on the remote transmitters 102, 104, 106, and 108, so that an RF transmission from a repeater would not be received up by another repeater. The repeater 110 can also include a data formatter 306 for formatting an outgoing message. A centralized controller and other circuitry may also be included as part of the repeater 110, but need not be shown or described herein, as the implementation of such circuitry would be well within the understanding of a person having ordinary skill in the art.

The data formatter 306 takes the received signal, which includes a transmitter code and a transmitter identification number 308, and adds an additional portion of information that includes a repeater identification number 308. The repeater identification number 308 may be provided by way of a programmable memory location, a series of DIP switches, or other mechanisms 308. Indeed, the repeater identification number 308 may be implemented on the repeater in much the same way that the transmitter identification number 308 is implemented on the transmitters, and as was described in connection with FIG. 3A. Therefore, a data packet 310 is created by the repeater 110 for further communication to the central computer 120 (see FIG. 1).

Figure 4B:
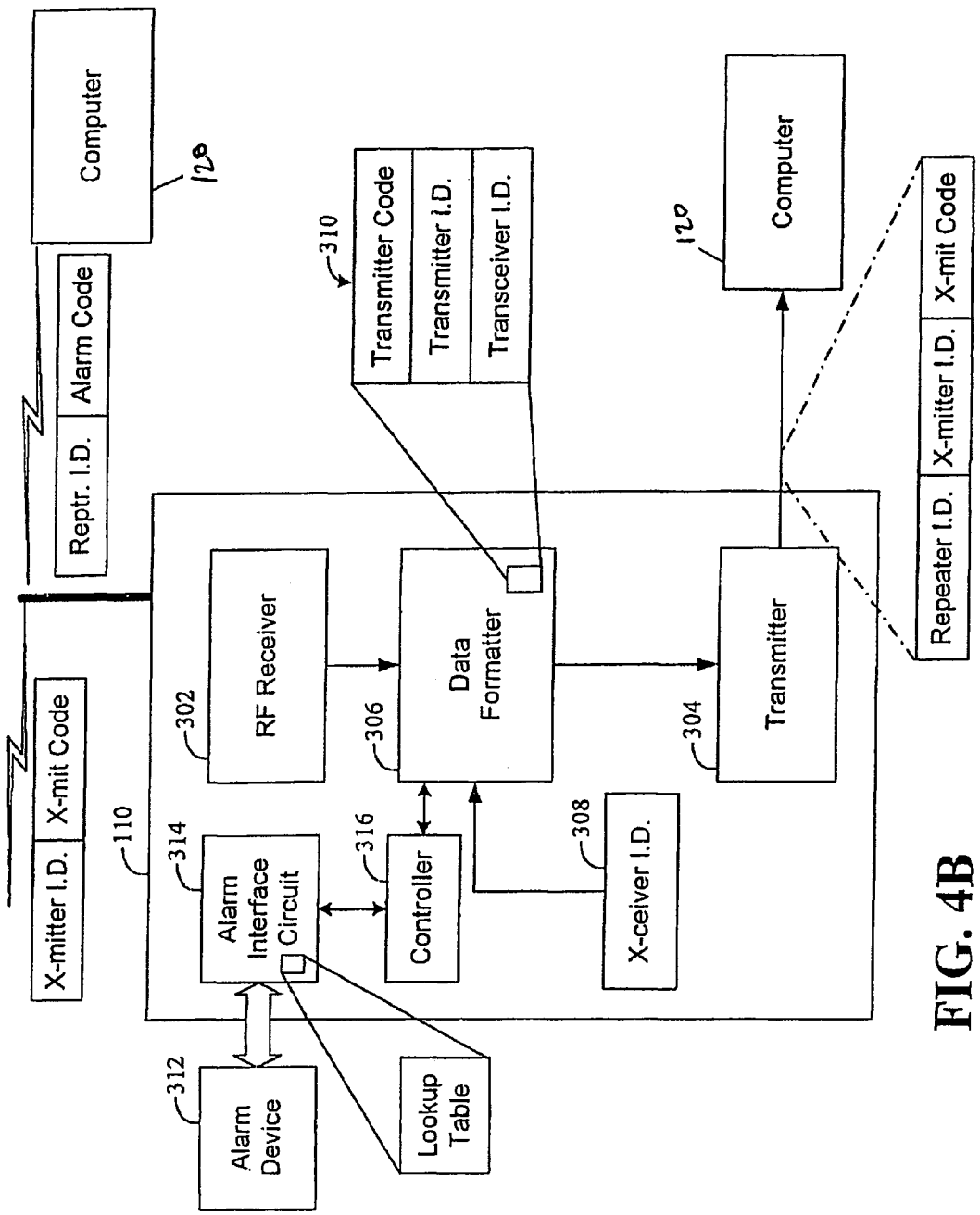
FIG. 4B is a block diagram illustrating certain other components of a repeater in accordance with some embodiments of the present invention.

Reference is now made to FIG. 4B, which illustrates certain other features of a repeater constructed in accordance with a preferred embodiment of the present invention. For purposes of illustration, many components have been illustrated in a fashion similar to that of FIG. 4A. Additional functional blocks illustrated in FIG. 4B include an alarm device 312 (such as a thermostat, smoke alarm, or security system), an alarm interface circuit 314, and a controller 316. In operation, the repeater 110 may communicate a variety of information to the central computer 120, including a repeater identification number, a transmitter identification number 308 (this may be a number identifying an alarm device), and a transmit code. In addition, the computer 120 may communicate certain information back to the repeater 110, including a repeater identification number and an alarm control code.

Of course, additional or different information may be communicated back to the repeater 310, depending upon the particular embodiment.

As previously mentioned, a receiver 302 within a repeater 310 may continuously monitor for transmissions. The repeater 310 may be configured to monitor transmissions to identify its internal identification number, which may signal to the repeater 310 that a given transmission is intended uniquely for it. In addition, an alarm control code may also be communicated to the repeater 310. Thereafter, a controller 316 may be configured to control the alarm device 312, via alarm interface circuit 314, in accordance with the command encoded in the alarm control code. For example, one control code may be interpreted by the controller 316 to override the manual temperature setting on the alarm device 312. Another alarm code may deactivate an audible alarm on an alarm device, such as a smoke alarm. Additional or different alarm codes may be utilized in the various embodiments of the present invention. It will be appreciated by persons skilled in the art that the alarm interface circuit 314 may be uniquely configured to interface with a specialized alarm device 312. The interface circuit 314, therefore, may differ from repeater to repeater, depending upon the alarm device 312 that is interfaced. Implementation of the interface circuit 314 will be understood by persons skilled in the art, and need not be described herein. The controller 316 may utilize a look-up table or other mechanism to decode and/or interpret the alarm control code.

Figure 5A:
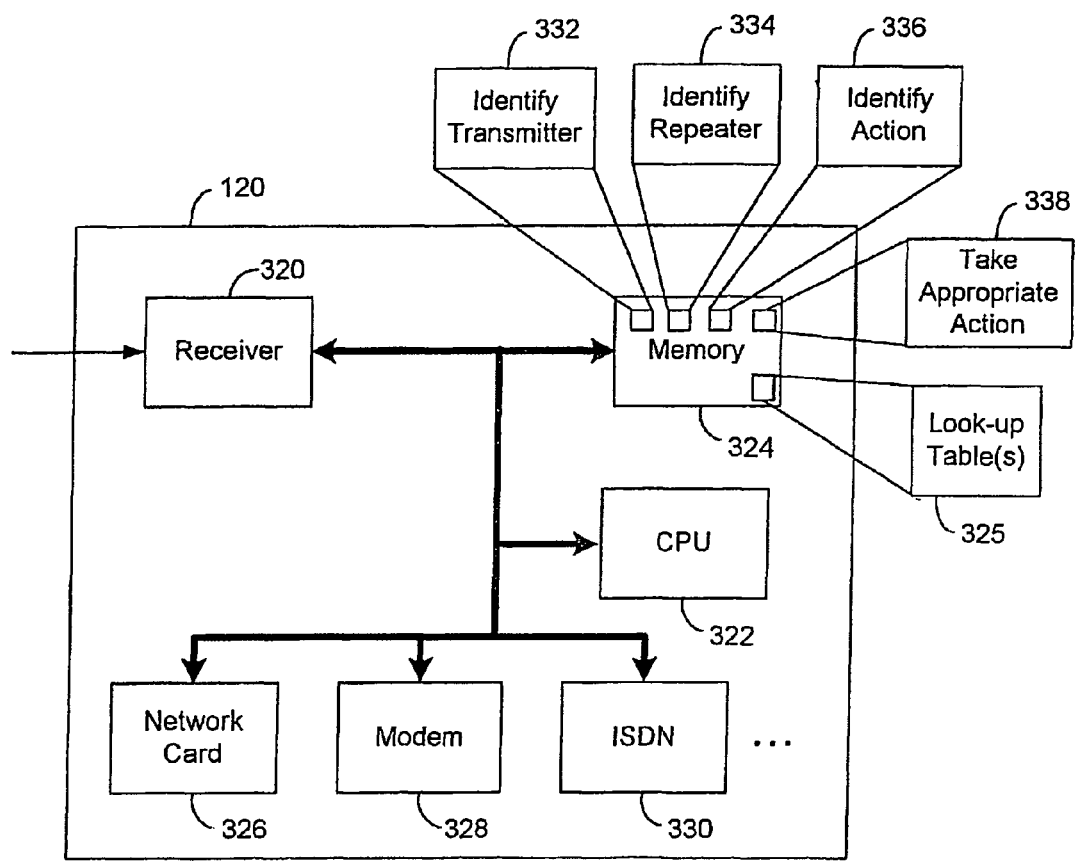
FIG. 5A is a block diagram illustrating certain physical components of a central computer in accordance with some embodiments of the present invention.

Reference is now made to FIG. 5A, which is a block diagram illustrating certain primary physical components that may be provided within the central computer 120. These include a receiver 320, a CPU 322, a memory 324, a network card 326, a modem 328, an ISDN card 330, and other components not illustrated. The receiver 320 can receive an incoming signal, whether the signal is received via RF signaling, conductive wire, fiber optic cable, or otherwise. The receiver 320 may then format the received signal for digital storage and store the information within memory 324. Program code within the memory 324 may also be provided and configured for controlling the operation of a CPU 322 to carry out the various functions that are orchestrated and/or controlled by the computer 120. For example, the memory 324 may include program code for controlling the operation of the CPU 322 to evaluate an incoming data packet to determine what action needs to be taken. Look-up tables 326 may also be stored within memory 324 to assist in evaluating an incoming data packet or controlling CPU operation. Transmitter codes, transmitter identification numbers, and/or repeater identification numbers may all be stored with associated information within look-up tables 325.

Thus, one look-up table may be provided to associate transmitter identification numbers with a particular user. Another look-up table may be used to associate transmitter codes with the interpretation thereof. For example, a unique code may be associated by a look-up table to identify functions such as test, temperature, smoke alarm active, or security system breach. In connection with the look-up tables 325, the memory 324 may also include a plurality of code (software) segments that are executed by the CPU 322, and which largely control the operation of the computer 120. For example, a first code segment 332 may be provided to access a first look-up table to determine the identity of the transmitter which transmitted the received message. A second code segment 334 may be provided to access a second look-up table to determine the proximate location of the transmitter, by identifying the repeater that relayed the message. A third code segment 336 may be provided to identify the content of the message being transmitted or particular action. Namely, is it a fire alarm, a security alarm, an emergency request by a person, or a temperature control setting. A fourth code segment 338 may be provided to control the appropriate action that is to be carried out, based upon the outcomes of the first three code segments. Additional, fewer, or different code segments may be provided to carryout different functional operations in alternative embodiments.

The computer 120 may also include one or more mechanisms to communicate with remote systems. For example, the computer 120 may include a network card 326 enabling the computer 120 to communicate across a LAN (or WAN) to a network server, which may contain a gateway to the PSTN or Internet. Alternatively, the computer 120 may contain a modem 328 to provide a direct dial link to a remote system utilizing the PSTN 130. The computer 120 may also include an ISDN card 330 to communicate via an ISDN connection with a remote system. Other communication gateways may also be provided.

Figure 5B:
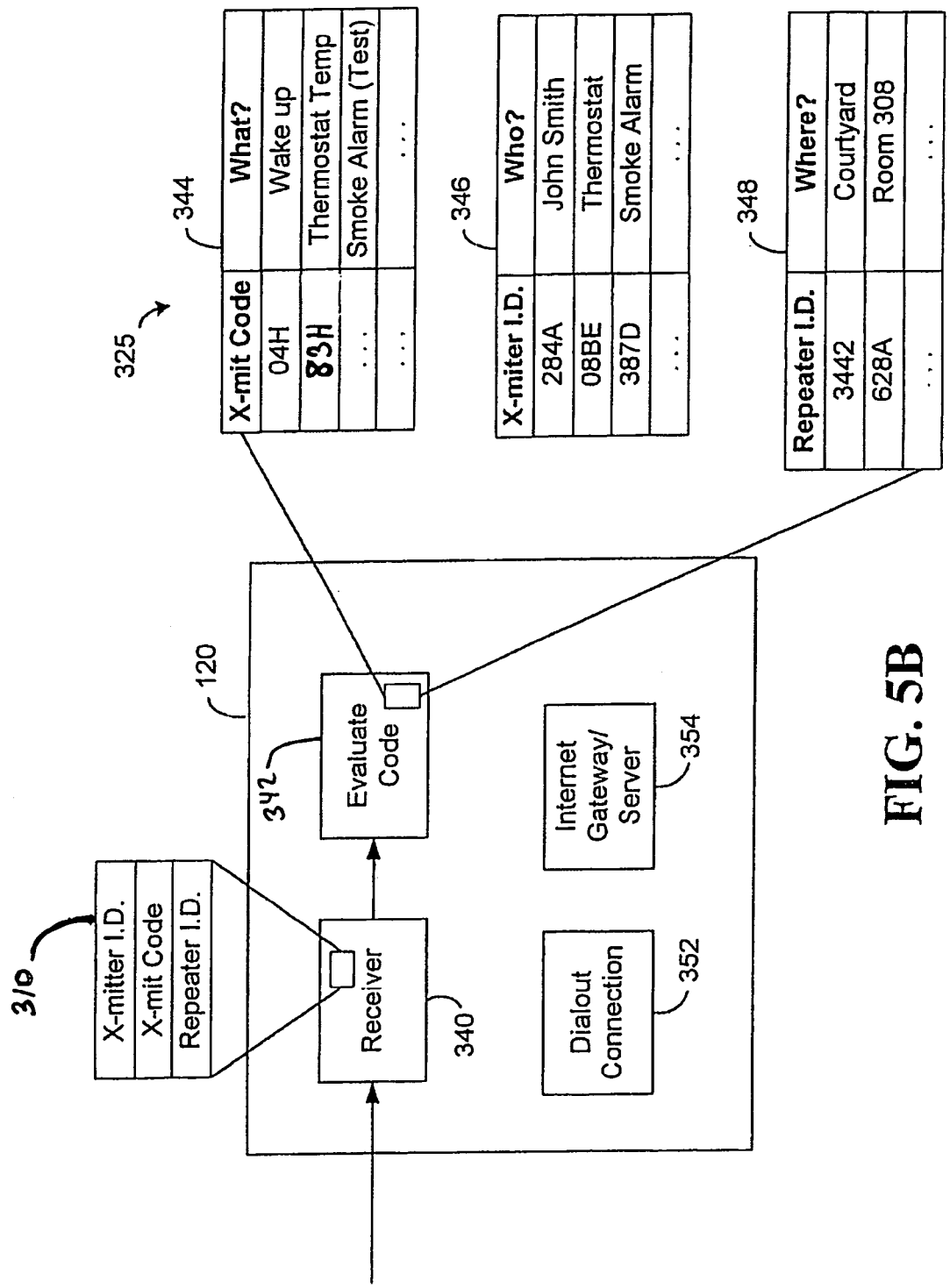
FIG. 5B is a block diagram illustrating certain functional components of a central computer in accordance with some embodiments of the present invention.

Reference is now made to FIG. 5B, which is a block diagram illustrating certain functional blocks that may be provided as a part of the computer 120. A receiver 340 may receive an incoming RF data packet 310. Another functional block 342 may be configured to evaluate the various codes of the incoming data packet 310. This functional unit 342 may employ various look-up tables 344, 346, and 348 to retrieve information associated with the various codes communicated as part of the data packet 310. A first look-up table 344 may associate transmitter codes with various actions or functions uniquely identified by the code. For example, a three-digit-hexadecimal code may be provided to cover various transmitter codes. For example, the code 04H may be associated with the function of a wake-up call, which may be carried out by a user depressing a wake-up or call-in button 204 on a user transmitter 102. The transmitter code 83H may be the code indicating a thermometer temperature setting. Numerous other codes may be provided and associated with certain particular functions, which may then be decoded at the central computer 120.

A second look-up table 346 may be provided to associate transmitter identifications. For example, as previously described, each transmitter 102, 104, 106, and 108 is preconfigured with a transmitter identification number 216. In the context of transmitter 102 that can be carried by individuals, the transmitter identification number 216 may be associated with a particular person (by name). Additional information regarding the individual (e.g., physical description) may be provided in the look-up table as well. Other transmitter identification numbers 216 may be associated with equipment, such as a thermostat, a smoke alarm, carbon monoxide detector, or security system. Thus, the unique transmitter identification number 216 informs the central computer 120 as to the origin of the transmission.

A third look-up table 348 may be provided to associate the repeater identification number 308 with a given location. As previously described, repeaters 110, 112, and 114 are disposed throughout a complex, compound, or other area of interest. During the initial configuration, each repeater is configured to have a unique identification number 308. A look-up table 348 may associate these unique identification numbers 308 with a physical location of the repeaters 110, 112, and 114. For example, one repeater may be physically located in an exterior courtyard, while another repeater may be physically located in a seventeenth floor recreation room. The central computer may use the look-up table 348 to identify the location of a repeater receiving an RF transmission.

As shown in FIG. 5B, the look-up tables 344, 346, and 348 effectively provide the "who", "what", and "where" for the information that is encoded within the transmitter identification number 216, the transmitter code, and the repeater identification number 308.

Other functions may be provided in connection with the central computer 120. For example, a dial out connection 352 may be established and/or maintained by the computer 120 in response to RF transmissions received by the receiver 340. In an alternative embodiment, the computer 120 may include an Internet gateway and/or server 354 for maintaining an intermittent or constant connection with the Internet or other network. Messaging of certain types of information may be communicated via this gateway 354 and/or dial out connection 352.

Figure 6:
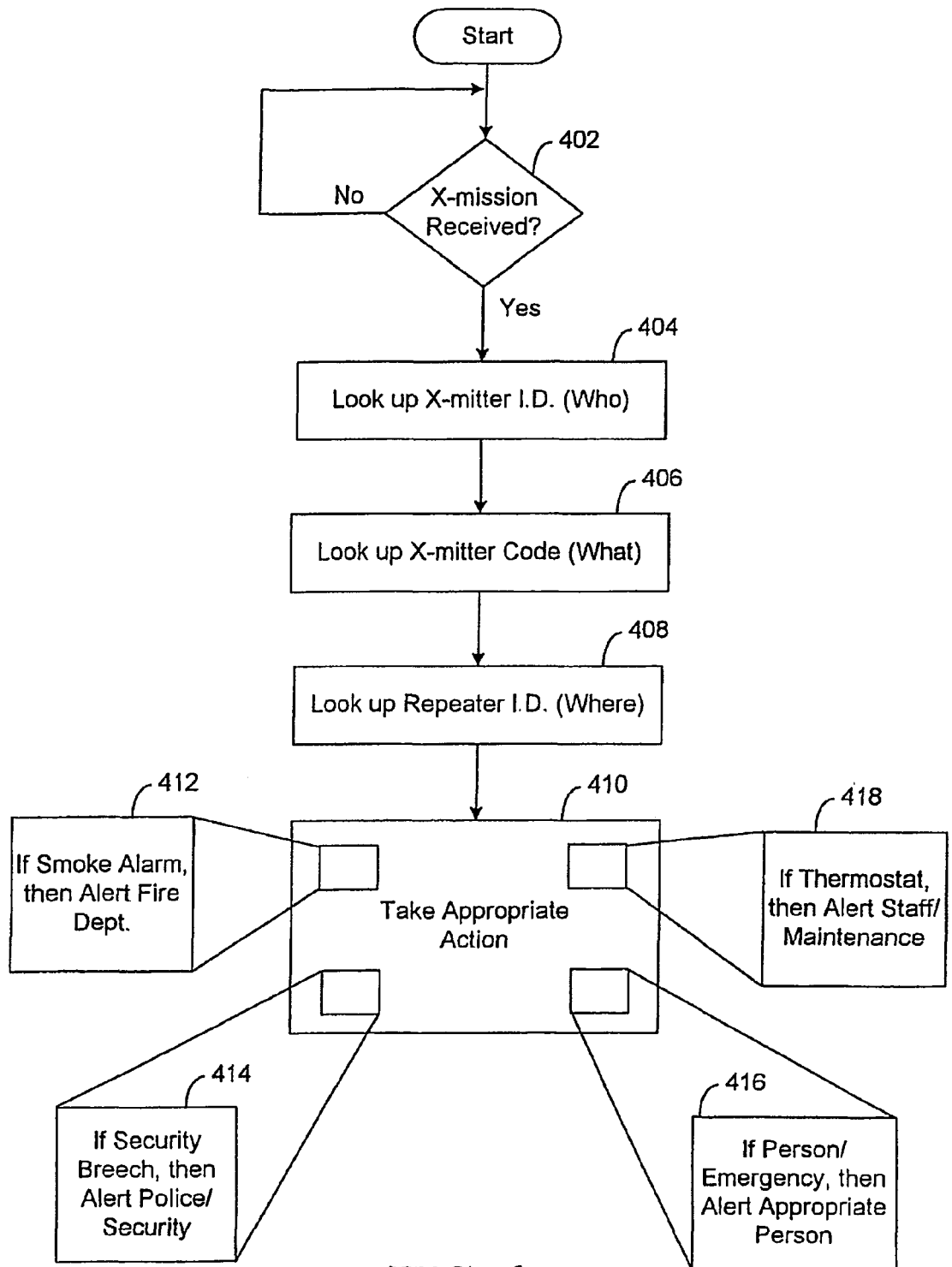
FIG. 6 is a flowchart illustrating a top-level functional operation of a system in accordance with some embodiments of the present invention.

Reference is now made to FIG. 6, which is a flow chart illustrating top-level functional operation of a system constructed in accordance with a preferred embodiment of the invention. The system can monitor a receiver for incoming transmissions (402). Once an incoming transmission is received, the system may then access a first look-up table to evaluate a transmitter identification code to determine the transmitter origin of the communication (404). Next, the system may access a second look-up table to evaluate a transmitter code to ascertain the purpose or function of the transmission (406). Finally, the system may access a third look-up table to evaluate a repeater identification number, to ascertain the proximate location of the originating transmission (408). Thereafter, the system may initiate and take whatever action is deemed appropriate (410).

There are numerous actions that may be deemed appropriate, depending upon the transmitter identification number, the transmitter code, and repeater identification number. For example, if the transmitter identification code indicates that the transmission is due in response to an alarm condition at a smoke alarm, the appropriate action may be to establish a dial up connection with a local fire department (412). In addition, if the system ascertained that the location of the smoke alarm (based upon the repeater identification number) was the seventh floor of a building structure, this information may also be communicated to the fire department, as this would inform them that trucks with extension ladders, buckets, or other access devices may be needed. If the transmitter identification number and transmitter code indicated that a security breach had occurred, then the corrective action may be to alert local law enforcement officers (414) and/or a private security service. If the transmitter identification number and transmitter code indicated that a person was requesting emergency assistance, then the corrective action may be to dial out to contact emergency personnel, or initiate a page for personnel on site to respond (416). Such a page or dial out may further include location information, so that persons responding to the distress signal would know the approximate location of the person in need of assistance. If the transmitter identification number and transmitter code indicated that the message where a response to a thermostat control setting being placed at an impermissible setting, then the emergency action may be simply to disengage that climate control unit, or perhaps to dispatch (on a non-emergency basis) an onsite person to correct the thermostat setting (418).

Figure 7:
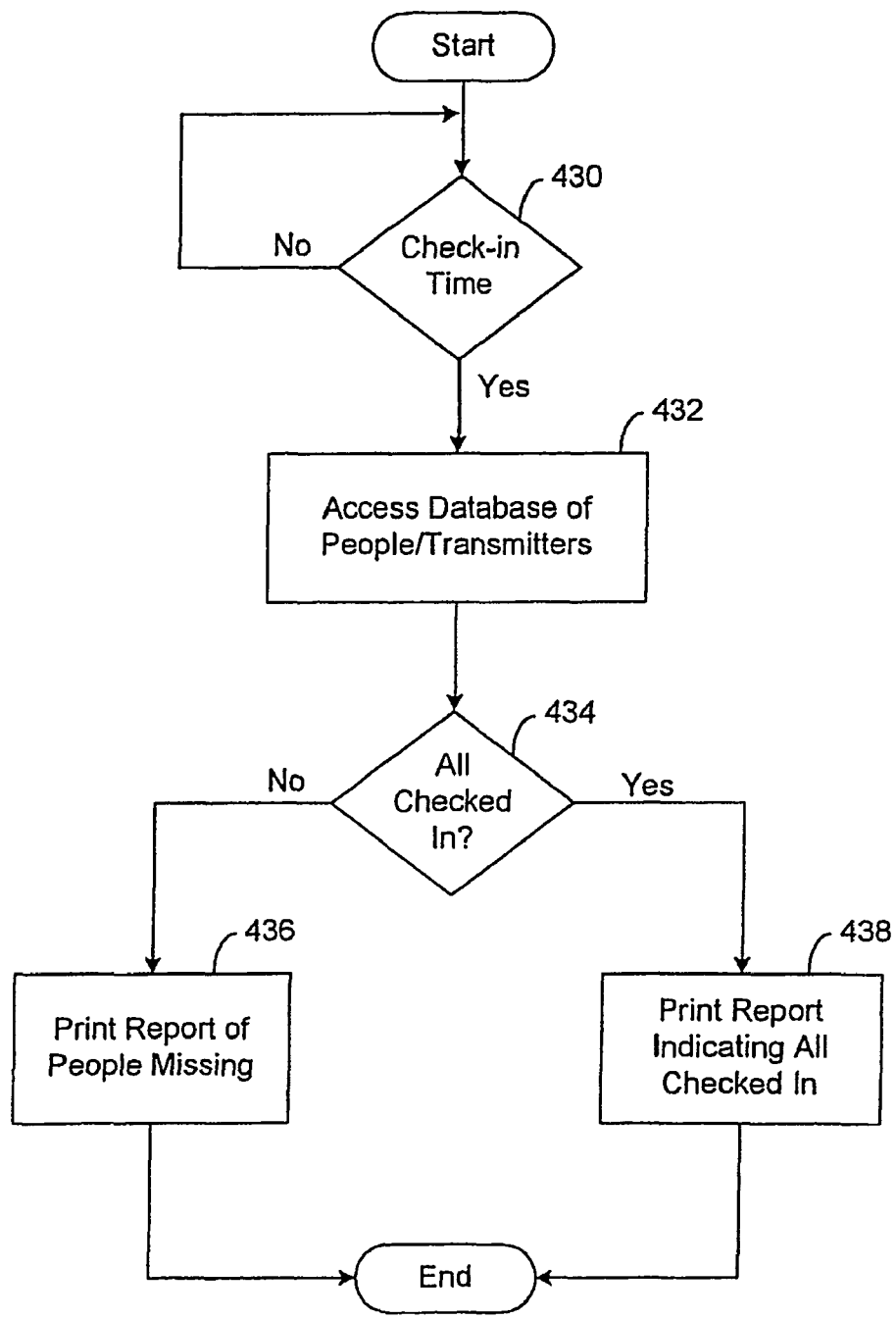
FIG. 7 is a flowchart illustrating a top-level functional operation of a system constructed in accordance with a preferred embodiment of the invention.

Reference is now made to FIG. 7 which is a flow chart illustrating top-level functional operation of one feature of a preferred embodiment in accordance with the present invention. In the context of a retirement community, or other facility that desirably monitors the activity of residents or patients, the system may be configured to accommodate a morning check. For example, in accordance with one aspect of a preferred embodiment, residents of a retirement community are each assigned a personal transmitter 102. Each morning when a person awakes, that person may depress a "wake-up" or "call-in" button 204 (FIG. 3A). A transmitter code associated with that wake-up button is transmitted, along with the transmitter identification number and repeater identification number to a central computer 120. The computer 120 then verifies that all residents have checked-in by a certain time in the morning.

The system may monitor, periodically, a time clock. After a certain time, for example, 10:00 am. (step 430), the system may access a memory storage area to determine all residents who have depressed their "wake-up" button since the previous day. This would then provide a listing of all people who have checked-in for the morning. This list may be compared against the database of all residents who have been assigned a transmitter 102 (step 432). The system may then evaluate whether all such residents have checked-in for the morning (step 434). If not, the system may print a report of all persons whom have not yet checked-in (step 436). Otherwise, the system may print a report indicating that all persons have checked in for the morning (step 438). These reports may then be forwarded, either by fax, dial-up connection, Internet connection, or simply by printing out on a local printer, to a person for patient or resident verification. Specifically, in the event that a report indicates that certain persons have not checked-in for the day, then an onsite staff person may be paged or otherwise prompted to check on the well being of that particular person.

The foregoing description has illustrated certain fundamental concepts of the invention, but other additions and/or modifications may be made consistent with the inventive concepts of the present invention. For example, in one embodiment a more complex system may employ transmitters having two-way communication capability. In addition to the transmitters conveying information codes in the manner described hereinabove, they may also be adapted to convey voice information Therefore, when a person presses, for example, the emergency button on his/her transmitter, then medical personnel, staff members, or others may respond by communicating via two-way radio with that particular person. Each transmitter may be equipped with a microphone and a speaker enabling the person to communicate information such as their present emergency situation or their specific location.

The foregoing description has been presented for purposes of illustration and description. It is not intended to be exhaustive or to limit the invention to the precise forms disclosed. Obvious modifications or variations are possible in light of the above teachings. For example, it should be appreciated that, in some implementations, the transceiver identification number is not necessary to identify the location of the transmitter. Indeed, in implementations where the transmitter is stationarily integrated into an alarm or other system (i.e., the location of the transmitter does not change), then the computer could be configured to identify the transmitter location by the transmitter identification number alone. It will be appreciated that, in embodiments that do not utilize repeaters, the transmitters can be configured to transmit at a high RF power level to effectively communicate with the computer.

As previously mentioned, in an alternative embodiment, the transmitter units may also include an internal transceiver, as opposed to merely a one-way transmitter. This would enable the communication of information from the computer (or other source) to the transmitter units. By way of illustration, but not limitation, totable/handheld transmitter units may include a number of buttons that control various functions. As discussed above, these buttons may include a "Wake-up" button, a "Test" button, and an "Emergency" button. Each of these buttons has a predetermined function. If a transceiver was incorporated into the transmitter units, however, then the central computer could effect a change in the functionality of these buttons, by communicating such information to the transmitter units. Of course, additional circuitry/logic can be incorporated into the transmitter units to monitor for such incoming transmissions.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

I claim:

1. An environmental management system to communicate environmental management data, the system comprising:
    a plurality of wireless transmitters to transmit information, the transmitters configured to format information as wireless data packets comprising codes indicative of an operating state associated with the transmitters, the codes being stored in a look up table accessible by a data formatter associated with said transmitters and said data formatter selecting a code for transmission in response to the operating state;
    a plurality of repeaters to receive information transmitted from one of the wireless transmitters, wherein the transmitters can access any of the repeaters such that the repeaters are not individually associated with the transmitters, and wherein the received information relates to environmental management data;
    a computer; and
    a gateway;
    wherein the repeaters communicate via TCP/IP the information to the computer and the computer executes a program to monitor information provided to the computer from the repeaters;
    wherein the gateway receives information from the computer and provides the information to a network via a WAN;
    wherein the computer program comprises:
    a first segment to evaluate a message and identify a specific transmitter that transmitted the message;
    a second segment to evaluate the message and identify a specific repeater that relayed the message from the specific transmitter to the computer;
    a third segment to evaluate the information and the message transmitted from a transmitter; and
    a fourth segment to determine an action to be taken based upon the information, the identified transmitter, and the identified repeater.

2. The system of claim 1, wherein at least one transmitter is a totable transmitter, at least one transmitter is integrated into a smoke detector, and at least one transmitter is integrated into a thermostat.

3. The system of claim 1, wherein at least one of the wireless transmitters transmits and receives a radio-frequency signal, and at least one repeater receives and transmits a radio-frequency signal.

4. The system of claim 1, wherein at least one repeater transmits a radio-frequency signal having a different modulation than the RF signal received by the at least one repeater.

5. The system of claim 1, the transmitters including a microphone, a speaker, and a transceiver for communicating information to the computer.

6. The system of claim 1, wherein the gateway is at least one of a modem to establish a dial-up connection with a remote computer, a network card to communicate across a local area network, a network card to communicate across a WAN, an ISDN card, and a circuit to communicate via TCP/IP protocol over the Internet.

7. The system of claim 1, wherein the information includes data associated with a personal transmitter, a smoke detector, a security alarm, a thermostat, and repeater location information.

8. The system of claim 1, the computer operable to execute a program for managing the environment based upon monitoring information provided to the computer.

9. The system of claim 1, at least one of the repeaters including an alarm device to detect an alarm condition, the at least one repeater being adapted to transmit the alarm condition to the computer.

10. An environmental management system for a residential living community comprising:
    a computer configured to execute at least one computer program that manages the environment of the community by monitoring select information that is reported to the computer;
    a plurality of wireless transmitters configured to transmit select information as well as transmitter identification numbers a relatively limited distance, wherein at least one transmitter is a totable transmitter, at least one transmitter is integrated into a smoke detector, and at least one transmitter is integrated into a thermostat, the transmitters configured to format information as wireless data packets comprising codes indicative of an operating state associated with the transmitters, the codes being stored in a look up table accessible by a data formatter associated with said transmitters and said data formatter selecting a code for transmission in response to the operating state;
    a plurality of repeaters dispersed throughout the community at defined locations, each repeater configured to receive select information that is transmitted from a nearby wireless transmitter and further communicate that select information to the computer, each repeater being further configured to transmit a repeater identification number along with the select information, wherein the transmitters can access any of the repeaters such that the repeaters are not individually associated with a specific transmitter;
    a circuit configured as a gateway between the computer and an external telecommunications network; and
    a computer program executed by the computer, the computer program further including:
    a first segment for evaluating a received message and identifying a specific transmitter that transmitted the message;
    a second segment for evaluating the received message and identifying a specific repeater that relayed the message from the specific transmitter to the computer;
    a third segment for evaluating the select information that is transmitted from a transmitter and embedded within the received message; and
    a fourth segment responsive to the first, second, and third segments for determining an action to be taken based upon the select information, the identified transmitter, and the identified repeater.

11. The system of claim 10, wherein the transmitter is integrated with at least one of a smoke detector, utility meter, a carbon monoxide detector, a carbon dioxide detector, a temperature sensor, and a security sensor.

12. The system of claim 10, wherein at least one repeater is integrated into at least one of a carbon monoxide detector, a carbon dioxide detector, a temperature sensor, and a security sensor.

13. The system of claim 10, further comprising a gateway for establishing and maintaining communications across at least one of a global computer network and public switched telephone network, the gateway being coupled to the computer.

14. The system of claim 10, wherein the computer transmits control information to at least one repeater and at least one transmitter.

* * * * *